(12) United States Patent
Tochio et al.

(10) Patent No.: US 7,122,786 B2
(45) Date of Patent: Oct. 17, 2006

(54) CONTROLLING APPARATUS AND CONTROLLING METHOD OF OPTICAL SWITCHING DEVICE

(75) Inventors: Yuji Tochio, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/949,913

(22) Filed: Sep. 12, 2001

(65) Prior Publication Data
US 2002/0109076 A1 Aug. 15, 2002

(30) Foreign Application Priority Data
Dec. 7, 2000 (JP) .............................. 2000-373460
Jun. 29, 2001 (JP) .............................. 2001-198936

(51) Int. Cl.
G02B 6/26 (2006.01)
G02B 6/42 (2006.01)

(52) U.S. Cl. ....................... 250/234; 385/17; 385/18; 385/52

(58) Field of Classification Search ............. 250/201.9, 250/201.1, 234, 216, 230; 359/556, 557, 359/850, 291; 385/16–18, 52
See application file for complete search history.

(56) References Cited
U.S. PATENT DOCUMENTS 5,206,497 A * 4/1993 Lee ......................... 250/201.1
6,313,936 B1 * 11/2001 Holmes ..................... 359/250
6,330,102 B1 * 12/2001 Daneman et al. ........... 359/290
6,337,760 B1 * 1/2002 Huibers et al. ............. 359/291
6,456,751 B1 * 9/2002 Bowers et al. ............... 385/16
6,466,356 B1 * 10/2002 Peeters et al. .............. 359/291
6,567,574 B1 * 5/2003 Ma et al. ...................... 385/16
6,587,611 B1 * 7/2003 Hunt ............................ 385/18
6,610,974 B1 * 8/2003 Hunt et al. ............. 250/227.22
6,625,341 B1 * 9/2003 Novotny ...................... 385/18

* cited by examiner

Primary Examiner—Thanh X. Luu
Assistant Examiner—Stephen Yam
(74) Attorney, Agent, or Firm—Staas & Halsey LLP

(57) ABSTRACT

A controlling apparatus and a controlling method of an optical switching device are capable of automatically correcting angle deviations of tilt-mirrors to thereby reduce an optical loss. To this end, such as in a three-dimension type optical switching device including a first mirror array and a second mirror array each arranged in a plane thereof with a plurality of tilt-mirrors, angles of reflection surfaces of which are controllable, the controlling apparatus branches a part of an optical signal reflected by the output side second tilt-mirror array, receives the branched light by an image sensor to thereby generate position information of the branched light, compares, by a control circuit, the position information with initial position information previously set corresponding to target values of the angles of the reflecting surfaces of the respective tilt-mirrors, to thereby detect an error in the arriving position of the optical signal, and correction controls the angles of the reflecting surfaces of the tilt-mirrors, based on the detected error.

25 Claims, 36 Drawing Sheets $\gamma = 2\theta_B - 2(\alpha - \beta)$ $\gamma' = 2\theta_A - 2(\alpha - \beta)$

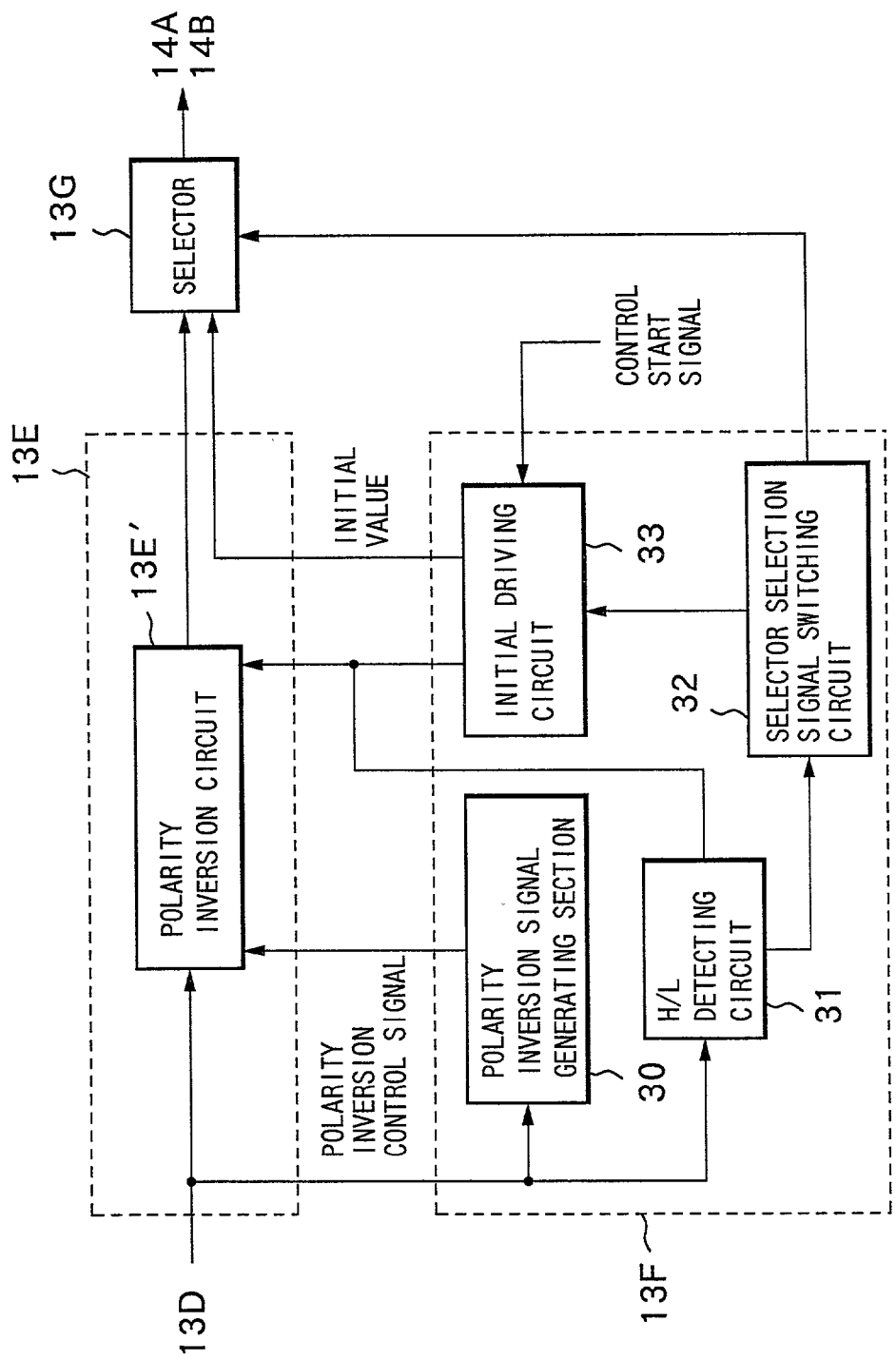

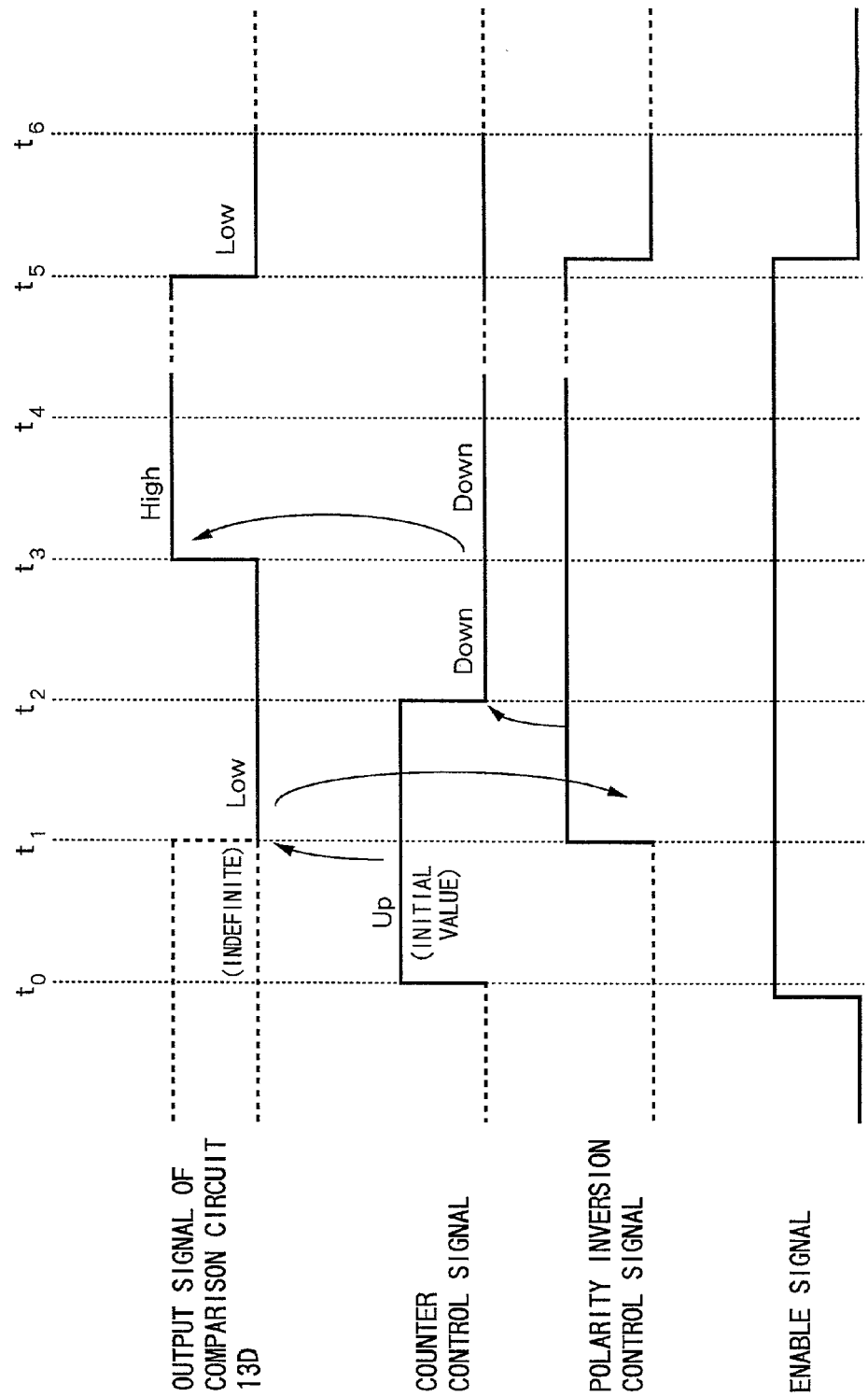

SHIFT TYPE FOLDED MIRROR

CONSTITUENT EXAMPLE OF GENERAL OPTICAL SWITCHING DEVICE OF THREE-DIMENSIONAL TYPE

FIG.46
EXEMPLARY DIAGRAM SHOWING POSITIONAL DEVIATION OF OPTICAL SIGNAL IN GENERAL OPTICAL SWITCHING DEVICE OF THREE-DIMENTIONAL TYPE
FIG.46A
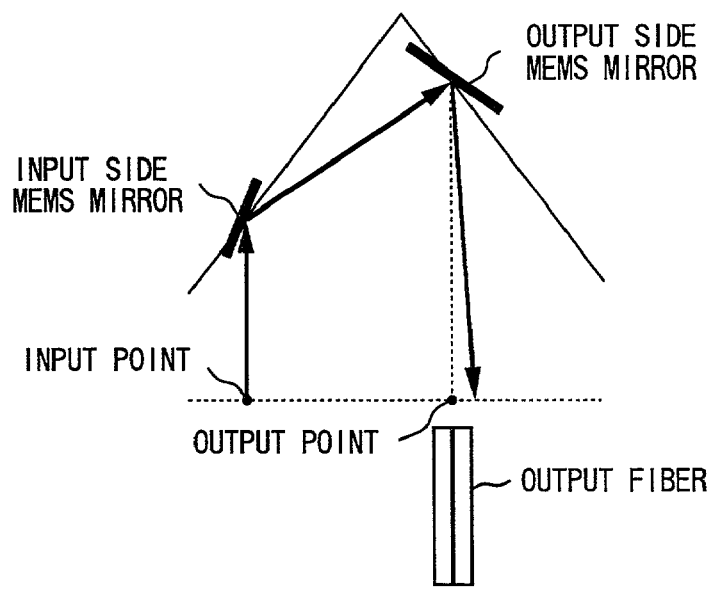
FIG.46B
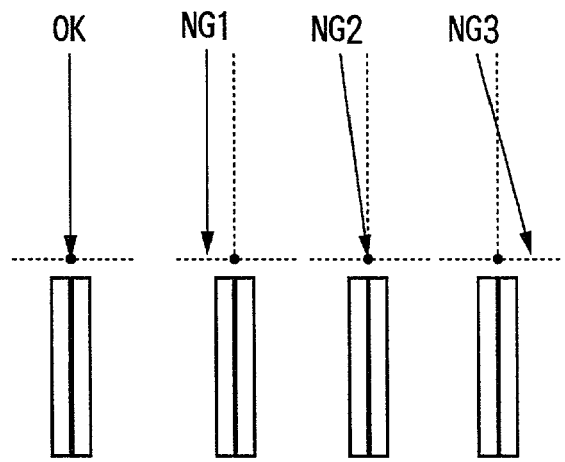

CONTROLLING APPARATUS AND CONTROLLING METHOD OF OPTICAL SWITCHING DEVICE

BACKGROUND OF THE INVENTION (1) Field of the Invention

The present invention relates to a switching control technique in an optical switching device, and more particularly to a controlling apparatus and a controlling method of an optical switching device utilizing reflection type tilt-mirrors based on a micromachining (MEMS: Micro Electric Mechanical system) technique.

(2) Description of the Related Art

Recently, an increase in traffic in the Internet and the like has resulted in an increased demand for optical networks. Under these circumstances, attention has been directed to the introduction of an optical switching device for directly switching large-capacity and high-speed data in the form of optical signals. Conventional techniques for realizing such an optical switching device having the nature of large capacity and high speed have mainly included methods for mechanically switching optical fibers, for combining waveguides with one another or the like. However, in such conventional techniques, a multistage constitution is required to be adopted, thereby resulting in an extremely large optical loss within the optical switching device and resulting in limitations in coping with the increase of the number of channels, so that it has been difficult to realize an optical switching device capable of coping with several tens or more channels.

Under the above circumstances, attention has been directed to an optical switch utilizing tilt-mirrors (hereinafter called "MEMS mirrors") fabricated by applying a micromachining (MEMS) technique, since such an optical switch is superior to other switches in terms of downsized, wavelength independency and polarization independency, for example. Particularly, for example, as shown in FIG. 45, an optical switching device of three-dimensional type constituted by combining two collimator arrays 1A, 1B each having a plurality of collimators two-dimensionally arranged and two MEMS mirror arrays 2A, 2B each having a plurality of MEMS mirrors two-dimensionally arranged, is expected since reduction of an optical loss, increase of the capacity, and realization of multiple channels are possible.

In the aforementioned three-dimensional type optical switching device utilizing the MEMS mirror arrays 2A, 2B, however, due to angle deviations between MEMS mirrors, it is likely that deviations occur in inputs of optical signals to output fibers connected to output side collimators, thereby causing a factor which increases the optical loss within the optical switching device.

FIG. 46 exemplarily shows the above content, in which FIG. 46A is a plan view showing an example of an optical path from an input point to an output point of an optical signal in the optical switching device, and FIG. 46B is a plan view exemplifying respective states where optical signals are input to output fibers, respectively. Note, in FIG. 46, input side and output side collimators are omitted, so as to comprehensively show the states of optical paths in the optical switching device.

In FIG. 46, a light reflected by an output side MEMS mirror is required to be input perpendicularly to a core portion of an output fiber, as indicated by "OK" in FIG. 46B, and such a light should not be deviated from the core as indicated by "NG1" and "NG3" nor obliquely input to the core as indicated by "NG2" in FIG. 46B.

Such defective coupling of an optical signal to an output fiber is caused by a slight angle deviation, even if an input port and an output port of the optical signal have been determined, and angles to be controlled for respective input side and output side MEMS mirrors are known numeric values. Specifically, an angle deviation of the order of 0.050° in MEMS mirror causes an optical loss of a few dB. Concerning angle deviations of MEMS mirrors, it is difficult to judge which one of paired MEMS mirrors is deviated and how much the deviation is, because it is impossible to individually monitor the optical signal power corresponding to the angle of each mirror.

To correct the aforementioned angle deviations of MEMS mirrors, it is conceivable a method to detect light position information of an optical signal propagated from an output side MEMS mirror to an associated collimator, such as by a CCD image sensor. However, it is not easy for this method to detect differences between the "OK" and "NG2", and between the "NG1" and "NG3" in FIG. 46B. Namely, such a method has a defect in that it is difficult to detect incident angle information of light. Particularly, in the state of "NG2", it is difficult to judge whether or not the light is being correctly output.

As another method to correct angle deviations of MEMS mirrors, it is further conceivable a method to monitor, for example, the power of optical signal coupled to an output fiber, so as to feedback control the angle of each MEMS mirror based on the monitored result. In this method, however, it is impossible to adopt such a system to feedback control the angles of MEMS mirrors so that the monitored optical powers are brought to previously set initial values, because a target value of optical power of each channel can not be determined to be constant due to variations and the like in optical powers of multiple channels to be input to the optical switching device. Further, since it is also difficult to confirm whether or not the optical power presently being monitored is a maximum value, it is therefore difficult to realize the aforementioned feedback control.

SUMMARY OF THE INVENTION

The present invention has been carried out in view of the conventional problems as described above, and it is therefore an object of the present invention to provide a controlling apparatus and a controlling method for an optical switching device capable of automatically correcting angle deviations of MEMS mirrors to thereby reduce an optical loss.

To achieve the above object, with the present invention, there is provided a controlling apparatus of an optical switching device, in which for the optical switching device including a first mirror array and a second mirror array each arranged in a plane with a plurality of tilt-mirrors each having a controllable reflecting surface, and sequentially reflecting optical signals input thereto by the first mirror array and the second mirror array to output from specific positions, the controlling apparatus controls angles of the reflecting surfaces of the respective tilt-mirrors of the first and second mirror arrays, wherein the controlling apparatus comprises: output light detecting means for detecting an output state of optical signals reflected by the second mirror array; and angle controlling means for judging, based on a detection result of the output light detecting means, the angles of the reflecting surfaces of the tilt-mirrors which reflected the optical signals of the first mirror array and the second mirror array, to correction control the angles of the reflecting surfaces of the tilt-mirrors so that these angles approach previously set target values, respectively.

According to such a constitution, in a so-called three-dimensional optical switching device, output information concerning the arriving position, optical power and the like of the optical signal reflected by the second mirror array positioned at an output side is detected by the output light detecting means. Then, the detection result of the output light detecting means is sent to the angle controlling means, and the angle controlling means judges, based on the detection result from the output light detecting means, the angles of the reflecting surfaces of the respective tilt-mirrors which sequentially reflected the optical signals, to thereby control for correcting deviations of the angles from the respective target values. In this way, it becomes possible to realize an optical switching device having a lower optical loss and a higher precision.

As one aspect of the controlling apparatus described above, the output light detecting means may include: an optical branching section for branching a part of the optical signal reflected by the second mirror array; and a position information generating section for receiving a branched light from the optical branching section at a light receiving surface thereof having a two-dimensional area so as to generate position information concerning the branched light, and the angle controlling means may include: a position difference detecting section for comparing the position information from the position information generating section with initial position information previously set corresponding to the target values of angles of reflecting surfaces of the respective tilt-mirrors, to thereby detect an error in the arriving position of the optical signal; a computing section for calculating angle deviations of the reflecting surfaces of the respective tilt-mirrors based on the error in the arriving position detected by the position difference detecting section, to thereby compute correction angles of the reflecting surfaces of the respective tilt-mirrors; and a correction control section for controlling the angles of the reflecting surfaces of the respective tilt-mirrors, in accordance with the correction angles computed by the computing section.

According to such a constitution, the position information concerning the optical signal reflected by the second mirror array is detected, and the error in the arriving position of the output light is detected by comparing the position information with the previously set initial position information, so that the angle deviations of the reflecting surfaces of the respective tilt-mirrors are calculated based on the error, to thereby compute correction angles of the reflecting surfaces of the respective tilt-mirrors. Then, the angles of the reflecting surfaces of the respective tilt-mirrors are controlled in accordance with the computed correction angles.

As another aspect of the controlling apparatus, the output light detecting means may include an optical power detecting section for detecting the power of optical signal to be output from each of the specific positions, and the angle controlling means may include: a first mirror driving section for changing in stepwise the angle of the reflecting surface of each tilt-mirror of the first mirror array into a certain controlling direction; a second mirror driving section for changing in stepwise the angle of the reflecting surface of each tilt-mirror of the second mirror array into a certain controlling direction; and a comparative control section for mutually comparing values of output light powers to be detected by the optical power detecting section before and after the time when the angle of the reflecting surface is changed by at least one of the first and second mirror driving sections, to thereby determine controlling directions at the first and second mirror driving sections based on a comparison result, so as to feedback control the angles of the reflecting surfaces of the respective tilt-mirrors such that the output light power to be detected by the optical power detecting section is increased.

According to such a constitution, the power of the optical signal to be reflected by the second mirror array and then output from each of the specific positions is detected, and the changes of the output light power are compared before and after the time when the angle of the reflecting surface is changed by at least one of the first mirror driving section and the second mirror driving section, to thereby determine controlling directions at the first and second mirror driving sections based on the comparison result, so as to thereafter feedback control the angles of the reflecting surfaces of the respective tilt-mirrors such that the output light power to be detected is increased.

In the aforementioned controlling apparatus, the comparative control section may provide initial values concerning the angles of the reflecting surfaces of tilt-mirrors being control targets to the first mirror driving section and the second mirror driving section. According to such a constitution, there are provided the initial values for the reflecting surface angles of the respective tilt-mirrors, to thereby improve the precision of the mirror adjusting speed.

With the present invention, a controlling method of an optical switching device, in which for the optical switching device including a first mirror array and a second mirror array each arranged in a plane with a plurality of tilt-mirrors each having a controllable reflecting surface, and sequentially reflecting optical signals input thereto by the first mirror array and the second mirror array to output from specific positions, the controlling apparatus controls angles of the reflecting surfaces of the respective tilt-mirrors of the first and second mirror arrays, wherein the controlling method comprises: output light detecting process for detecting an output state of optical signal reflected by the second mirror array; and angle controlling process for judging, based on a detection result of the output light detecting process, the angles of the reflecting surfaces of the tilt-mirrors which reflected the optical signals of the first mirror array and the second mirror array, to correction control the angles of the reflecting surfaces of the tilt-mirrors so that these angles approach previously set target values, respectively.

Further objects, features and advantages of the present invention will become more apparent from the following description of preferred embodiments when read in conjunction with the accompanying drawings.

BRIEF DESCRIPTION OF THE DRAWINGS

FIG. 21 is a block diagram showing a specific example of a counter control signal generating circuit and a monitor control circuit in the third embodiment of the present invention;

FIG. 22 is a timing chart for explaining an operation of the comparative control section in the third embodiment;

FIG. 46 is a view schematically showing positional deviations of an optical signal in the optical switching device of FIG. 45.

DETAILED DESCRIPTION OF THE INVENTION

There will be described hereinafter embodiments of the present invention, with reference to the accompanying drawings.

Figure 1:
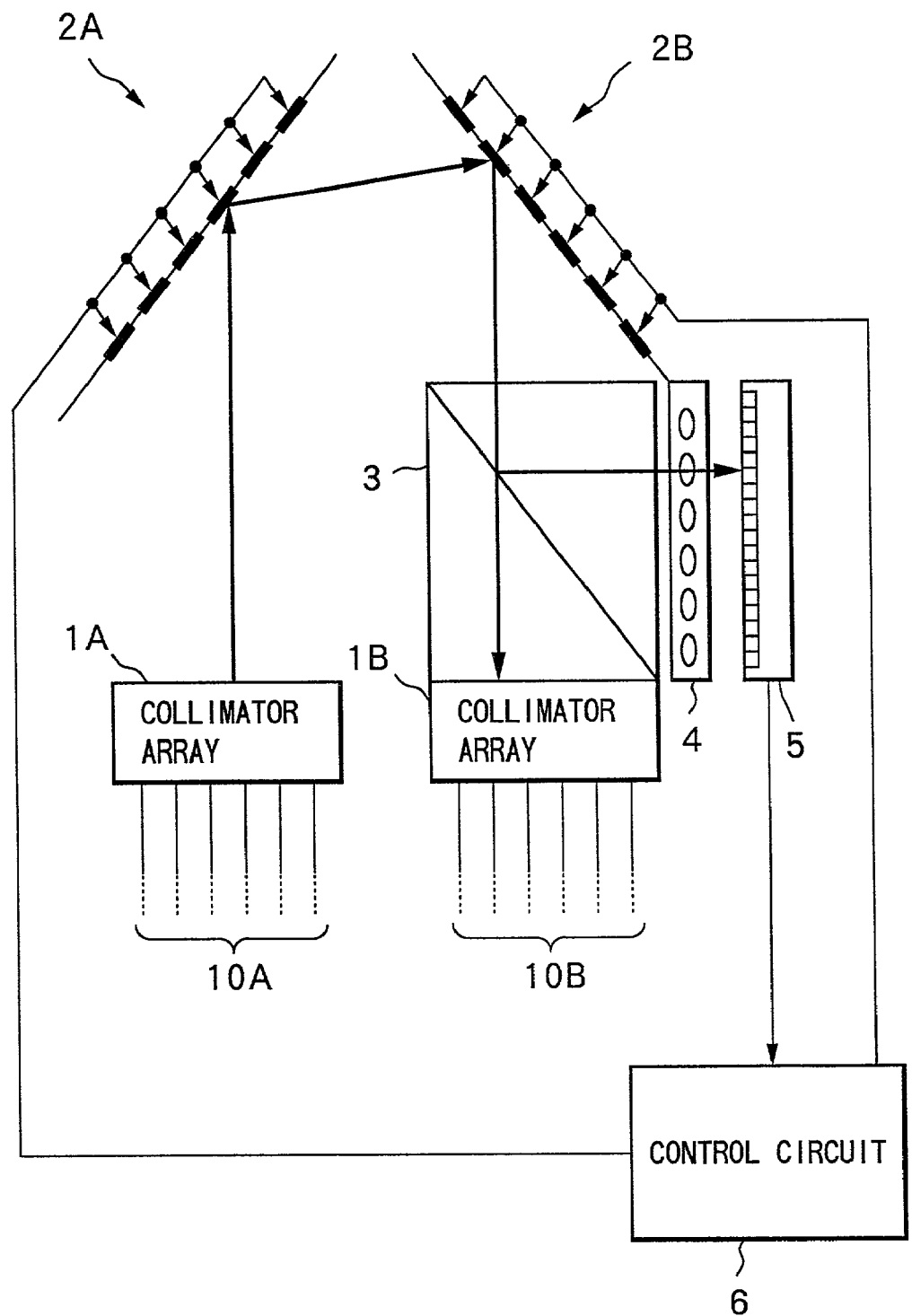
FIG. 1 is a schematic view showing a whole constitution of a controlling apparatus of an optical switching device, according to a first embodiment of the present invention.

FIG. 1 is a schematic view showing a whole constitution of a controlling apparatus of an optical switching device, according to a first embodiment of the present invention.

Figure 45:
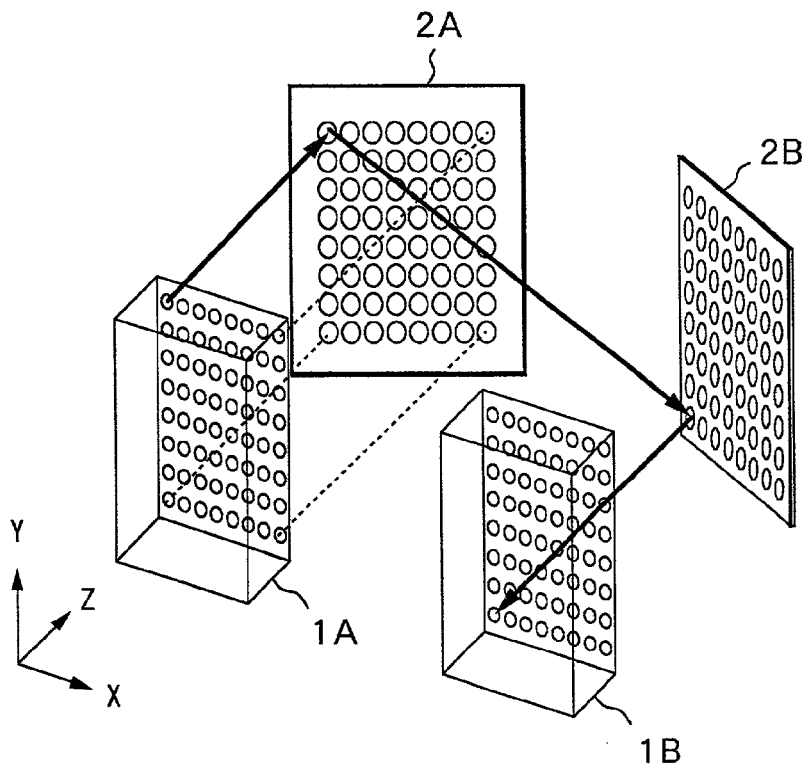
FIG. 45 is a perspective view showing a constitutional example of a general three-dimension type optical switching device.

In FIG. 1, the whole constitution of the first embodiment is such that there is provided a controlling apparatus comprising: a beam splitter 3 as an optical branching section; a lens array 4; a CCD image sensor 5 as a position information generating section; and a control circuit 6 as angle controlling means, concerning a three-dimension type optical switching device constituted by combining two collimator arrays 1A, 1B each having a plurality of collimators two-dimensionally arranged and two MEMS mirror arrays 2A, 2B each having a plurality of MEMS mirrors two-dimensionally arranged so as to correspond to the plurality of collimators, similarly to the conventional constitution shown in FIG. 45. Herein, the MEMS mirror array 2A corresponds to a first mirror array and the MEMS mirror array 2B corresponds to a second mirror array.

The collimator array 1A of the optical switching device is connected with an input fiber array 10A including two-dimensionally arranged plurality of optical fibers corresponding to the respective collimators. Lights emitted from the respective input fibers pass through the associated collimators and brought into parallel lights to be sent toward the MEMS mirror array 2A. The collimator array 1B is also connected with an output fiber array 10B including two-dimensionally arranged plurality of optical fibers corresponding to the respective collimators. Lights reflected by the MEMS mirror array 2B pass through the respective collimators to be coupled to the associated output fibers.

The MEMS mirror array 2A is obliquely arranged such that the normal line direction of the plane on which the mirror surfaces of MEMS mirrors are arranged becomes nonparallel to the propagation direction (optical axis direction) of the optical signals transmitted from the collimator array 1A. The MEMS mirror array 2B is arranged in a required position for again reflecting the lights reflected by the MEMS mirrors of the MEMS mirror array 2A, by means of the corresponding MEMS mirrors of the MEMS mirror array 2B, respectively, to lead the lights toward the collimator array 1B. Those MEMS mirrors to be arranged in the MEMS mirror arrays 2A, 2B are known micro tilt-mirrors fabricated by applying a micromachining (MEMS) technique. Specifically, each of such mirrors is obtained such that a movable plate formed with a mirror on an upper surface thereof and supported by torsion bars is integrated to a silicon substrate. The movable plate is rotated about the torsion bars by means of electromagnetic forces to thereby variably control the swing angles of the mirror.

In this embodiment, the beam splitter 3 of the controlling apparatus is disposed between the MEMS mirror array 2B and the collimator array 1B both positioned at the output side of the optical switching device, so as to branch a part of optical signals transmitted from the MEMS mirror array 2B to the collimator array 1B to send a branched light to the lens array 4. This lens array 4 is constituted by two-dimensionally arranged plurality of lenses for focusing the branched light from the beam splitter 3 onto a light receiving surface of the CCD image sensor 5. The CCD image sensor 5 receives the light passed through the lens array 4 to thereby generate position information, and transmits the position information to the control circuit 6. Herein, the CCD image sensor has been adopted as means for obtaining position information of the optical signals. However, the present invention is not limited thereto. It is possible to utilize various sensors (such as a sensor constituted of arranged plurality of photodetectors) capable of obtaining position information of optical signals at a required resolution. Based on the position information from the CCD image sensor 5, the control circuit 6 calculates the angle deviations of the input side MEMS mirrors and output side MEMS mirrors to thereby compute correction angles, and feedbacks the result to the angle control of the MEMS mirror arrays 2A, 2B so as to perform the correction.

Figure 2:
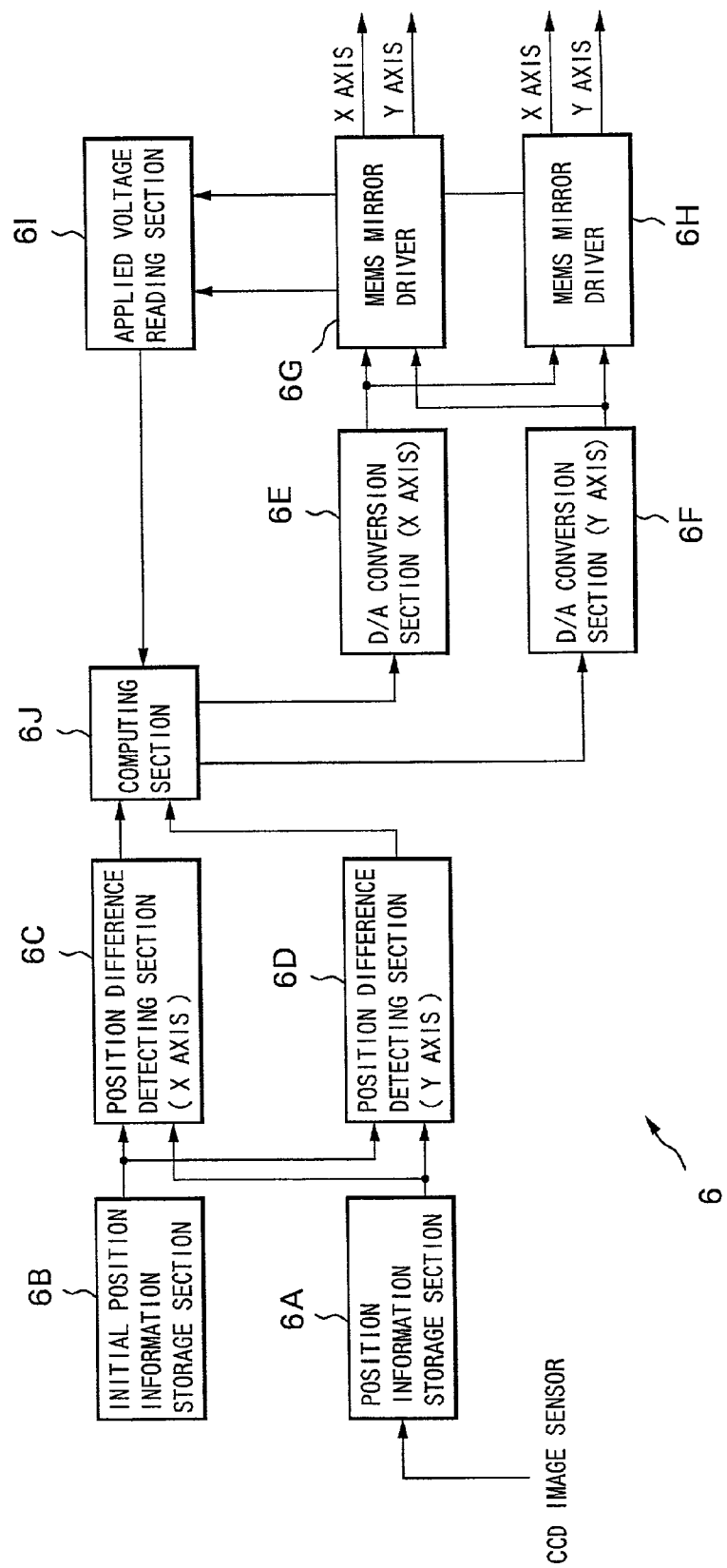
FIG. 2 is a block diagram showing an example of a specific functional constitution of a control circuit in the first embodiment.

FIG. 2 is a block diagram showing an example of a specific functional constitution of the control circuit 6.

Figure 3:
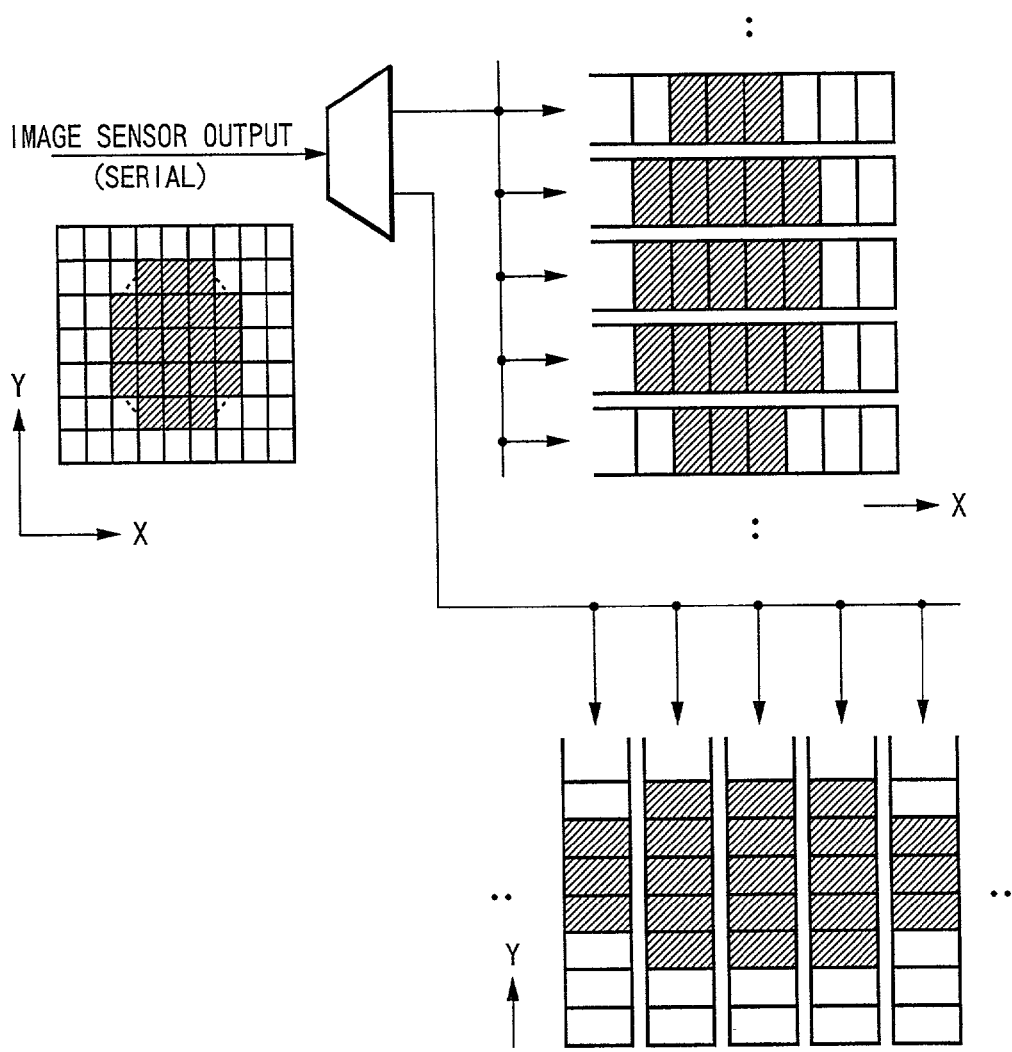
FIG. 3 is a view showing a specific exemplary constitution of a position information storage section in the first embodiment.

In the constitutional example of FIG. 2, the position information monitored by the CCD image sensor 5 is written into a position information storage section 6A. The position information storage section 6A is specifically constituted to correspond to a data processing of FIFO (First In First Out) type, in consideration of the comparison processing of the position information to be executed at the succeeding stage such as shown in FIG. 3, and there is adopted herein a scheme to cut out to store position information for each axis (X-axis and Y-axis).

Further, stored in an initial position information storage section 6B is initial position information previously set corresponding to each of output side collimators. Similarly to the position information storage section 6A, the initial position information storage section 6B is also specifically constituted to correspond to a data processing of FIFO type, and there is adopted herein a scheme to cut out to store position information for each axis (X-axis and Y-axis). As specific initial position information, the initial position information storage section 6B is stored with the optical coupling state where all of the MEMS mirrors are kept in non-driven states (in which inclination angles of mirrors are zero without any electric application), respectively, for example, in the arrangement of MEMS mirror arrays 2A, 2B shown in FIG. 4. In such a state, the optical signals reflected by the output side MEMS mirrors are respectively to be coupled to the output fibers in the "OK" state shown in FIG. 46B. Note, the initial position information in the present invention is not limited to the aforementioned setting state, and it is possible to set an arbitrary state insofar as the optical signals are input perpendicularly to the core portions of output fibers.

A position difference detecting section (X-axis) 6C shown in FIG. 2 reads out the X-axis related position information and the X-axis related initial position information stored in the position information storage section 6A and initial position information storage section 6B, respectively, and compares these information with each other to thereby detect a positional deviation $D_X$ from the initial position for the optical signal monitored at the CCD image sensor 5. The position difference detecting section (X-axis) 6C then outputs the detection result to a computing section 6J. Similarly to this, a position difference detecting section (Y-axis) 6D reads out the Y-axis related position information and the Y-axis related initial position information, and compares these information with each other to thereby detect a positional deviation $D_Y$. The position difference detecting section 6D then outputs the detection result to the computing section 6J.

Figure 5:
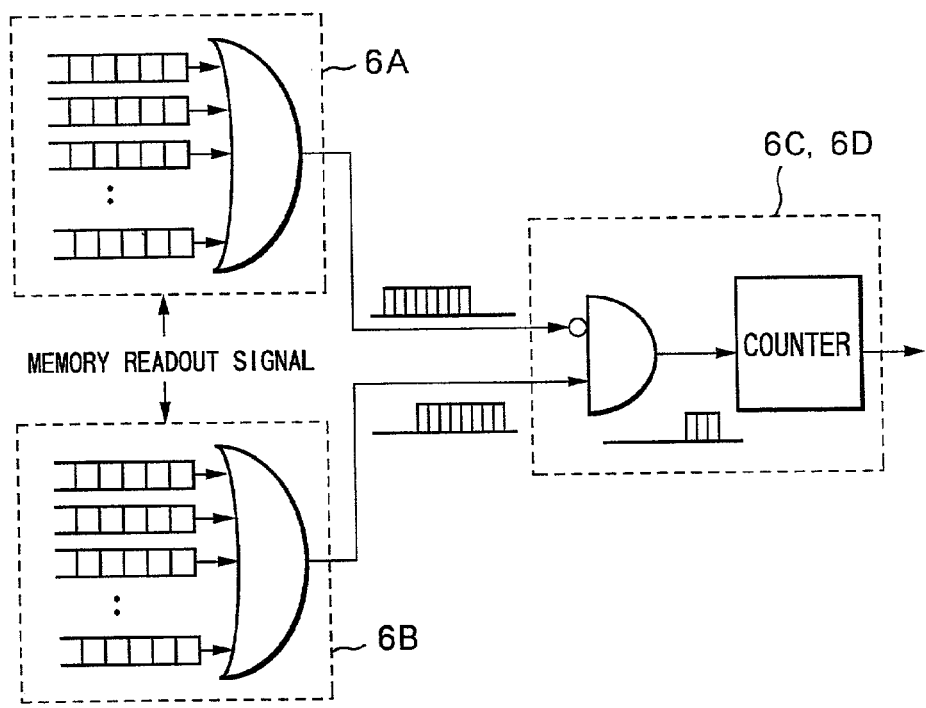
FIG. 5 is a view for explaining a specific method for detecting a positional deviation in the first embodiment.

In specific methods for detecting the positional deviations $D_X$, $D_Y$ concerning the respective axes, for example, as shown in FIG. 5, the position information stored in the position information storage section 6A and the position information stored in the initial position information storage section 6B corresponding to each other are simultaneously read out, the position information from the position information storage section 6A is logically inverted so as to compute a logical product of both information, and the number of bits as the calculation result so that the positional deviations $D_X$, $D_Y$ can be detected. Although FIG. 5 exemplifies a method to detect the positional deviation $D_X$ concerning the X-axis direction, it is also possible to detect the positional deviation $D_Y$ concerning the Y-axis direction in the same manner as the method for the X-axis direction. Further, the method for detecting the positional deviations of the optical signal in the present invention is not limited to the above example, and it is possible to detect positional deviations making use of known image processing techniques.

A D/A conversion section (X-axis) 6E and a D/A conversion section (Y-axis) 6F D/A convert the output signals from the computing section 6J to be detailed later, respectively, and then output converted signals to MEMS mirror drivers 6G, 6H, respectively. The MEMS mirror driver 6G applies voltage signals corresponding to the output signals from the D/A conversion sections 6E, 6F to respective MEMS mirrors of the input side MEMS mirror array 1A to thereby drive control the angles of the MEMS mirrors. The MEMS mirror driver 6H applies voltage signals corresponding to the output signals from the D/A conversion sections 6E, 6F to respective MEMS mirrors of the input side MEMS mirror array 2B to thereby drive control the angles of the MEMS mirrors.

An applied voltage reading section 6I reads out applied voltage values to the respective MEMS mirror arrays 2A, 2B driven by the MEMS mirror driver 6G, 6H, respectively, for the respective axial directions, to send the read out values to the computing section 6J. Based on the positional deviations $D_X$, $D_Y$ detected by the position difference detecting section (X-axis) 6C and position difference detecting section (Y-axis) 6D, respectively, and based on the applied voltage values as read out by the applied voltage reading section 6I, the computing section 6J calculates the angle deviations of respective MEMS mirrors at the input side and output side to thereby compute the correction angles, and feedbacks the computation result to the MEMS mirror drivers 6G, 6H via D/A conversion sections 6E, 6F, so as to finally correct the angle deviations of respective MEMS mirrors.

Figure 4:
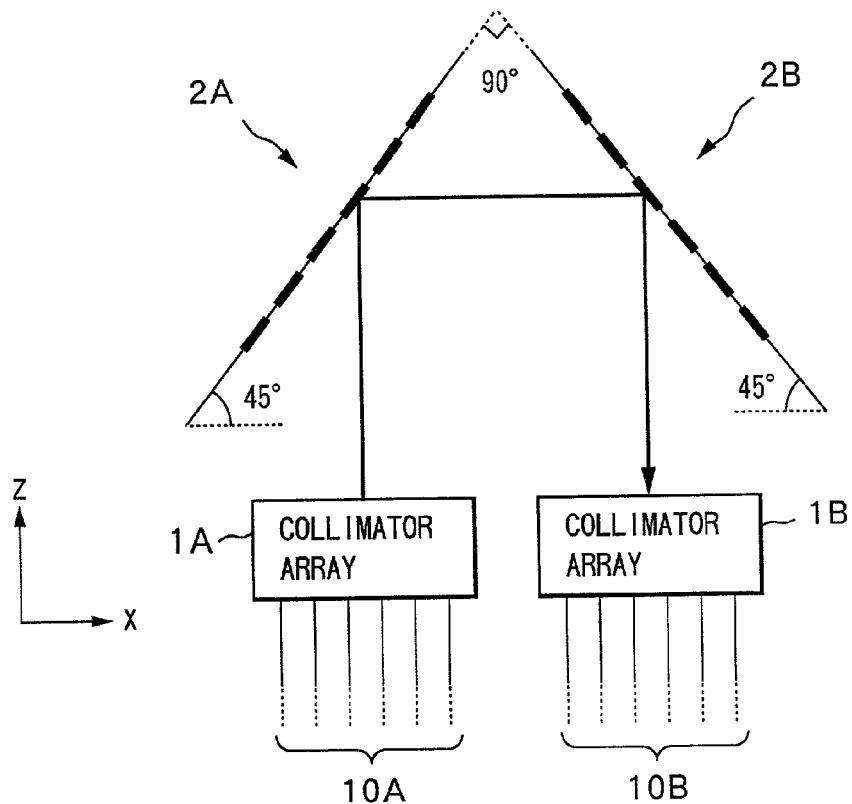
FIG. 4 is an arrangement view for explaining initial position information in the first embodiment.

There will be now explained the computation processing to be executed by the computing section 6J. Note, herein on the assumption of the arrangement of the collimator arrays 1A, 1B and MEMS mirror arrays 2A, 2B as shown in FIG. 4, there shall be specifically explained a computing method of an angle deviation in the X-axis direction. The explanation of a computing method of an angle deviation in the Y-axis direction shall be omitted, since it is the same as the method for the X-axis direction.

Figure 6A:
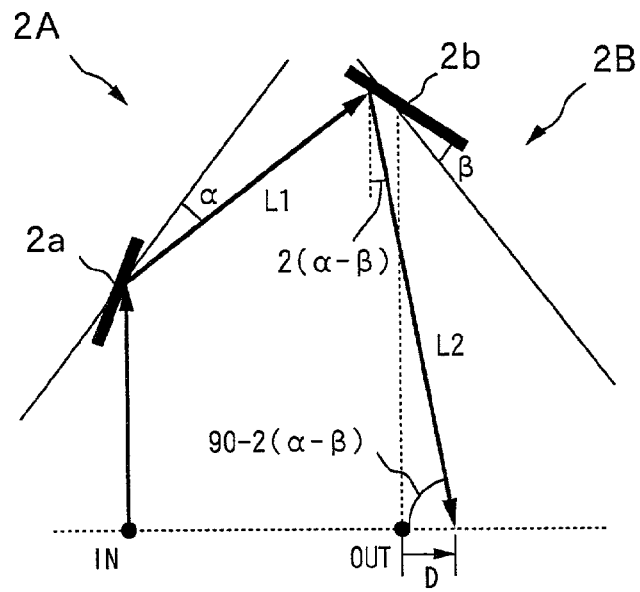
FIG. 6 is a view for explaining the procedure to be executed in a computing section in the first embodiment, in which FIG. 6A schematically shows an optical path in an X-axis direction.
FIG. 6B shows a geometrically equivalent relationship concerning the state of FIG. 6A.

Firstly, as shown in FIG. 6A, an input point of the optical signal to be transmitted from the input side collimator array 1A to the MEMS mirror array 2A is denoted by IN, and the MEMS mirror at the input side which reflects the optical signal from the input point IN is denoted by 2a. Further, the MEMS mirror at the output side which again reflects the light from the MEMS mirror 2a is denoted by 2b, and an arriving point on the CCD image sensor 5 when considering an optical coupling state where the light reflected by the MEMS mirror 2b is assumed to be input perpendicularly to the core portion of the output fiber is denoted by OUT. Moreover, a distance from the MEMS mirror 2a to the MEMS mirror 2b is denoted by L1, and a distance from the MEMS mirror 2b to the CCD image sensor 5 is denoted by L2. Note, FIG. 6A shows a state where the arriving point OUT on the CCD image sensor 5 is projected in the propagation direction of the light reflected by the MEMS mirror 2b, for the X-axis direction (i.e., plane perpendicular to the Y-axis). Further, it is assumed that the distances L1, L2 are sufficiently longer than the size of the reflecting surface of each mirror, so that no meaningful errors are caused even when the angles of the respective mirrors are changed.

Figure 6B:
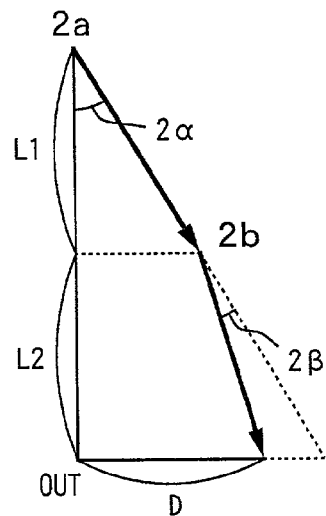

In the above state, considering such a situation that the swing angle of the MEMS mirror 2a is deviated from a previously set value by an angle α and the swing angle of the MEMS mirror 2b is deviated from another previously set value by an angle β, the optical signal reflected by the MEMS mirrors 2a, 2b is received at a position deviated from the arriving point OUT on the CCD image sensor 5 by a distance D. The locus of the optical signal from the reflecting point of the MEMS mirror 2a up to the arriving point on the CCD image sensor 5 is equivalent to the geometric relationship shown in FIG. 6B, so that the distance D can be represented by the following equation (1), using the distances L1, L2 and deviation angles α, β:

$$D = L1 \times \tan 2\alpha + L2 \times \tan 2(\alpha - \beta) \qquad (1).$$

Here, the deviation angles α, β of the MEMS mirrors 2a, 2b are assumed to become extremely small in view of the actual usage state of the mirrors (|α|, |β|<<1), so that the equation (1) can be approximated to the following equation (1)':

$$D = L1 \times 2\alpha + L2 \times 2(\alpha - \beta) \qquad (1)'.$$

Concerning the equation (1)', the distances L1, L2 can be set to be known values, once the arrangement of the MEMS mirrors 2a, 2b are determined. Thus, it becomes possible to calculate the deviation angles of the MEMS mirrors 2a, 2b, respectively, based on the relationship of the equation (1)', using the value of the positional deviation $D_X$ to be detected by the position difference detecting section (X-axis) 6C, according to the following procedures.

Figure 7A:
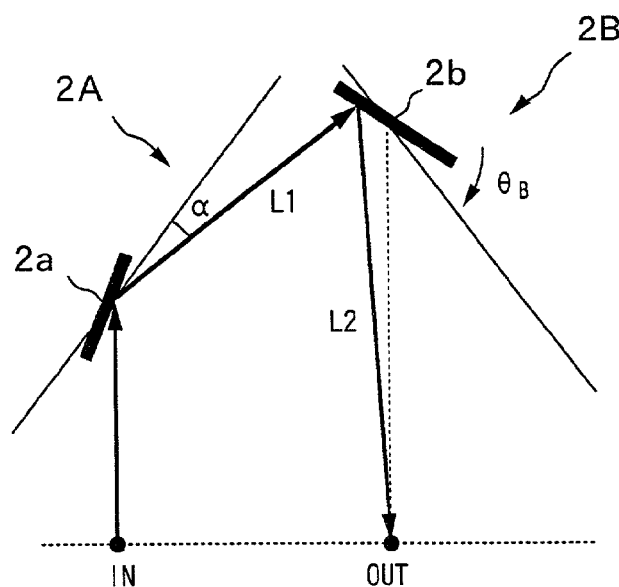
FIG. 7 is a view for explaining a situation where the angle of an output side MEMS mirror is forcibly displaced from the state of FIG. 6, in which FIG. 7A schematically shows an optical path in the X-axis direction.
FIG. 7B shows a geometrically equivalent relationship concerning the state of FIG. 7A.
Figure 7B:
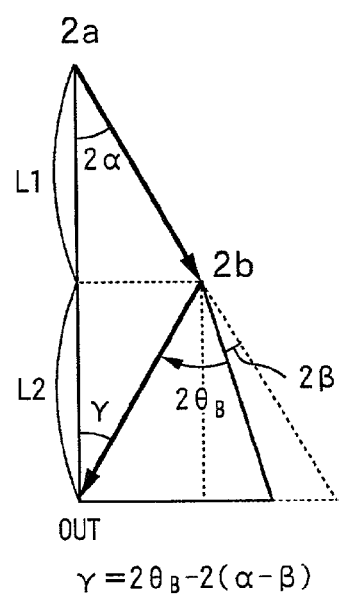

Firstly, the angle of the MEMS mirror 2b is adjusted to thereby bring a state where the optical signal arriving position on the CCD image sensor 5 coincides with the target arriving point OUT. To be specific, the angle of the MEMS mirror 2b is forcibly shifted until the value of the positional deviation $D_X$ to be detected by the position difference detecting section (X-axis) 6C becomes zero. FIG. 7A shows such a state in the same manner as in FIG. 6A, and FIG. 7B shows a geometrically equivalent relationship of FIG. 7A. At this time, the adjusted (shifted) angle $\theta_B$ concerning the MEMS mirror 2b can be recognized by monitoring a change amount in the applied voltage at the MEMS mirror driver 6H, based on the output information from the applied voltage reading section 6I. Further, in such a state, the following equation (2) can be established, based on the geometric relationship of FIG. 7B:

$$L1 \times \tan 2\alpha = L2 \times \tan \gamma = L2 \times \tan\{2\theta_B - 2(\alpha - \beta)\}$$

$$L1 : L2 = \tan\{2\theta_B - 2(\alpha - \beta)\} : \tan 2\alpha \qquad (2).$$

Assuming now that |α|, |β|<<1, the relationship of the equation (2) can be approximated to the following equation (2)':

$$L1 : L2 = 2\theta_B - 2(\alpha - \beta) : \tan 2\alpha \qquad (2)'.$$

Figure 8A:
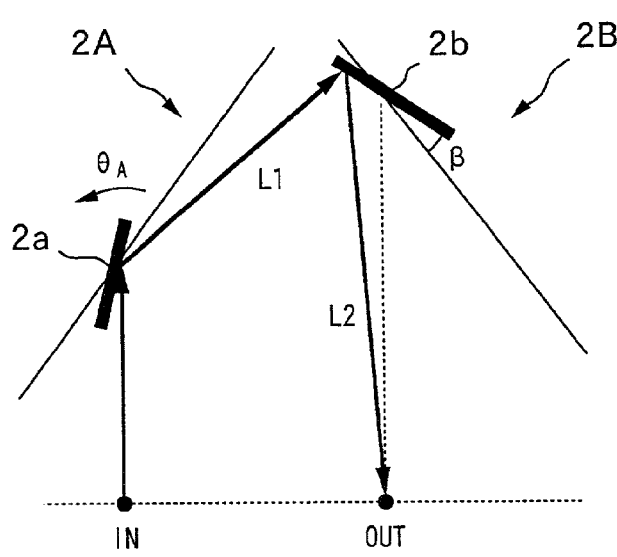
FIG. 8 is a view for explaining a situation where the angle of an input side MEMS mirror is forcibly displaced from the state of FIG. 6, in which FIG. 8A schematically shows an optical path in the X-axis direction.
FIG. 8B shows a geometrically equivalent relationship concerning the state of FIG. 8A.
Figure 8B:
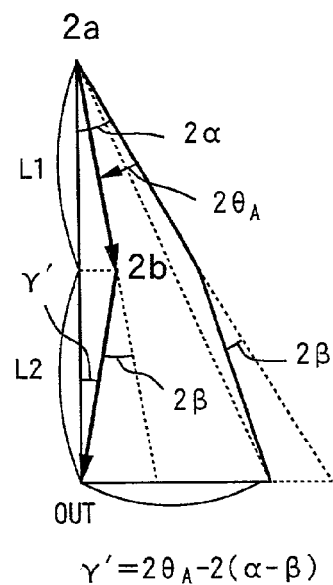

Next, the angle of the MEMS mirror array 2B is brought back o the former state (i.e., the state deviated by the angle β), and then the angle of the MEMS mirror 2a is adjusted to thereby bring a state where the optical signal arriving position on the CCD image sensor 5 coincides with the target arriving point OUT. To be specific, the angle of the MEMS mirror 2a is forcibly shifted until the value of the positional deviation $D_X$ to be detected by the position difference detecting section (X-axis) 6C becomes zero, similarly to the situation of the MEMS mirror 2b. FIG. 8A shows such a state in the same manner as in FIG. 6A, and FIG. 8B shows a geometrically equivalent relationship of FIG. 8A. At this time, the adjusted (shifted) angle $\theta_A$ concerning the MEMS mirror 2a can be also recognized by monitoring a change amount in the applied voltage at the MEMS mirror driver 6G, based on the output information from the applied voltage reading section 6I. Further, in such a state, the following equation (3) can be established, based on the geometric relationship of FIG. 8B:

$$L1 \times \tan 2(\alpha-\theta_A) = L2 \times \tan \gamma' = L2 \times \tan \{2\theta_A - 2(\alpha-\beta)\}$$

$$L1:L2 = \tan \{2\theta_A - 2(\alpha-\beta)\} : \tan 2(\alpha-\theta_A) \qquad (3).$$

Here, assuming that $|\alpha|$, $|\beta| \ll 1$, the equation (3) can be approximated to the following equation (3)':

$$L1:L2 = 2\theta_A - 2(\alpha-\beta) : 2(\alpha-\theta_A) \qquad (3)'.$$

Based on the thus obtained relationships of the equation (2)' and equation (3)', the simultaneous equations concerning the unknown quantities $\alpha$ and $\beta$ are solved, to thereby calculate the deviation angles $\alpha$, $\beta$ concerning the MEMS mirrors 2a, 2b, respectively. Then, controlling signals are generated for determining the voltages to be applied by the MEMS mirror drivers 6G, 6H such that the deviation angles $\alpha$, $\beta$ are corrected, and these controlling signals are sent to the MEMS mirror drivers 6G, 6H via the D/A conversion sections 6E, 6F, respectively, to thereby correct the angles of the MEMS mirrors 2a, 2b, respectively.

In accordance with the aforementioned series of procedures, by correcting angle deviations in the X-axis direction and Y-axis direction for cooperatively paired MEMS mirrors of the MEMS mirror arrays 2A, 2B, the optical signal reflected by each of MEMS mirror arrays 2A, 2B is input perpendicularly to the core portion of the associated output fiber via the output side collimator array 1B.

According to the first embodiment as described above, the position information concerning the optical signals reflected by the MEMS mirror arrays 2A, 2B is detected using the CCD image sensor 5, and the deviation angles of the MEMS mirrors at the input and output sides are automatically corrected based on the position information, to thereby realize the optical switching device having a lower optical loss and a higher precision. Thereby, it becomes possible to develop a downsized optical switching apparatus or optical switch having a larger capacity.

Meanwhile, in the correcting method of deviation angles of MEMS mirrors according to the first embodiment, when there is not any positional deviation to be detected by the position difference detecting sections 6C, 6D (i.e., $D_X$, $D_Y$=0) in the state of starting the control, it is impossible to obtain the angles $\theta_A$, $\theta_B$ by forcibly shifting the angles of the respective MEMS mirrors, and it is difficult to judge whether the optical signal is input perpendicularly to the core of the output fiber ("OK" state in FIG. 46B) or obliquely ("NG2" state in FIG. 46B).

Figure 9:
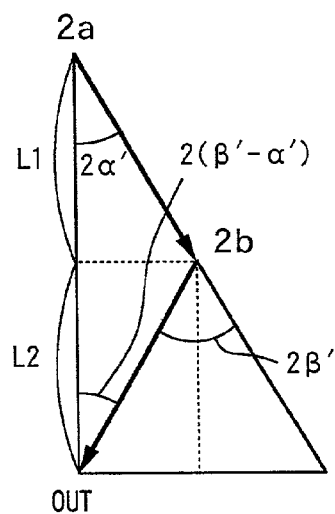
FIG. 9 shows a geometrically equivalent relationship concerning a state where no positional deviations are caused when starting the control in the first embodiment of the present invention.

In such a situation, for example, as shown in the equivalent relationship of FIG. 9, correction angles of the input side MEMS mirror 2a and output side MEMS mirror 2b are made $\alpha'$, $\beta'$, and the correction angles $\alpha'$, $\beta'$ are simultaneously changed by arbitrary angles that satisfy the relationship of the following equation (4), so that the input state of optical signal to the output fiber can be judged:

$$\alpha':\beta' = L2:(L1+L2) \qquad (4).$$

Namely, when no meaningful positional deviations are detected by the position difference detecting sections 6C, 6D even if the correction angles $\alpha'$, $\beta'$ are simultaneously changed, it is possible to judge that the optical signal is input perpendicularly to the core of the output fiber. In such a case, the angles of MEMS mirrors 2a, 2b may be brought back to the original states, respectively. On the other hand, if there is newly detected any positional deviation by simultaneously changing the correction angles $\alpha'$, $\beta'$, it can be judged that the optical signal is input obliquely to the core of the output fiber. In such a case, the angles of the MEMS mirrors may be corrected in accordance with the correcting method in the aforementioned first embodiment, based on the state where the positional deviation is detected.

Further, as another method to deal with the situation where no positional deviations have been caused when starting the control, it is possible to move only the output side MEMS mirror to thereby judge the input state of optical signal to the output fiber. To be specific, in the situation where the optical signal is input perpendicularly to the core of the output fiber, the following equation (5) represents the relationship between the correction angle $\beta'$ of the output side MEMS mirror and the positional deviation D to be detected at the pertinent position difference detecting section:

$$D = L2 \times \tan 2\beta' \approx L2 \times 2' \qquad (5).$$

Thus, when the positional deviation D to be detected at the position difference detecting section when the angle of the output side MEMS mirror was changed, is not changed in accordance with the equation (5), the optical signal is being input obliquely to the core of the output fiber. In such a case, the angles of the respective MEMS mirrors may be corrected in accordance with the correcting method in the aforementioned first embodiment, based on the state where the positional deviation is caused.

Moreover, the input state of optical signal to the core of output fiber can be judged based on the image obtained by the CCD image sensor 5. Namely, as shown in the lower part of FIG. 10, the image to be obtained by the CCD image sensor 5 is changed corresponding to the input state (OK, NG1 through NG3). Thus, when no positional deviations are caused in the state of starting the control, the image from the CCD image sensor 5 causes a geometric shape difference such as shown by "OK" and "NG2". The discrimination of such a geometric shape difference can be realized by applying a known image processing technique.

Figure 11:
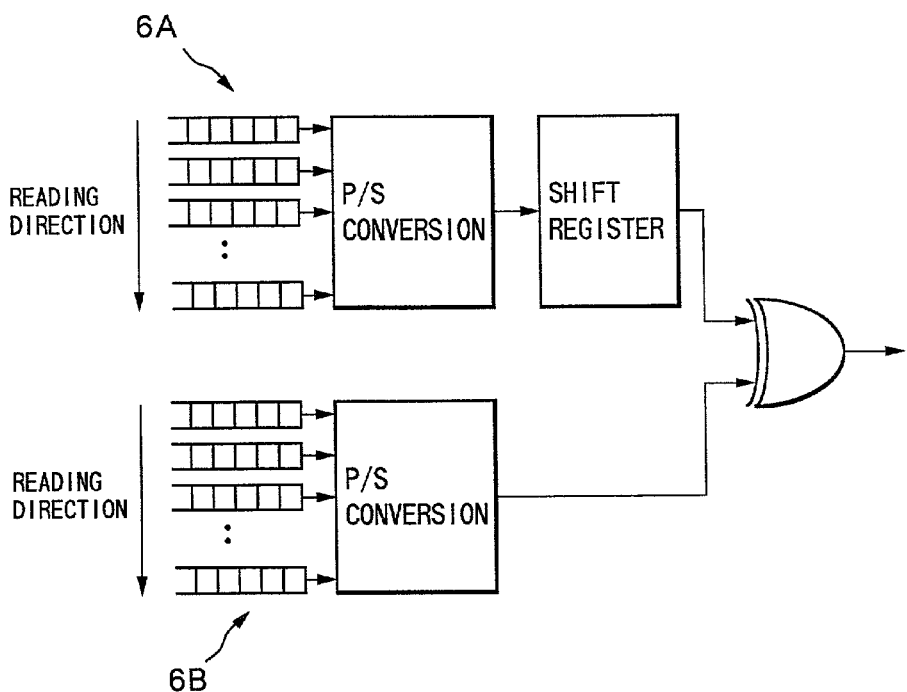
FIG. 11 is a view explaining an example of a specific processing method of the image obtained by the CCD image sensor.

In a specific image processing method as shown in FIG. 11, various information stored in the position information storage section 6A and initial position information storage section 6B are read out serially, and the position information from the position information storage section 6A side is input to an exclusive OR circuit via a shift register circuit, while the initial position information from the initial position information storage section 6B side is directly input to the exclusive OR circuit. If all of the outputs from the exclusive OR circuit are low levels, this means that the geometric shape represented by the initial position information coincides with the geometric shape of the image obtained by the CCD image sensor 5.

When the state of "NG2" is judged by the aforementioned image processing, the angle of the corresponding MEMS mirror is changed to bring a situation where a meaningful positional deviation is detected by the position difference detecting section, so that the angles of the respective MEMS mirrors may be corrected in accordance with the correcting method in the aforementioned first embodiment.

In addition, when the input state of optical signal to the core of the output fiber is judged by utilizing the image obtained by the CCD image sensor 5, it becomes possible to simplify the correcting method in the first embodiment.

Figure 10:
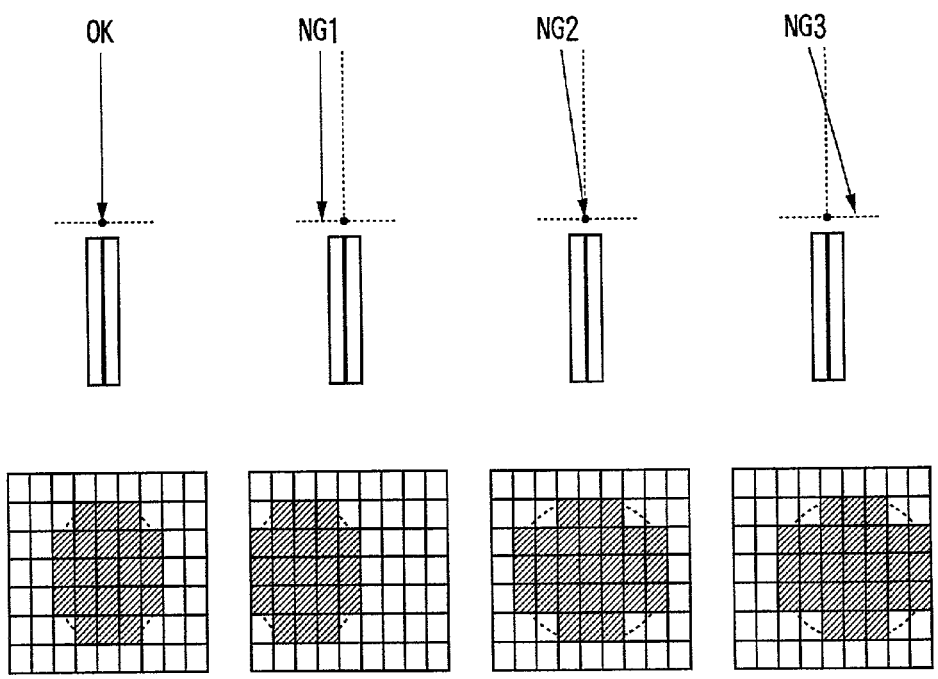
FIG. 10 is a view showing examples of images obtained by a CCD image sensor concerning the first embodiment.
Figure 12:
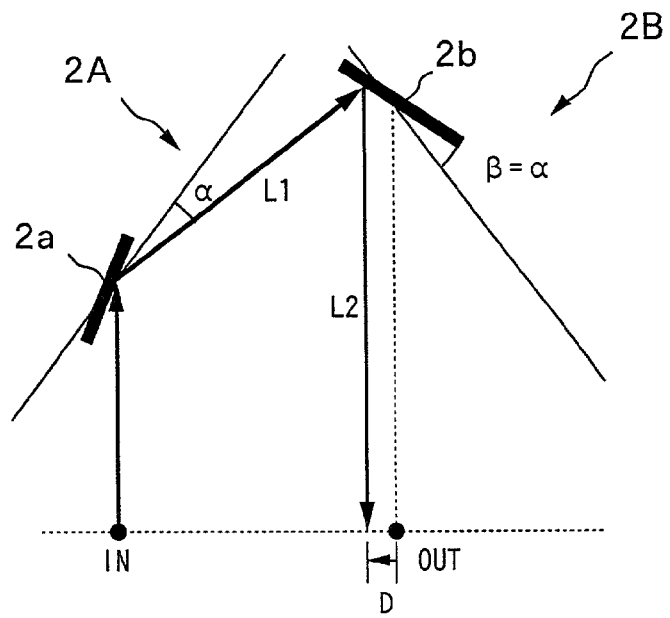
FIG. 12 is a view schematically showing an optical path in the state of "NG1" in FIG. 10.

Namely, in FIG. 10, the geometric shape of the image from the CCD image sensor 5 in case of "OK" state where an optical signal is input perpendicularly to the output fiber is identical with the geometric shape of the image from the CCD image sensor 5 in case of "NG1" state where an optical signal is input perpendicularly to the optical fiber but causing a positional deviation. Thus, in a case where a meaningful positional deviation is detected by the position difference detecting section and also an input in a perpendicular direction is detected by image processing, it is possible to judge the state of "NG1". In this "NG1" state, the deviation angle α of the input side MEMS mirror 2a substantially coincides with the deviation angle β of the output side MEMS mirror 2b (i.e., α=β), as shown in FIG. 12. Taking notice of the state of α=β, it becomes possible to correct the deviation while moving the respective MEMS mirrors 2a, 2b by the same angle. To be specific, the correction angle α'=β' of each of MEMS mirrors 2a, 2b can be represented by the following equation (6) making use of the positional deviation D to be detected by the position difference detecting section, based on the aforementioned equation (1)':

$$\alpha' = \beta' = L1/(2 \times D) \qquad (6).$$

Thereby, it becomes possible to determine the correction angle corresponding to the detection result of the position difference detecting section, without executing the processing for solving the aforementioned simultaneous equations (2)' and (3)'.

Moreover, the following application is possible, in simplifying the correcting method of deviation angle of each MEMS mirror in the first embodiment.

For example, when the relationship of L1<<L2 is established for the arrangement of the MEMS mirror arrays 2A, 2B and CCD image sensor 5, the relationship represented by the aforementioned equation (1)' can be further approximated to the following equation (1)":

$$D = 2(\alpha - \beta) \times L2 \qquad (1)''.$$

In such a case, it is possible to easily realize the reduction of optical loss, by correction controlling the angle deviation only of the respective MEMS mirrors of the output side MEMS mirror array 2B. Note, in the above case, it is enough to set the correction angle β' of the output side MEMS mirror such that β'=α−β/=D/(2×L2).

Further, for example, when the relationship of L2<<L1 is established, the relationship represented by the aforementioned equation (1)' can be further approximated to the following equation (1)''':

$$D = 2 \times \alpha \times L1 \qquad (1)'''.$$

In such a case, it is possible to easily realize the reduction of optical loss, by correction controlling the angle deviation only of the respective MEMS mirrors of the input side MEMS mirror array 2A. Note, in the above case, it is enough to set the correction angle α' of the input side MEMS mirror such that α'=D/(2×L1).

There will be described hereinafter a controlling apparatus of an optical switching device according to a second embodiment of the present invention.

Figure 13:
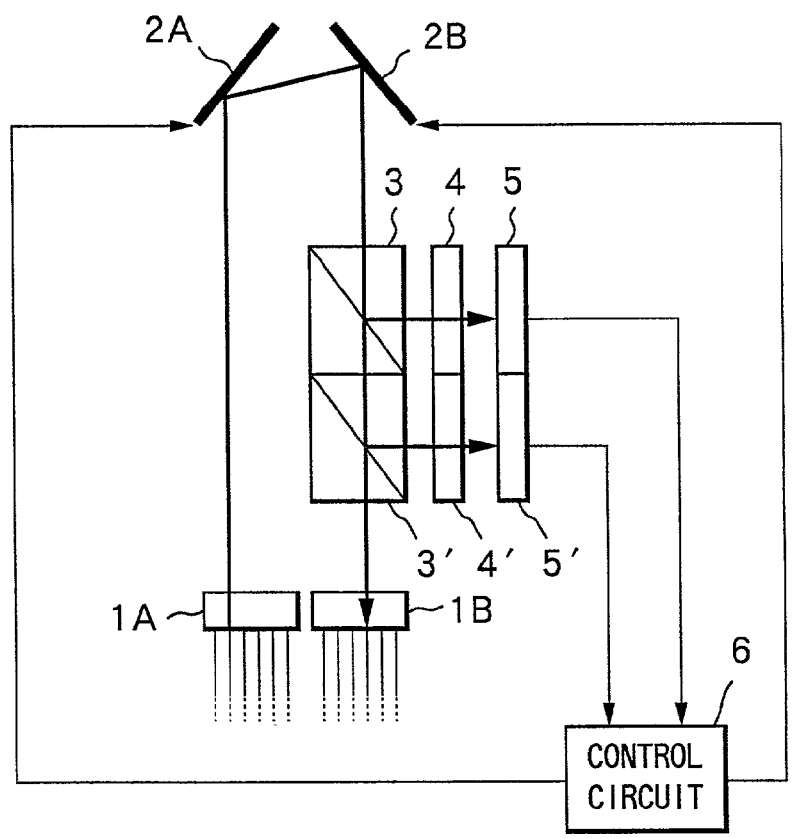
FIG. 13 is a schematic view showing a constitution of an essential part of a controlling apparatus of an optical switching device according to a second embodiment of the present invention.

FIG. 13 is a schematic view showing a constitution of an essential part of the controlling apparatus of the optical switching device according to the second embodiment. Like reference numerals as used in the first embodiment are used to denote identical elements in the second embodiment, and the same rule applies corresponding to the following.

In FIG. 13, the second embodiment is constituted such that a beam splitter 3' is additionally disposed between the beam splitter 3 and collimator array 1B to the constitution in the aforementioned first embodiment. Light branched by the beam splitter 3' is received by a CCD image sensor 5' via a lens array 4' to generate another position information concerning each optical signal reflected by the MEMS mirror arrays 2A, 2B. Note, the additionally provided beam splitter 3', lens array 4' and CCD image sensor 5' are the same as those beam splitter 3, lens array 4 and CCD image sensor 5 used in the first embodiment.

In the above constitution, respective position information having optical path lengths different from each other are generated by two sets of beam splitters, lens arrays and CCD image sensors, to thereby perform the correction of deviation angles of the respective MEMS mirror arrays 2A, 2B based on the respective position information. According to this correcting method of deviation angles, the correction angles of the input side and output side MEMS mirrors are uniquely determined by the values of positional deviations D, D' to be detected corresponding to the respective position information obtained by the CCD image sensors 5, 5', respectively, to thereby eliminate the necessity to forcibly move the MEMS mirrors such as in the first embodiment.

To be specific, similarly to the processing shown in FIG. 6, the deviation angles of the input side MEMS mirror 2A and output side MEMS mirror 2b are supposed to be α and β, respectively, and the distances from the MEMS mirror 2a to MEMS mirror 2b and from the MEMS mirror 2b to the CCD image sensor 5 are supposed to be L1 and L2, respectively. Further, herein, the distance from the MEMS mirror array 2B to the CCD image sensor 5' is supposed to be L2'. In this case, the positional deviations D, D' to be detected by using the images obtained by the CCD image sensors 5, 5' can be represented by the following equations (7) and (8) based on distances L1, L2, L2' and deviation angles α, β:

$$D = L1 \times \tan 2\alpha + L2 \times \tan 2(\alpha - \beta) \qquad (7), \text{and}$$

$$D' = L1 \times \tan 2\alpha + L2' \times \tan 2(\alpha - \beta) \qquad (8).$$

Further, assuming that |α|, |β|<<1, the relationships of the equations (7) and (8) can be approximated to the following equations (7)' and (8)':

$$D = L1 \times 2\alpha + L2 \times 2(\alpha - \beta) = 2 \times (L1 + L2) \times \alpha - 2 \times L2 \times \beta \qquad (7)'\text{and}$$

$$D' = L1 \times 2\alpha + L2' \times 2(\alpha - \beta) = 2 \times (L1 + L2') \times \alpha - 2 \times L2' \times \beta \qquad (8)'.$$

Based on the relationships of equations (7)' and (8)', it is possible to solve simultaneous equations concerning the unknown quantities α and β. Further, the voltages to be applied to the MEMS mirror drivers are determined such that the thus calculated deviation angles α, β are corrected, to thereby perform the angle correction of MEMS mirrors 2a, 2b.

In this wary, according to the second embodiment, the respective position information having optical path lengths different from each other can be obtained by two sets of beam splitters, lens arrays and CCD image sensors, so that the angle correction of MEMS mirrors 2a, 2b can be performed with a higher precision. Further, differently from the first embodiment, it becomes unnecessary to perform such an operation to forcibly move the angles of MEMS mirrors 2a, 2b, so that the controlling speed can be also increased.

There will be now referred to application examples of the second embodiment.

Figure 14:
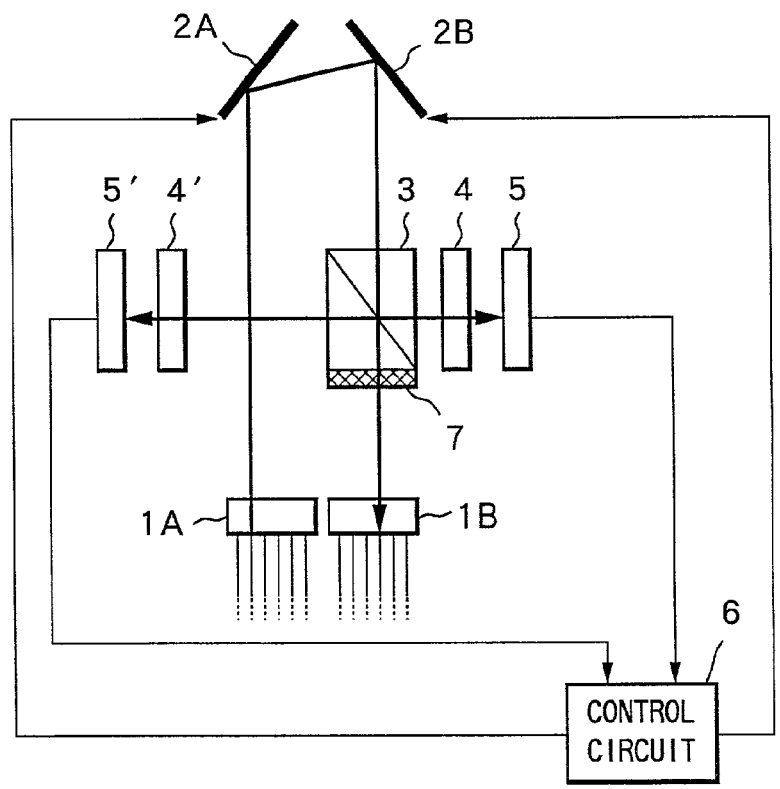
FIG. 14 is a schematic view showing a constitution of an essential part of a first application example related to the second embodiment.

FIG. 14 is a schematic view showing a constitution of an essential part of a first application example related to the second embodiment.

Instead of the beam splitter 3' used in the second embodiment, a half mirror 7 is mounted on the beam splitter 3 in the first application example shown in FIG. 14, such that a part of the optical signal reflected back by the half mirror 7 is received by the CCD image sensor 5' via the lens array 4' to generate the position information. In this case, the distance L2' from the MEMS mirror 2*b* up to the CCD image sensor 5' comprises such a length passing through the MEMS mirror 2*b*, beam splitter 3, half mirror 7, beam splitter 3, and CCD image sensor 5'. In such a constitution, it is also possible to obtain the same effect as the second embodiment.

Figure 15:
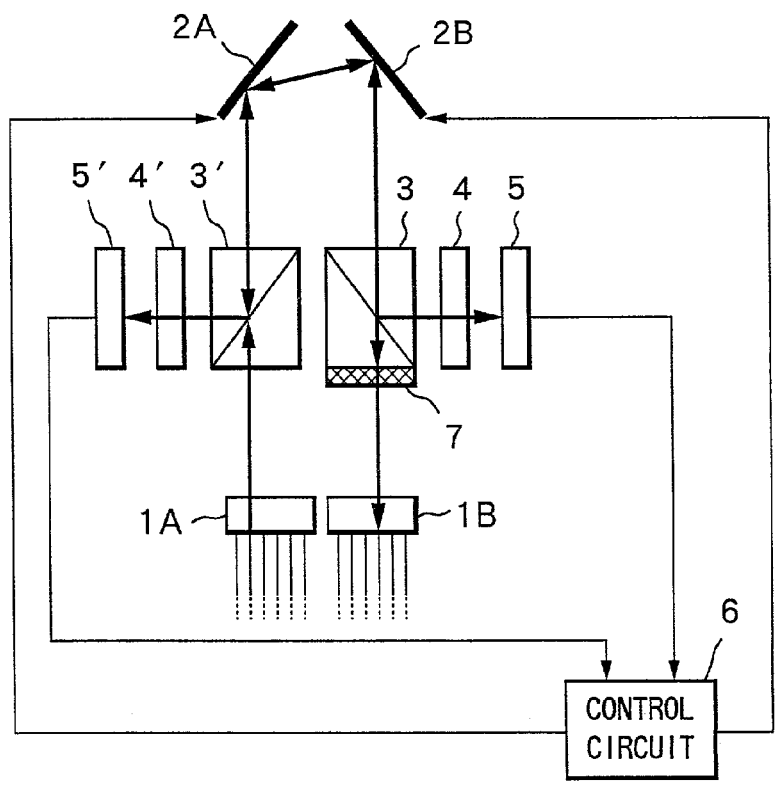
FIG. 15 is a schematic view showing a constitution of an essential part of a modified example of the application example of FIG. 14.

In the constitutional example of FIG. 14, the light reflected back by the half mirror 7 and then branched by the beam splitter 3 is received by the CCD image sensor 5'. However, such as shown in FIG. 15, it is also possible to arrange the beam splitter 3' between the input side collimator array 1A and MEMS mirror array 2A, such that the optical signal reflected back by the half mirror 7, then reflected by the MEMS mirror arrays 2B, 2A and thereafter branched by the beam splitter 3' is received by the CCD image sensor 5'.

Figure 16:
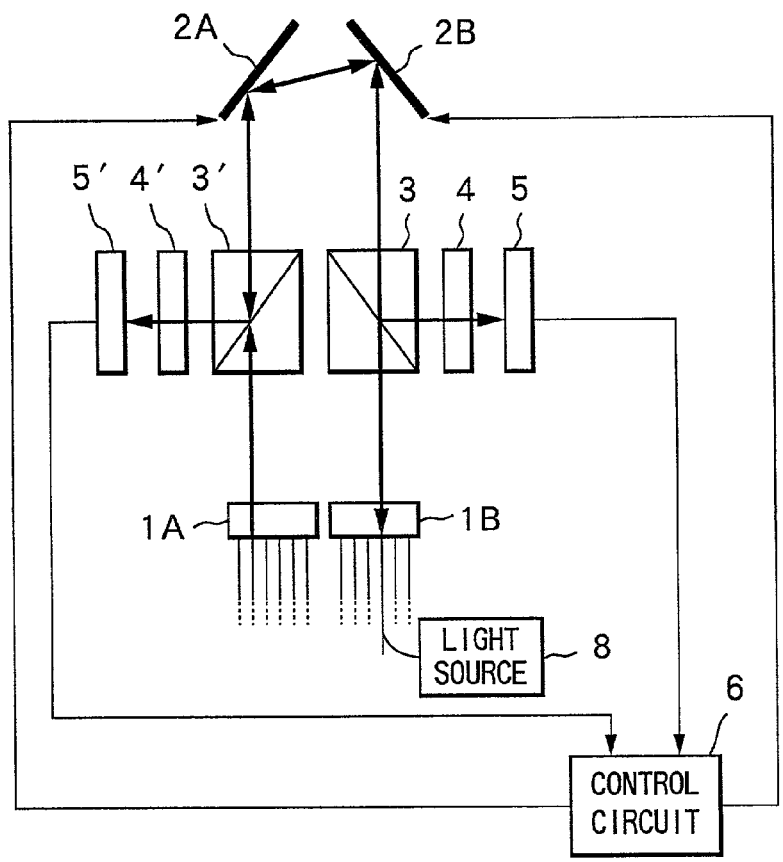
FIG. 16 is a schematic view showing a constitution of an essential part of a second application example related to the second embodiment.

FIG. 16 is a schematic view showing a constitution of an essential part of a second application example related to the second embodiment of the present invention.

In the second application example of FIG. 16, a light source 8 is separately connected to each output side collimator or to the output fiber connected to such a collimator. Light emitted from the light source 8 is propagated from the output side collimator toward the beam splitter 3, output side MEMS mirror array 2B, input side MEMS mirror array 2A and beam splitter 3', and the light branched by the beam splitter 3' is received by the CCD image sensor 5' via the lens array 4' to generate the position information. In this case, the positional deviation D to be detected using the image obtained by the CCD image sensor 5 can be represented by the following equation (9), while the positional deviation D' to be detected using the image obtained by the CCD image sensor 5' can be represented by the following equation (10):

$$D = L1 \times \tan 2\alpha + L2 \times \tan 2(\alpha-\beta) \approx L1 \times 2\alpha + L2 \times 2(\alpha-\beta) \quad (9),$$

and $$D' = L1 \times \tan 2\beta + L3 \times \tan 2(\alpha-\beta) \approx L1 \times 2\beta + L3 \times 2(\alpha-\beta) \quad (10),$$

wherein L3 is a distance from the input side MEMS mirror to the CCD image sensor 5'. In this constitution, it is also possible to obtain the same effect as the second embodiment.

Figure 17:
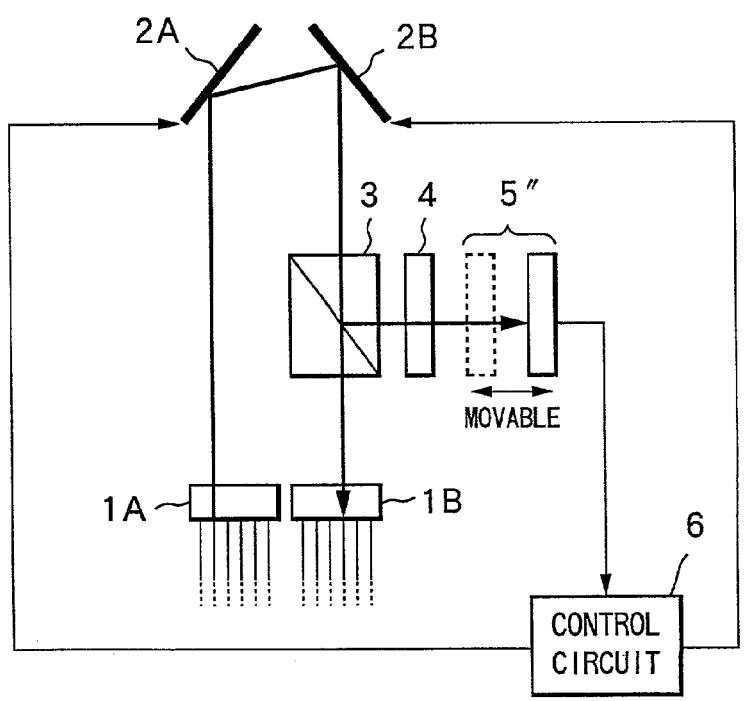
FIG. 17 is a schematic view showing a constitution of an essential part of a third application example related to the second embodiment.

FIG. 17 is a schematic view showing a constitution of an essential part of a third application example related to the second embodiment.

In the third application example of FIG. 17, the position of the light receiving surface of the CCD image sensor 5 for receiving the light branched by the beam splitter 3 is rendered to be movable in the light propagation direction, so that the respective position information concerning the different optical path lengths can be obtained while omitting the beam splitter 3', lens array 4' and CCD image sensor 5' used in the second embodiment. In this case, the distance L2 from the output side MEMS mirror to the CCD image sensor 5 is changed in accordance with the position of the light receiving surface of the CCD image sensor 5, to detect the positional deviations D, D' of the optical signal based on the images obtained at the respective positions of the light receiving surface.

There will be described hereinafter a controlling apparatus of an optical switching device according to a third embodiment of the present invention.

In the aforementioned first and second embodiments, there have been described cases where the angle correction of each MEMS mirror array is performed based on the position information of the optical signal detected by using the CCD image sensor. Differently from these cases, there will be described in the third embodiment such a case where the power of optical signal coupled to the output fiber is monitored, to thereby perform the angle correction of each MEMS mirror based on the monitoring result.

Figure 18:
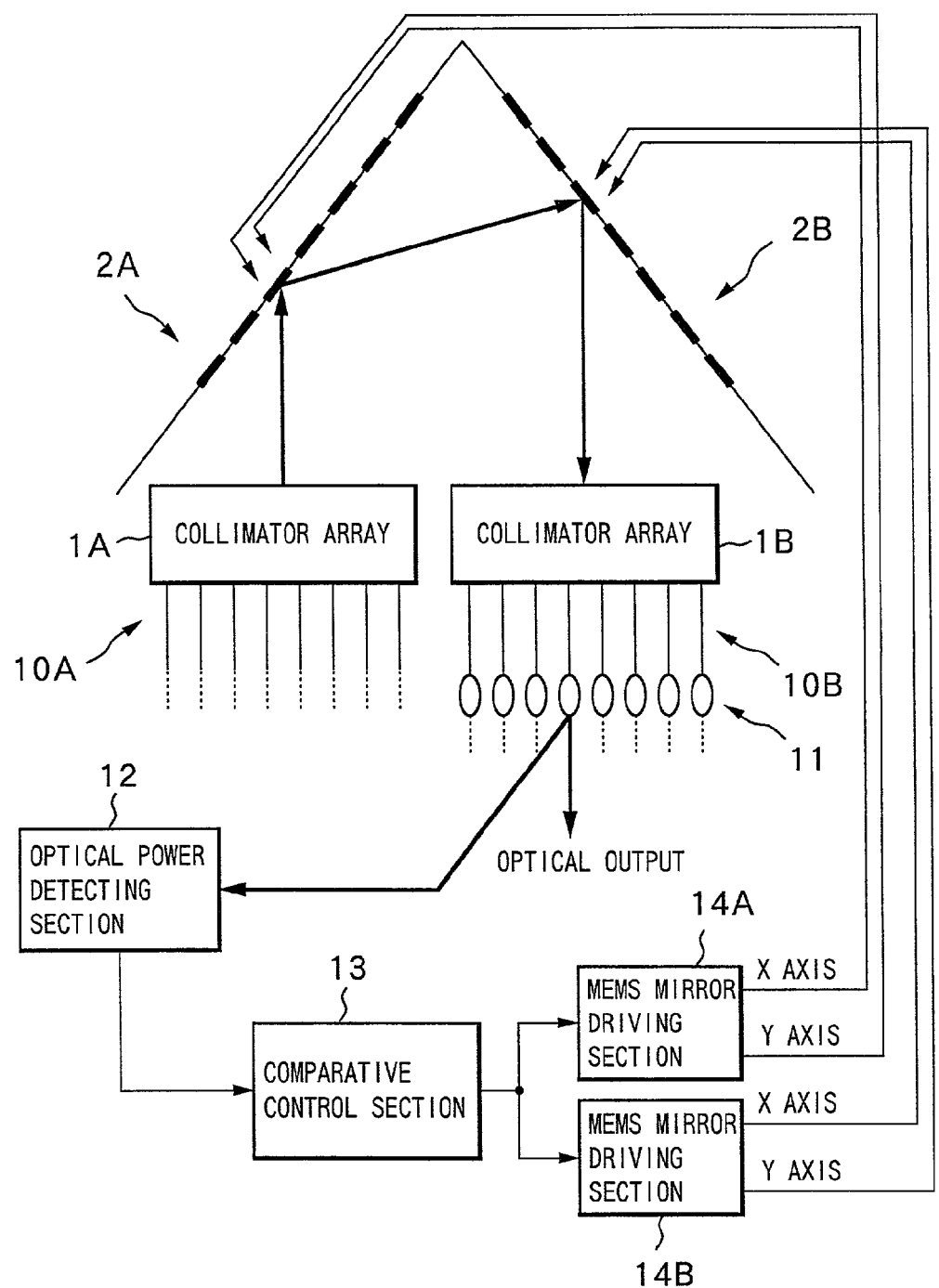
FIG. 18 is a schematic view showing a whole constitution of a controlling apparatus of an optical switching device according to a third embodiment of the present invention.

FIG. 18 is a schematic view showing a whole constitution of the controlling apparatus of the optical switching device according to the third embodiment of the present invention.

Similarly to the conventional constitution shown in FIG. 45, in the whole constitution of the third embodiment in FIG. 18, there is provided a controlling apparatus comprising: an optical coupler array 11 provided at the succeeding stage of the output fiber array 10B connected to the output side collimator array 1B; an optical power detecting section 12 for detecting the power of the light branched by each optical coupler of the optical coupler array 11; and a comparative control section 13 for judging the coupling state of the optical signal to the output fiber based on the detection result of the optical power detecting section 12 to thereby control MEMS mirror driving sections 14A, 14B, concerning a three-dimension type optical switching device constituted by combining two collimator arrays 1A, 1B each having a plurality of collimators two-dimensionally arranged and two MEMS mirror arrays 2A, 2B each having a plurality of MEMS mirrors two-dimensionally arranged so as to correspond to the plurality of collimators, similarly to the conventional constitution shown in FIG. 45. Here, it is noted that the MEMS mirror array 2A corresponds to a first mirror array, the MEMS mirror array 2B a second mirror array, the MEMS mirror driving section 14A a first mirror driving section, and the MEMS mirror driving section 14B a second mirror driving section.

The optical coupler array 11 is arranged with a plurality of optical couplers corresponding to the output fibers of the output fiber array 10B, such that a part of the optical signal propagated through each output fiber is branched by each optical coupler and sent to the optical power detecting section 12.

Figure 19:
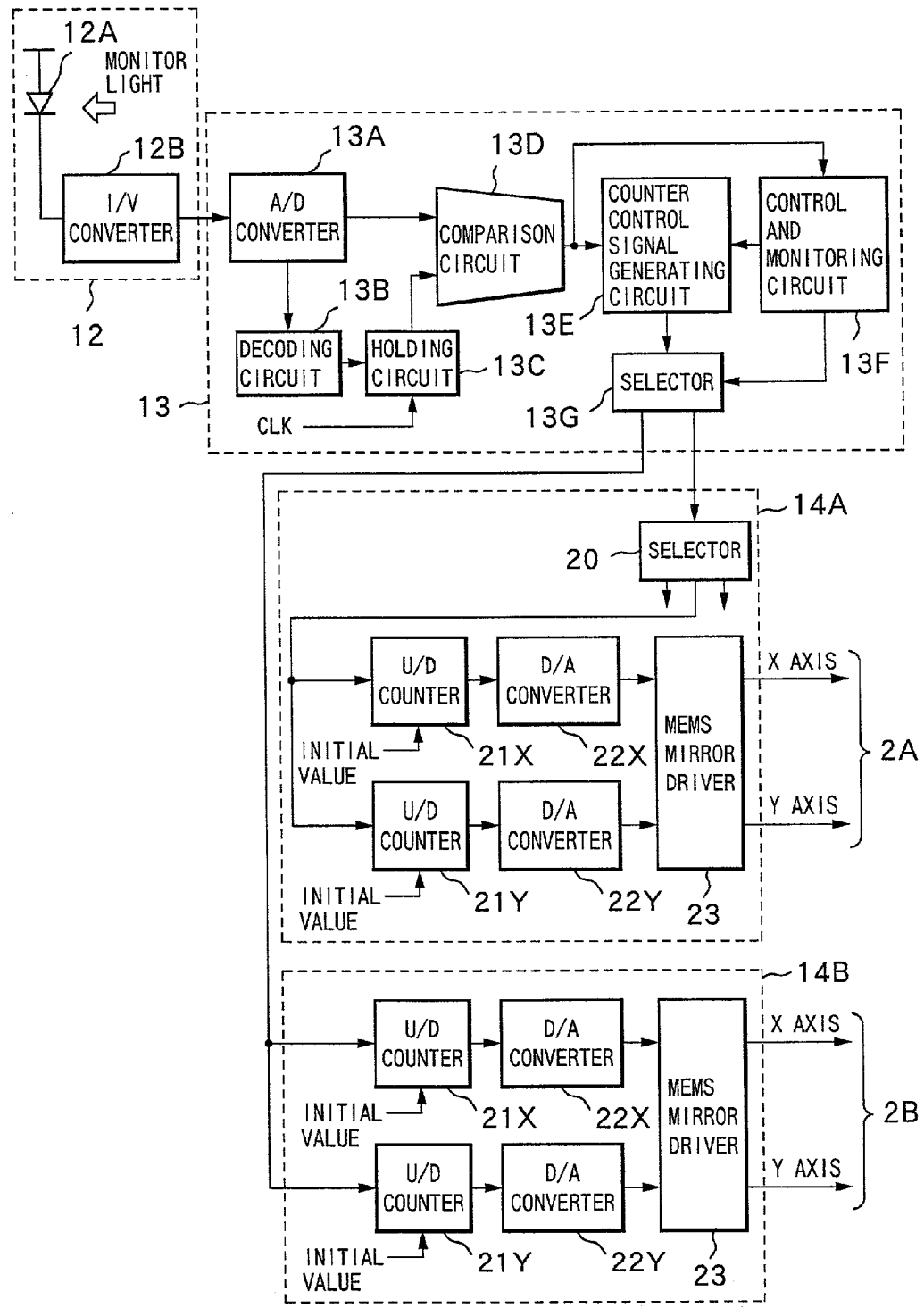
FIG. 19 is a block diagram showing a specific exemplary constitution concerning an optical power detecting section, a comparative control section and an MEMS mirror driving section in the third embodiment.

Such as shown at the upper left part of FIG. 19, the optical power detecting section 12 includes: a photodetector 12A for receiving a monitor light branched by each optical coupler of the optical coupler array 11 to generate an electric current signal corresponding to the power of the received monitor light; and an I/V converter 12B for converting the electric current signal output from the photodetector 12A into a voltage signal. FIG. 19 shows only a pair of photodetector 12A and I/V converter 12B. However, the optical power detecting section 12 shall be actually provided with a predetermined number of pairs of photodetectors 12A and I/V converters 12B, corresponding to the respective optical couplers of the optical coupler array 11, i.e., corresponding to the number of output channels of the optical switching device.

Such as shown at the upper center of FIG. 19, the comparative control section 13 includes an A/D converter 13A, a decoding circuit 13B, a holding circuit 13C, a comparison circuit 13D, a counter control signal generating circuit 13E, a control and monitoring circuit 13F and a selector 13G. FIG. 19 shows only the constitution corresponding to one output channel. However, the comparative control section 13 shall be actually provided with a predetermined number of identical constitutions corresponding to the number of output channels of the optical switching device.

The A/D converter 13A is a typical electric circuit for converting an analog voltage signal output from the optical power detecting section 12 into a digital signal. The converted digital voltage signal is sent to one of the input terminals of the comparison circuit 13D and to the decoding circuit 13B. The decoding circuit 13B decodes the digital signal from the A/D converter 13A, to output the decoded digital signal to the holding circuit 13C. The holding circuit 13C is input with a clock signal CLK of a required frequency, so as to hold the output signal from the decoding circuit 13B for a previously set constant period of time and to then send the thus held signal to the other input terminal of the comparison circuit 13D. The period of time during which the signal is held at the holding circuit 13C shall be set to correspond to the period of time for completing one cycle of the feedback control of each MEMS mirror to be described later.

The comparison circuit 13D is to perform comparison between voltage values represented by digital signals sent from the A/D converter 13A and holding circuit 13C, respectively, and to transmit the comparison result to the counter control signal generating circuit 13E and control and monitoring circuit 13F. Specifically, the comparison circuit 13D outputs a "high" level signal when for example, the digital value (voltage value after control) from the A/D converter 13A is larger than the digital value (voltage value before control) from the holding circuit 13C, while outputs a "low" level signal when smaller.

The counter control signal generating circuit 13E generates counter control signals corresponding to the levels of the output signals from the comparison circuit 13D. The counter control signals are to control the counted values of U/D counters 21X, 21Y to be described later, of each of MEMS mirror driving sections 14A, 14B. Herein, the counter control signals generated at the counter control signal generating circuit 13E are distributed to corresponding MEMS mirror driving sections 14A, 14B via the selector 13G.

The control and monitoring circuit 13F generates a command to determine as to whether the counter control signal generating circuit 13E is to provide a counter control signal for increasing the counted value (hereinafter called "counter Up signal") to the level of the output signal from the comparison circuit 13D or a counter control signal for decreasing the counted value (hereinafter called "counter Down signal") in accordance with the output signal from the comparison circuit 13D, to notify this command to the counter control signal generating circuit 13E and selector 13G. There will be later described the reason why such a command is to be notified to the counter control signal generating circuit 13E and selector 13G.

The MEMS mirror driving section 14A drive controls the input side MEMS mirror array 2A of the optical switching device. Specifically, such as shown at the middle part of FIG. 19, the MEMS mirror driving section 14A includes, corresponding to each MEMS mirror of the MEMS mirror array 2A, a selector, a U/D counter 21X and a D/A converter 22X both corresponding to the X-axis direction, a U/D counter 21Y and a D/A converter 22Y both corresponding to the Y-axis direction, and a MEMS mirror driver 23. Further, the MEMS mirror driving section 14B drive controls the output side MEMS mirror array 2B of the optical switching device. Specifically, such as shown at the bottom part of FIG. 19, the MEMS mirror driving section 14B includes, corresponding to each MEMS mirror of the MEMS mirror array 2B, a U/D counter 21X and a D/A converter 22X both corresponding to the X-axis direction, a U/D counter 21Y and a D/A converter 22Y both corresponding to the Y-axis direction, and a MEMS mirror driver 23. Note, each of the MEMS mirror driving sections 14A, 14B in FIG. 19 is shown to include a constitution corresponding to only one MEMS mirror (one channel).

The selector 20 to be provided in the MEMS mirror driving section 14A is: to select the MEMS mirror as a control target among the plurality of MEMS mirrors arranged in the MEMS mirror array 2A, corresponding to the counter control signal from the comparative control section 13, to transmit the counter control signal to a circuit block corresponding to the selected MEMS mirror. The selecting operation of the selector 20 is set by obtaining the information concerning the input channel corresponding to the output channel for the light detected by the optical power detecting section 12. Note, the MEMS mirror driving section 14B is not provided with the aforementioned selector 20. This is because, if an output channel of a light to be detected by the optical power detecting section 12 is determined, the MEMS mirror of the MEMS mirror array 2B corresponding to the output channel to be detected, is specified to one mirror.

Each of the U/D counters 21X provided in MEMS mirror driving sections 14A, 14B increases or decreases the counter value concerning the X-axis direction for the MEMS mirror in accordance with the counter control signal from the comparative control section 13, to output the increased or decreased counter value to the D/A converter 22X. The D/A converter 22X converts the digitally represented counter value from the U/D counter 21X into an analog value, to output it to the MEMS mirror driver. Further, each of the U/D counters 21Y increases or decreases the counter value concerning the Y-axis direction for the MEMS mirror according to the counter control signal from the comparative control section 13, to output the increased or decreased counter value to the D/A converter 22Y. The D/A converter 22Y converts the digitally represented counter value from the U/D counter 21Y into an analog value, to output it to the MEMS mirror driver.

Note, it is desirable that each of the U/D counters 21X, 21Y is given with a previously set counter initial value corresponding to the input and output channels, so as to increase the mirror adjusting speed, i.e., so as to shorten the period of time required for the feedback. The specific method for setting this counter initial value shall be detailed later.

The MEMS mirror driver 23 provided in each of the MEMS mirror driving sections 14A, 14B generates a signal for drive controlling the angle in the X-axis direction or Y-axis direction of the corresponding MEMS mirror, in accordance with the counter value corresponding to the axis direction. The drive controlling signal generated by each of MEMS mirror driving sections 14A, 14B is provided to the corresponding MEMS mirror of each of MEMS mirror arrays 2A, 2B to thereby perform the correction of angle deviation.

There will be described hereinafter the operation of the third embodiment.

Firstly, there will be generally described the relationship between the power of the optical signal coupled to the output fiber and the angles of MEMS mirrors at the input side and output side, with reference to the characteristic diagram shown in FIG. 20.

In the mirror control of the optical signal converter, it is necessary to optimize the angles of the respective MEMS mirrors at the input and output sides, so as to wholly maximize the power of optical signal to be coupled to the output fiber, i.e., so as to minimize the optical loss in the optical signal converter. Meantime, concerning the optical switching device of three-dimension type constitution as shown in FIG. 45, there has been confirmed a characteristic as shown in FIG. 20A such that the optimum point of mirror angle where the output light power becomes a maximum coincides on one coordinate with the values where the output light power concerning the input side MEMS mirror becomes a relative maximum and where the output light power concerning the output side MEMS mirror becomes a relative maximum, and the transition of the output light power relative to the angle change of the input side MEMS mirror is independent of the transition of the output light power relative to the angle change of the output side MEMS mirror.

Although FIG. 20 shows a transition state of output light powers when the angles in the X-axis directions of the input side and output side MEMS mirrors are changed, such a transitional characteristic is identically established when the angles in the Y-axis directions of the input side and output side MEMS mirrors are changed. Moreover, the aforementioned transitional characteristic of the output light power is also identically established, when changing the angle in the X-axis (Y-axis) direction of the input side MEMS mirror and the angle in the Y-axis (X-axis) direction of the output side MEMS mirror, and further when changing the angles in the X-axis direction and Y-axis direction of the MEMS mirror at one of the input side and output side. Although there will be described hereinafter a situation assuming that the angles in the X-axis directions of the input side and output side MEMS mirrors are changed (while fixing the angles in the Y-axis directions), such a description can be similarly applied to other combinations than noted just above.

Figure 20A:
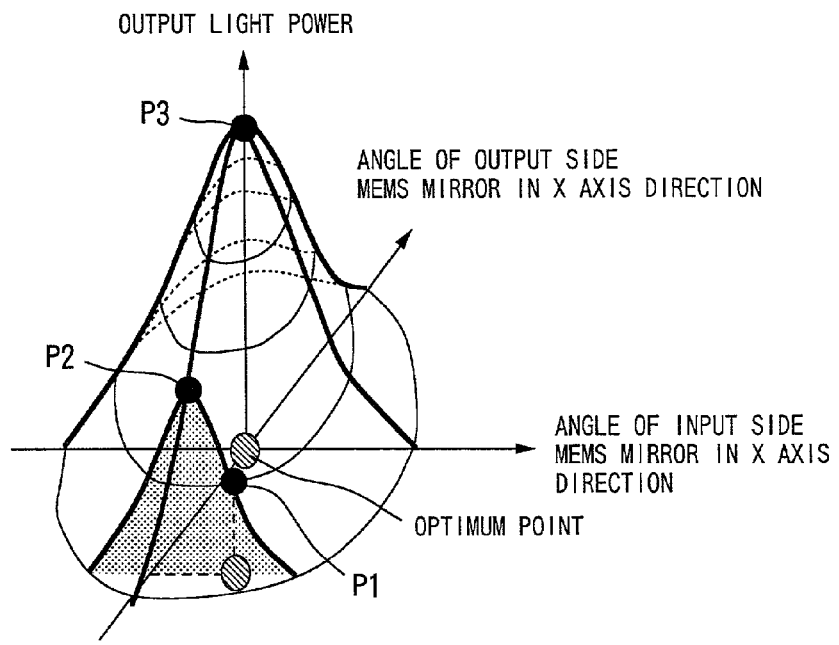
FIG. 20 is a view showing a relationship among an optical signal power coupled to an output fiber and angles of respective MEMS mirrors concerning a three-dimension type optical switching device.
Figure 20B:
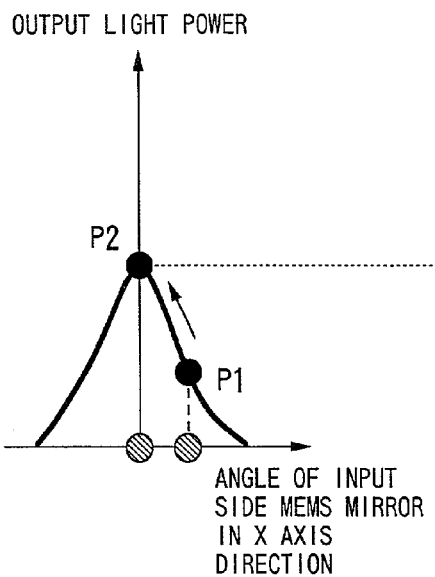
Figure 20C:
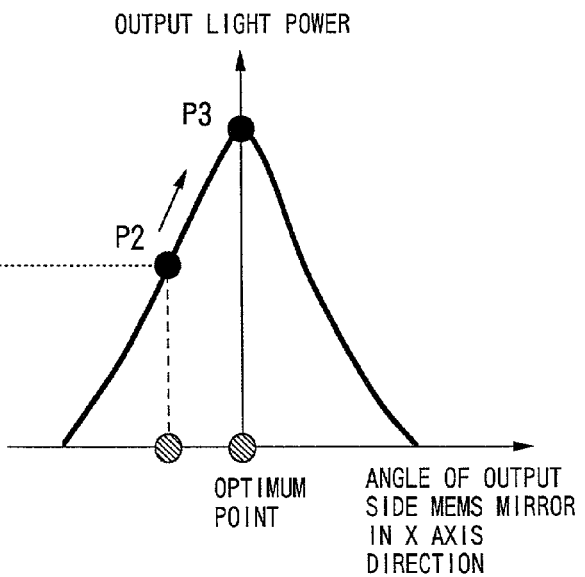

For example, in a state of the output light power such as designated by a point P1 in FIG. 20A, firstly the angle of the input side MEMS mirror is adjusted while fixing the angle of the output side MEMS mirror as shown in FIG. 20B, to realize a state of a point P2 where the output light power becomes a relative maximum. Next, the angle of the output side MEMS mirror is adjusted while fixing the angle of the input side MEMS mirror as shown in FIG. 20C, to realize a state of a point P3 where the output light power becomes a relative maximum. Thereby, it becomes possible to control the angles of the MEMS mirrors to the optimum point where the output light power becomes the maximum (the optical loss of the optical switching device becomes the minimum).

In view of the controlling characteristics of the aforementioned three-dimension type optical switching device, a correction control of the angle deviation of each MEMS mirror is performed, by applying a specific circuit configuration as shown in FIG. 21 to the counter control signal generating circuit 13E, and control and monitoring circuit 13F of the comparative control section 13.

In a specific example shown in FIG. 21, a polarity inversion circuit 13E' is provided as a constituent element of the counter control signal generating circuit 13E. Further, at the control and monitoring circuit 13F, the signal indicative of the comparison result at the comparison circuit 13D is input to a polarity inversion signal generating section 30 and an H/L detecting circuit 31, and the polarity inversion signal to be generated by the polarity inversion signal generating section 30 is output to the polarity inversion circuit 13E'. The H/L detecting circuit 31 monitors the level of the output signal from the comparison circuit 13D, and when a change from a high level to a low level of the output signal is detected, outputs a signal indicative of the change to a selector selection signal switching circuit 32 and outputs a disable signal to the polarity inversion circuit 13E' for disabling the operation of the polarity inversion circuit 13E'. In accordance with the output signal from the H/L detecting circuit 31, the selector selection signal switching circuit 32 judges that the output light power has reached a relative maximum point, generates a selection signal for switching the selector 13G, and sends this selection signal to the selector 13G and to an initial driving circuit 33. Upon receiving a control start signal for notifying the start of the angle deviation correcting control, the initial driving circuit 33 provides the selector 13G with an initial value and outputs an enable signal for enabling the operation of the polarity inversion circuit 13E'. Note, the output state of the enable signal to be provided from the initial driving circuit 33 to the polarity inversion circuit 13E' is controlled in accordance with the output signal from the selector selection signal switching circuit 32.

In the comparative control section 13 having the aforementioned circuit configuration, when the control start signal is input to the initial driving circuit 33 at a time point to such as shown in a timing chart of FIG. 22, the initial driving circuit 33 provides the selector 13G, as the initial value of the counter control signal, with a counter Up signal for instructing to increment the counter value, and also provides the polarity inversion circuit 13E' with the enable signal. In this way, there are started controlling operations for respective parts. Although the above setting is to provide the selector 13G with the counter Up signal as the initial value of the counter control signal, it is possible to provide a counter Down signal as the initial value of the counter control signal for instructing to decrement the counter value.

The counter Up signal provided to the selector 13G is distributed to the MEMS mirror driving sections 14A, 14B. The counter Up signal sent to the MEMS mirror driving section 14A is further distributed by the selector 20 to be sent to the circuit block corresponding to the input side MEMS mirror being the control target of angle deviation. The counter Up signal sent to the MEMS mirror driving section 14B is sent to the circuit block corresponding to the output side MEMS mirror (the channel having the output light power to be monitored by the optical power detecting section 12) being the control target of angle deviation. Assuming now that the angle deviations in the X-axis direction of MEMS mirrors are correction controlled in the order of the input side and output side, for example, as shown in FIG. 20, the counter Up signal from the comparative control section 13 is input, when starting the control, to the X-axis side U/D counter 21X of the MEMS mirror driving section 14A.

In the U/D counter 21X received the counter Up signal, the previously provided counter initial value is increased, and thus increased counter value is output to the D/A converter 22X for D/A conversion. Further, the output signal of the D/A converter 22X is sent to the MEMS mirror driver 23 which generates a drive controlling signal for controlling the X-axis direction angle of the input side MEMS mirror corresponding to the counter value of the U/D counter 21X, and this drive controlling signal is provided to the MEMS mirror array 2A. In this way, the X-axis direction angle of the corresponding MEMS mirror of the input side MEMS mirror array 2A is changed, so that the coupling state of the optical signal reflected by the input side MEMS mirror and by the corresponding output side MEMS mirror to the output fiber is changed. Then, a part of the optical signal coupled to the output fiber is branched by the optical coupler 11 and sent to the optical power detecting section 12. At the optical power detecting section 12, the monitor light from the optical coupler 11 is received by the photodetector 12A to thereby generate an electric current signal corresponding to the optical power, and this electric current signal is converted by the I/V converter 12B into a voltage signal to be output to the comparative control section 13.

The voltage signal corresponding to the monitored result of the output light power is converted by the A/D converter 13A of the comparative control section 13 into a digital signal which is then sent to the comparison circuit 13D and decoding circuit 13B. The comparison circuit 13D is supplied, from the holding circuit 13C, with the voltage value corresponding to the output light power in the state before changing the X-axis direction angle of the input side MEMS mirror, to compare this voltage value with that from the A/D converter 13A. Then, the comparison circuit 13D generates a high level output signal when the output light power is increased, while generates a low level output signal when the output light power is decreased, as a result that the X-axis direction angle of the input side MEMS mirror has been changed.

In the above, it is necessary to set the operation of the counter control signal generating circuit 13E, so as to generate a counter Up signal for the high level output signal from the comparison circuit 13D and a counter Down signal for the low level output signal from the comparison circuit 13D, when the output light power has changed in the increasing direction by the counter Up signal supplied to the selector 13G as the initial value of the counter control signal. Further, it is necessary to set the operation of the counter control signal generating circuit 13E, so as to generate a counter Down signal for the high level output signal from the comparison circuit 13D and a counter Up signal for the low level output signal from the comparison circuit 13D, when the output light power has changed in the decreasing direction by the counter Up signal supplied to the selector 13G as the initial value of the counter control signal. To realize such an operation setting for the counter control signal generating circuit 13E, in this embodiment, the polarity inversion signal generating section 30 is provided in the control and monitoring circuit 13F, so that a polarity inversion signal is generated to be sent to the polarity inversion circuit 13E', in order to inversion operate the polarity inversion circuit 13E' when the low level of the output signal from the comparison circuit 13D is detected, and in order not to inversion operate the polarity inversion circuit 13E' when the high level of the output signal from the comparison circuit 13D is detected. Thus, in the setting where the polarity inversion circuit 13E' does not inversion operate, the output level of the counter control signal generating circuit 13E becomes the same as the level of the output signal from the comparison circuit 13D, so that a counter Up signal of high level for the high level output of the comparison circuit 13D and a counter Down signal of low level for the low level output of the comparison circuit 13D are output. Conversely, in the setting where the polarity inversion circuit 13E' inversion operates, a counter Down signal of low level for the high level output of the comparison circuit 13D, and a counter Up signal of high level for the low level output of the comparison circuit 13D are output.

Assuming here that the output signal of the comparison circuit 13D has become a low level for the counter Up signal as the initial value as shown at the period $t_1$ to $t_2$, for example, as shown in FIG. 22, a polarity inversion signal of high level for causing the polarity inversion circuit 13E' to inversion operate is generated. Thus, the counter control signal, which has been set to be the counter Up signal of high level as the initial value, is switched to the counter Down signal of low level as indicated at the period $t_2$ to $t_3$, to be sent to the U/D counter 21X of the MEMS mirror driving section 14A via the selectors 13G, 20. Further, due to the decrease of the counter value of the U/D counter 21X, the angle of the input side MEMS mirror is controlled to the direction opposite to the direction when starting the control, to increase the output light power, so that the output signal of the comparison circuit 13D becomes high level as indicated at the period $t_3$ to $t_4$ of FIG. 22. The output signal of high level from the comparison circuit 13D is inverted by the polarity inversion circuit 13E', and output as a counter Down signal of low level from the counter control signal generating circuit 13E. In accordance with such a counter Down signal, the angle adjustment of the input side MEMS mirror is repeated until the output light power reaches a relative maximum point (see FIG. 20B).

When the output light power has reached or exceeded the relative maximum point, the output signal of the comparison circuit 13D is turned to a low level as indicated by the period $t_5$ to $t_6$ of FIG. 22. This change of the output level of the comparison circuit 13D from high to low is detected by the H/L detecting circuit 31 of the control and monitoring circuit 13F so that a signal indicating this change is sent to the selector selection signal switching circuit 32, and at the same time the enable signal having been supplied to the polarity inversion circuit 13E' is cancelled, and instead, the H/L detecting circuit 31 sends a disable signal to the polarity inversion circuit 13E'. Simultaneously therewith, the polarity-inverting signal having been output from the polarity inversion signal generating section 30 is cancelled. At the selector selection signal switching circuit 32, it is judged, based on the signal input from the H/L detecting circuit 31, that the X-axis direction angle of the input side MEMS mirror has been controlled to the optimum state. In this situation, the selector selection signal switching circuit 32 generates a controlling signal for switching the setting of the selector 13G from the X-axis direction of the input side MEMS mirror to the X-axis direction of the output side MEMS mirror, and sends this signal to the selector 13G.

Here, it has been judged that the X-axis direction angle of the input side MEMS mirror is optimized at the time when the output signal of the comparison circuit 13D is turned from high to low. However, for example, the counter control signal may be switched from a counter Down signal to a counter Up signal at the controlling cycle where the output signal of the comparison circuit 13D has just turned from high to low, then to bring back the angle of the input side MEMS mirror at the next controlling cycle such that the output signal of the comparison circuit 13D is brought back to the state just before turning from high to low. Whether or not such a control is to be performed is decided based on such as the precision of the angle control.

Upon completion of the angle control in the X-axis direction of the input side MEMS mirror in the above manner, the angle control in the X-axis direction for the output side MEMS mirror is performed as indicated at the aforementioned FIG. 20C, thereby resulting in that the angles in the X-axis directions of the MEMS mirrors are controlled to the optimum point where the output light power is maximized. Further, the Y-axis direction angles of the respective MEMS mirrors are also controlled to maximize the output light power similarly to the case of the X-axis directions, to thereby optimize the angles of MEMS mirrors. Thereby, it becomes possible to minimize the optical loss of the optical switching device.

In the above third embodiment, the angle control has been performed in the order of the X-axis direction angle of the input side MEMS mirror and the X-axis direction angle of the output side MEMS mirror. However, it is also possible to firstly perform the angle control for the output side MEMS mirror. Further, the angle control in the Y-axis directions has been performed after the angle control in the X-axis directions. However, it is also possible to firstly perform the angle control in the Y-axis directions. It is also possible to perform the angle control in the X-axis and Y-axis directions for the MEMS mirror at one of the input side and output side, and then for the MEMS mirror at the other side. The order of the angle control in the present invention can be arbitrarily set, because the change of the output light power is independent for each MEMS mirror and for each axis direction as explained concerning FIG. 20.

Figure 23:
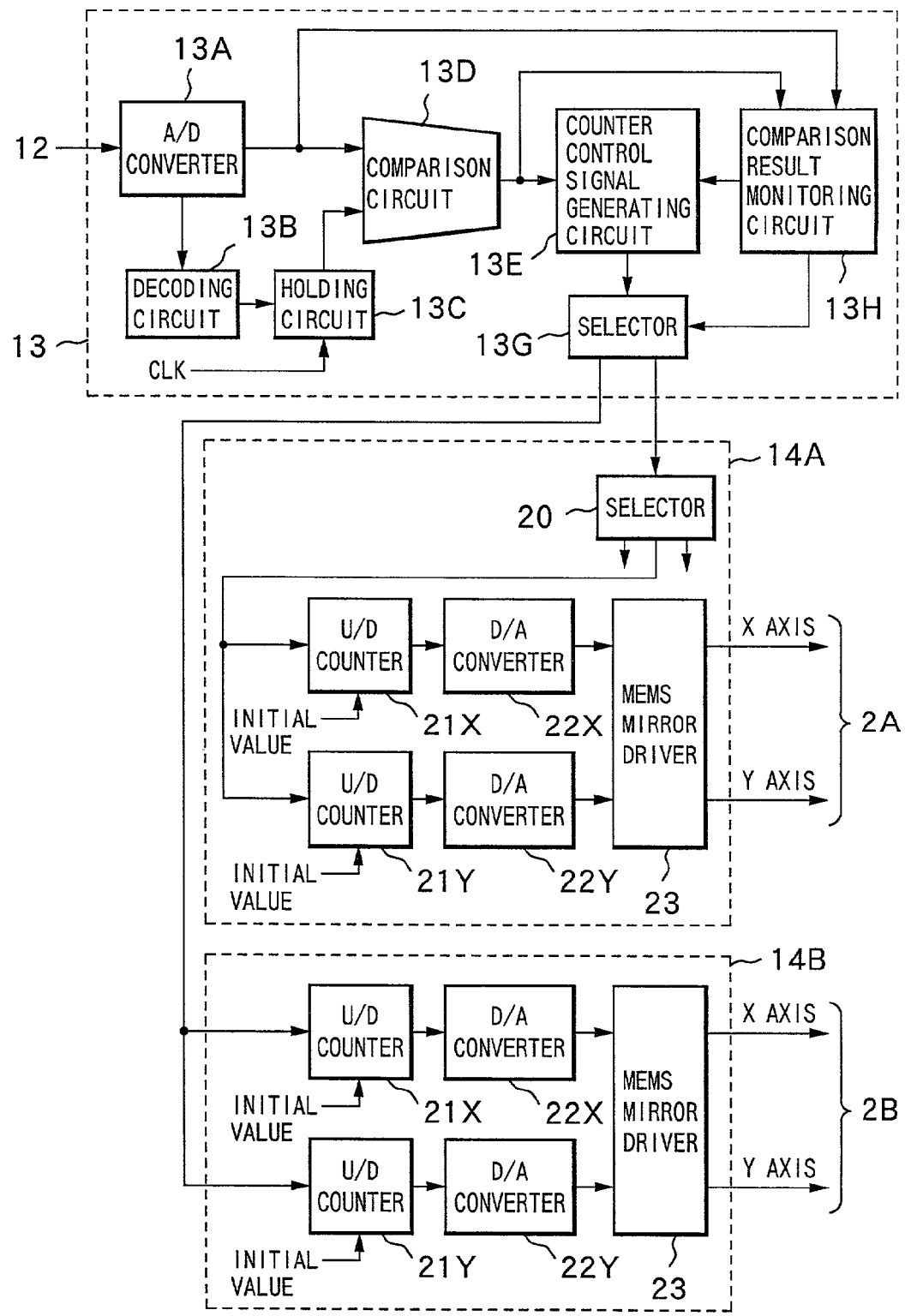
FIG. 23 is a block diagram showing a constitution of a modified example related to the third embodiment.

In the above third embodiment, the angle control of MEMS mirror has been continued until the output light power reaches the relative maximum point. However, it is also possible to stop the control when the output light power has exceeded a previously set value, for example. FIG. 23 shows a constitutional example of the comparative control section 13 and MEMS mirror driving sections 14A, 14B, in such a situation. In the constitutional example of FIG. 23, the voltage value output from the A/D converter 13A is directly read out by a comparison result monitoring part 13H, to stop the operation of the counter when the voltage value has exceeded a certain value, irrespectively of the comparison result at the comparison circuit 13D.

There will be now described hereinafter a controlling apparatus of an optical switching device according to a fourth embodiment of the present invention.

In the aforementioned third embodiment, the angle control has been performed in one axis direction of each MEMS mirror, and the angle control in the other axis direction has been performed after completing the control in the one axis direction. In the fourth embodiment, there will be considered a situation where the angles in the same axial directions of the respective input side and output side MEMS mirrors are simultaneously controlled, so as to shorten the processing time.

Figure 24:
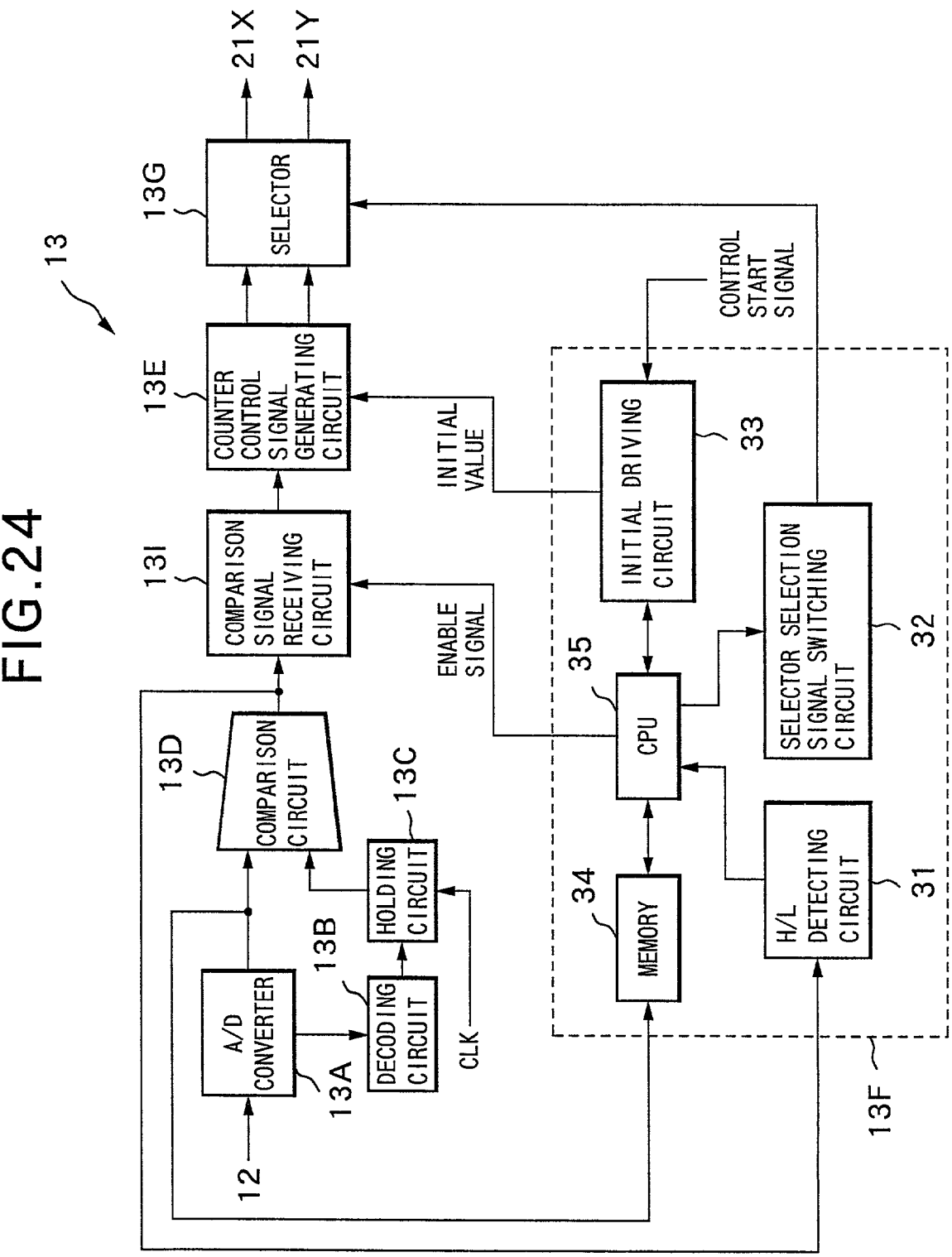
FIG. 24 is a block diagram showing a specific exemplary constitution of a comparative control section in a fourth embodiment of the present invention.

FIG. 24 is a block diagram showing a specific exemplary constitution of the comparative control section 13 in the fourth embodiment. Note, the whole constitution of the optical switching device and controlling apparatus is the same as the third embodiment shown in FIG. 18, and the constitutions of the optical power detecting section 12 and MEMS mirror driving sections 14A, 14B are the same as those of the specific example shown in FIG. 19.

The comparative control section 13 of the fourth embodiment shown in FIG. 24 is provided with a comparison signal receiving circuit 13I between the comparison circuit 13D and counter control signal generating circuit 13E, instead of the polarity inversion circuit 13E' in the counter control signal generating circuit 13E, concerning the constitution of the third embodiment shown in FIG. 19 and FIG. 21. Concerning the control and monitoring circuit 13F, a memory 34 and a CPU 35 are provided, instead of the polarity inversion signal generating section 30.

The memory 34 of the control and monitoring circuit 13F stores the voltage value to be output from the A/D converter 13A, and the thus stored data is read out by the CPU 35. The CPU 35 controls the operations of respective sections in the manner to be described later, based on the stored data of the memory 34 and the signals from the H/L detecting circuit 31 and initial driving circuit 33.

There will be described hereinafter the operation of the comparative control section 13 having the aforementioned constitution, with reference to the flowchart of FIG. 25.

Figure 25:
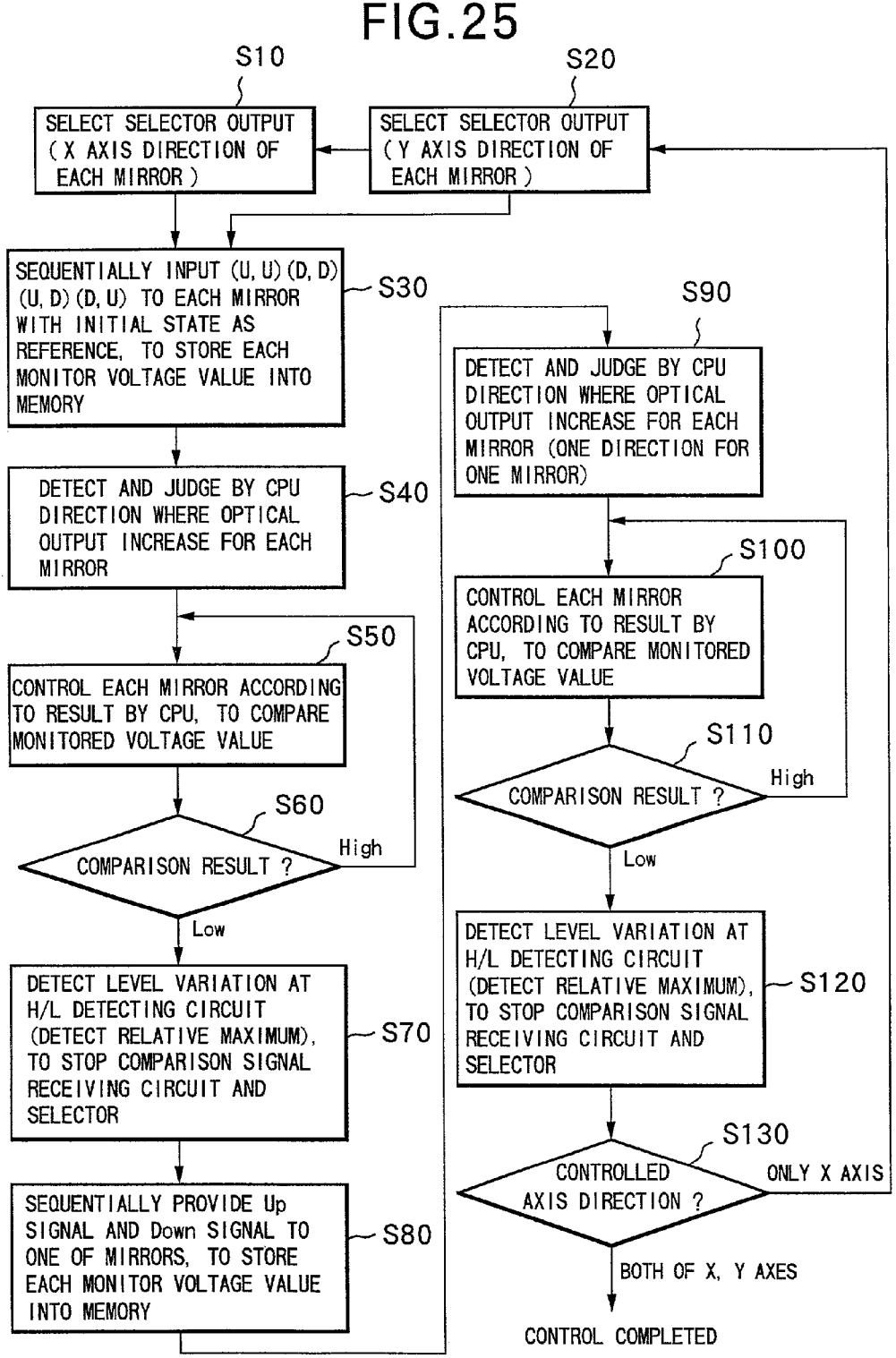
FIG. 25 is a flowchart for explaining an operation of the comparative control section in the fourth embodiment.

Firstly, at step 10 or step 20 of FIG. 25 (abbreviated to "S10" and "S20" in the figure; and the same rule applies corresponding to the following), output selection for the selector 13G is performed by the comparative control section 13 so as to set the axis direction for which the angle control is performed. Herein, there is assumed a situation for performing the angle control in the X-axis directions and then the angle control in the Y-axis directions.

When the output selection for the selector 13G is performed so as to control the angles in the X-axis directions of the respective MEMS mirrors, at step 30, a counter Up signal to the input side MEMS mirror and a counter Up signal to the output side MEMS mirror (hereinafter, such combined counter control signals shall be called "(U, U)") are output from the initial driving circuit 33 as initial values of counter control signals, based on the initial state when starting the control. The counter control signals (U, U) are supplied to the U/D counters 21X of MEMS mirror driving sections 14A, 14B, respectively, via the selector 13G, so that the X-axis direction angles of the input side and output side MEMS mirrors are controlled in the same manner as the third embodiment, and the memory 34 is stored with a voltage value corresponding to the output light power to be detected by the optical power detecting section 12 at that time. When the voltage value for the counter control signals (U, U) is recorded into the memory 34, the angles of the MEMS mirrors are brought back to the initial states. Then, a counter Down signal to the input side MEMS mirror and a counter Down signal to the output side MEMS mirror (hereinafter, such combined counter control signals shall be called "(D, D)") are provided as initial values of counter control signals, and the memory 34 is further stored with a voltage value for the output light power at that time. Moreover, counter control signals (U, D) and counter control signals (D, U) are sequentially provided based on the initial state when starting the control, respectively, in the same manner as the above, such that the voltage values corresponding to the output light powers at the respective situations are recorded into the memory 34.

After the voltage values corresponding to the counter control signals (U, U), (D, D), (U, D), (D, U) recorded into the memory 34, at step 40, the stored data of the memory 34 is read out by the CPU 35, and the voltage value where the output light power has the greatest value is detected, to thereby judge the combination of counter control signals at that time. Here, there is assumed a situation where the output light power has the greatest value in case of the counter control signals (D, U), for example.

At step 50, the counter control signals generated by the counter control signal generating circuit 13E are set to the combination of (D, U) based on the judgment result of the CPU 35, and an enable signal for enabling the operation of the comparison signal receiving circuit 13I is output from the CPU 35 to thereby perform the angle control based on the output signal level from the comparison circuit 13D in the same manner as the third embodiment. Specifically, at step 60, it is judged whether the output signal from the comparison circuit 13D is at a high level or a low level, and the flow goes to step 70 if the low level (i.e., detection of a relative maximum) is judged. Note, the state of the low level judgment means that one of the angles of the input side and output side MEMS mirrors has reached the optimum point.

At step 70, the transition from the high level to the low level of the output signal from the comparison circuit 13D is detected by the H/L detecting circuit 31, and a signal indicative thereof is sent to the CPU 35. Upon receiving the signal from the H/L detecting circuit 31, the CPU 35 cancels the output of the enable signal to the comparison signal receiving circuit 13I to thereby stop the operation of the comparison signal receiving circuit 13I, and at the same time sends a controlling signal via the selector selection signal switching circuit 32 so as to stop the operation of the selector 13G.

Next, at step 80, a counter Up signal and a counter Down signal are sequentially provided to one of the input side and output side MEMS mirrors, and the voltage values corresponding to the output light powers for the respective situations are stored in the memory 34. When the storage of the voltage values for the one of the MEMS mirrors is completed, a counter Up signal and a counter Down signal are sequentially provided to the other of the MEMS mirrors, and the voltage values corresponding to the output light powers for the respective situations are further stored in the memory 34. The reason why such an operation is performed is as follows. For example, if the angle of the input side MEMS mirror has reached the optimum point, the values of the output light powers to be obtained by providing the counter Up signal and counter Down signal to the input side MEMS mirror should become less than the value before performing the operation. On the other hand, the value of the output light power to be obtained by providing the counter Up signal and counter Down signal to the output side MEMS mirror should become greater than the value before performing the operation when one of the counter signals is provided, while becomes less than the value before performing the operation when the other of the counter signals is provided. Thus, taking notice of such a difference, it becomes possible to judge the MEMS mirror the angle of which has not reached the optimum point.

As such, at step 90, the stored data from the memory 34 is read out by the CPU 35, to thereby judge the MEMS mirror and the counter control signal in the situation where the output light power exceeds the value before the operation at step 80 In accordance with the judgment result of the CPU 35, at step 100, an enable signal is provided to the comparison signal receiving circuit 131, and simultaneously therewith, the angle of the one of the MEMS mirrors is controlled. At step 110, the output signal level from the comparison circuit 13D is judged. When the low level of the output signal from the comparison circuit 13D (i.e., detection of relative maximum) is detected, the operations of the comparison signal receiving circuit 13I and selector 13G are stopped at step 120, similarly to step 70. At step 130, the axis directions which have been controlled are decided. If the control of the X-axis directions only has been completed, the flow returns to step 20 to thereby perform the angle control for Y-axis directions for the respective MEMS mirrors, in the same manner as that for the X-axis directions.

According to the above fourth embodiment, the angles in the same axial directions for the input side and output side MEMS mirrors are simultaneously controlled, to thereby enable to shorten the angle controlling time for each MEMS mirror.

In the fourth embodiment, the X-axis direction angles of the respective MEMS mirrors have been simultaneously controlled, and the angle control only of the other side MEMS mirror has been performed after the angle of the one side MEMS mirror has reached the optimum point. However, it is possible to continuously perform the simultaneous control of the input side and output side angles, even after one side angle has been optimized. Specifically, if the consideration is given to a situation where an angle control is performed based on the counter control signal (D, U) such that the angle of one side MEMS mirror has reached the optimum point, counter control signals having such combinations of (U, U) or (D, D) are then provided. Namely, the counter control signals except for the combination (D, U) of counter control signals which have been already provided up to then and the reverse combination (U, D) thereof are provided. Then, there is judged the combination of counter control signals which increases the output light power, to continue the angle control. When a relative maximum point is detected again when the output signal of the comparison circuit is transitioned to a low level, the control is stopped once. Thereafter, those counter control signals except for the combination which have been already provided up to then and the reverse combination thereof are provided, to repeat the angle control similar to the above, so as to finally attain such a relative maximum point where the output light power is kept unchanged even by changing the combination of counter control signals. Also in such a controlling mode, the angles at the input side and output side are simultaneously controlled, to thereby enable to shorten the processing time.

In the fourth embodiment, the angles in the same axial directions for the input side and output side MEMS mirrors have been simultaneously controlled. However, the present invention is not limited thereto. It is also possible to simultaneously control the angles in the X-axis direction and Y-axis direction of one side MEMS mirror.

Moreover, it is also applicable to simultaneously control the angles in the X-axis directions and Y-axis directions of the respective MEMS mirrors at the input side and output side, to sequentially store output light powers obtained in the states corresponding to the respective combinations, into the memory, to extract the maximum value from the stored data of the memory, and to set the counter control signals satisfying the condition of the maximum value so as to perform the angle control.

Figure 26:
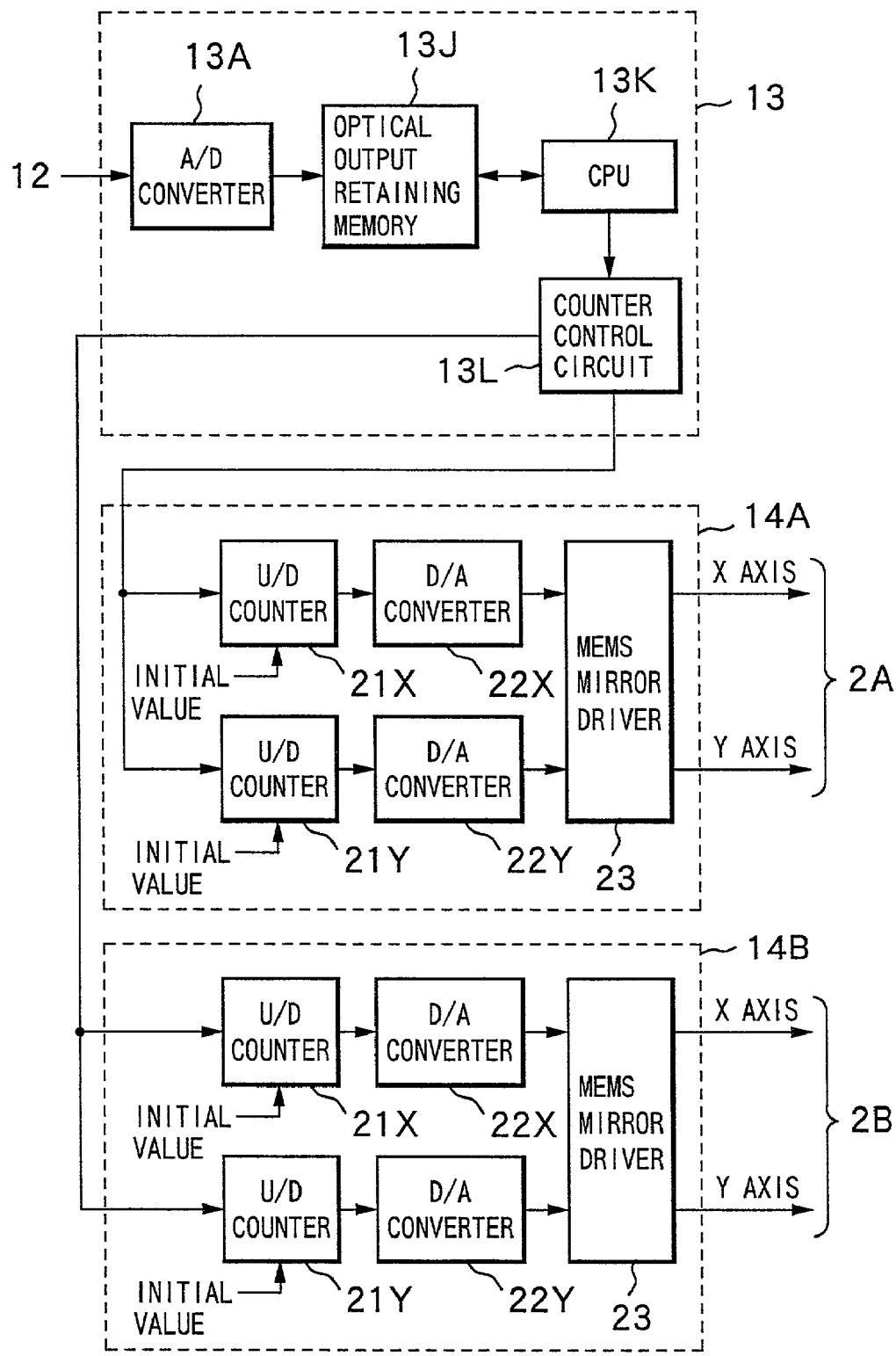
FIG. 26 is a block diagram showing a constitution of a comparative control section and a MEMS mirror driving section in an application example related to the fourth embodiment.

FIG. 26 shows constitutional examples of the comparative control section 13 and MEMS mirror driving sections 14A, 14B in the case noted just above. As the comparative control section 13, in the constitutional examples of FIG. 26, an optical output retaining memory 13J for storing the voltage value output from the A/D converter 13A, a counter control circuit 13L for controlling the counting operations of MEMS mirror driving sections 14A, 14B, and a CPU 13K for controlling the operation of the counter control circuit 13L based on the stored data of the optical output retaining memory 13J are provided.

According to the above constitution, the optical output retaining memory 13J is firstly stored with the voltage value corresponding to the output light power in the initial state when starting the control. After completing the storage of the voltage value in the initial state, the signal indicative thereof is notified to the CPU 13K so that the CPU 13K controls the operation of the counter control circuit 13L. The counter control circuit 13L performs such a control that the counter value of each of U/D counters 21X, 21Y of each of the MEMS mirror driving sections 14A, 14B is changed within a previously set range, for example, so as to sequentially store into the optical output retaining memory 13J the voltage values corresponding to the output light powers to be obtained when the U/D counter is sequentially changed 1 count by 1 count, respectively. When the storage of all of the voltage values corresponding to the respective counter values is completed, the CPU 13K analyzes the stored data of the optical output retaining memory 13J to thereby detect the condition of the counter values where the output light power reaches maximized. Then, the counter values of the U/D counters 21X, 21Y are set in accordance with such a condition, and the angles of the input side and output side MEMS mirrors are controlled to the optimum point.

There will be now described in detail the counter initial values to be provided to the U/D counters 21X, 21Y of MEMS mirror driving sections 14A, 14B, respectively, in the third embodiment and fourth embodiment.

Figure 27:
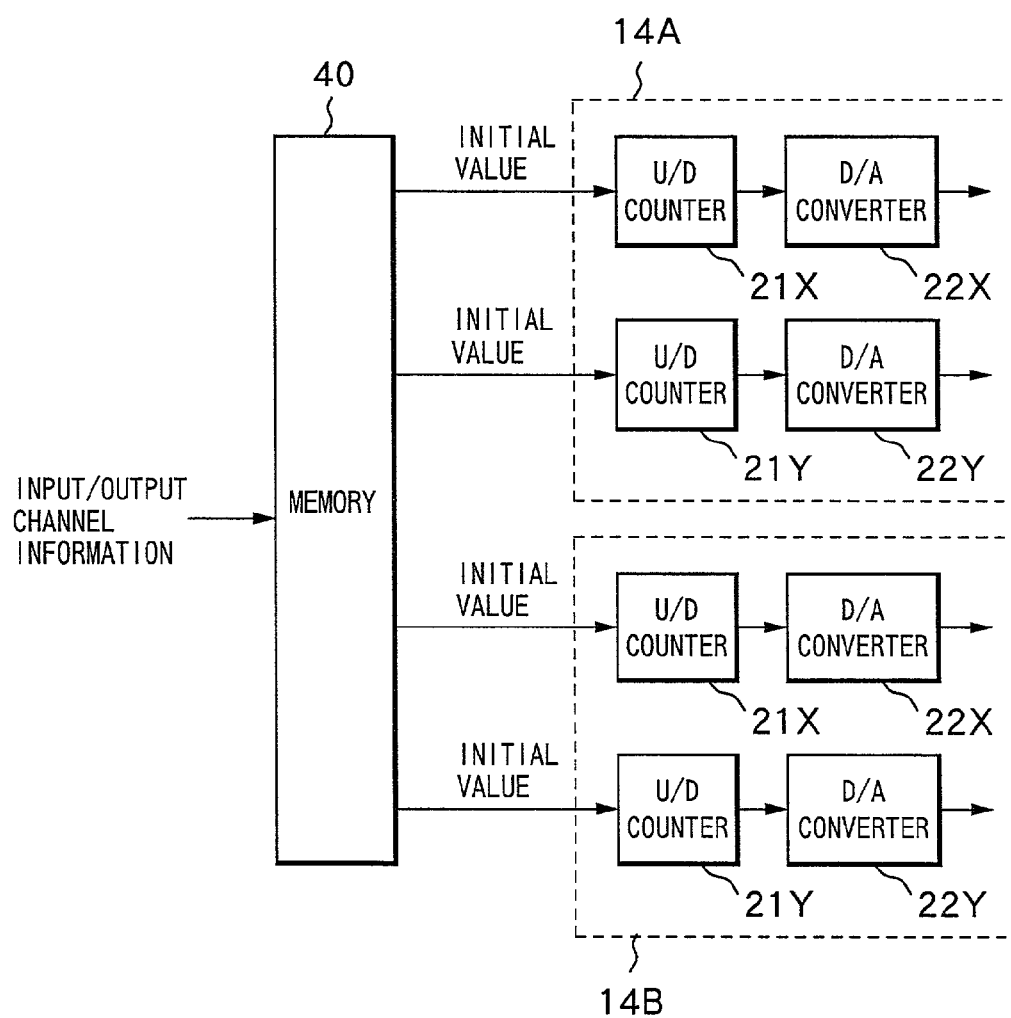
FIG. 27 is a block diagram showing an example of a constitution provided with a memory for storing counter initial values, in relation to the third embodiment and fourth embodiment of the present invention.

As described above, it is desirable to provide the U/D counters 21X, 21Y with counter initial values previously set corresponding to the input and output channels, respectively, to thereby improve the mirror adjusting speed. Specifically, as shown in FIG. 27, such a constitution is possible that the counter initial values are stored such as in a memory 40, and the initial values corresponding to the input and output channels are read out from the memory 40, in accordance with input and output channel information to be provided from the exterior. Further, as the counter initial values, it is optimum to set the inclination angles to be actually assumed for input side MEMS mirrors and output side MEMS mirrors, corresponding to every possible combination of input and output channels.

Meantime, as the data for the counter initial values to be stored in the memory 40 and the like in the above manner, input channel information, output channel information, and inclination angle information for two axes for each of input side and output side MEMS mirrors are required. As combinations of such data, it is required to prepare a table having a number of rows {(the number of input channels)×(the number of output channels)}. Still more, for the inclination angle information for each axis, in a situation where both of the number of input channels and the number of output channels are 64 (hereinafter called "64ch×64ch"), for example, it is required data conversion of 9 to 10 bits as the inclination angle information for each axis, based on the evaluation of angles to be actually anticipated. As such, it is required inclination angle information on the order of 40 bits, for two axes at the input side and output side. Thus, as the memory capacity for storing counter initial values in case of 64ch×64ch, there are required 64×64×{6(for input channel information)+6(for output channel information)+40 (for inclination angle information)} bits, which means a memory capacity of about $2^{18}$ bits. Further, when the number of input channels and output channels is doubled, there are required about 7 to 8 times the former memory capacity. As such, the increase of the number of channels leads to overgrowth of a memory capacity accompanied by reduction of a processing speed, to thereby possibly affect the mirror adjusting speed.

Accordingly, there will be described in detail hereinafter a technique for optimizing a constitution of a memory for storing counter initial values, by utilizing optical characteristics of input side and output side MEMS mirrors.

Figure 28:
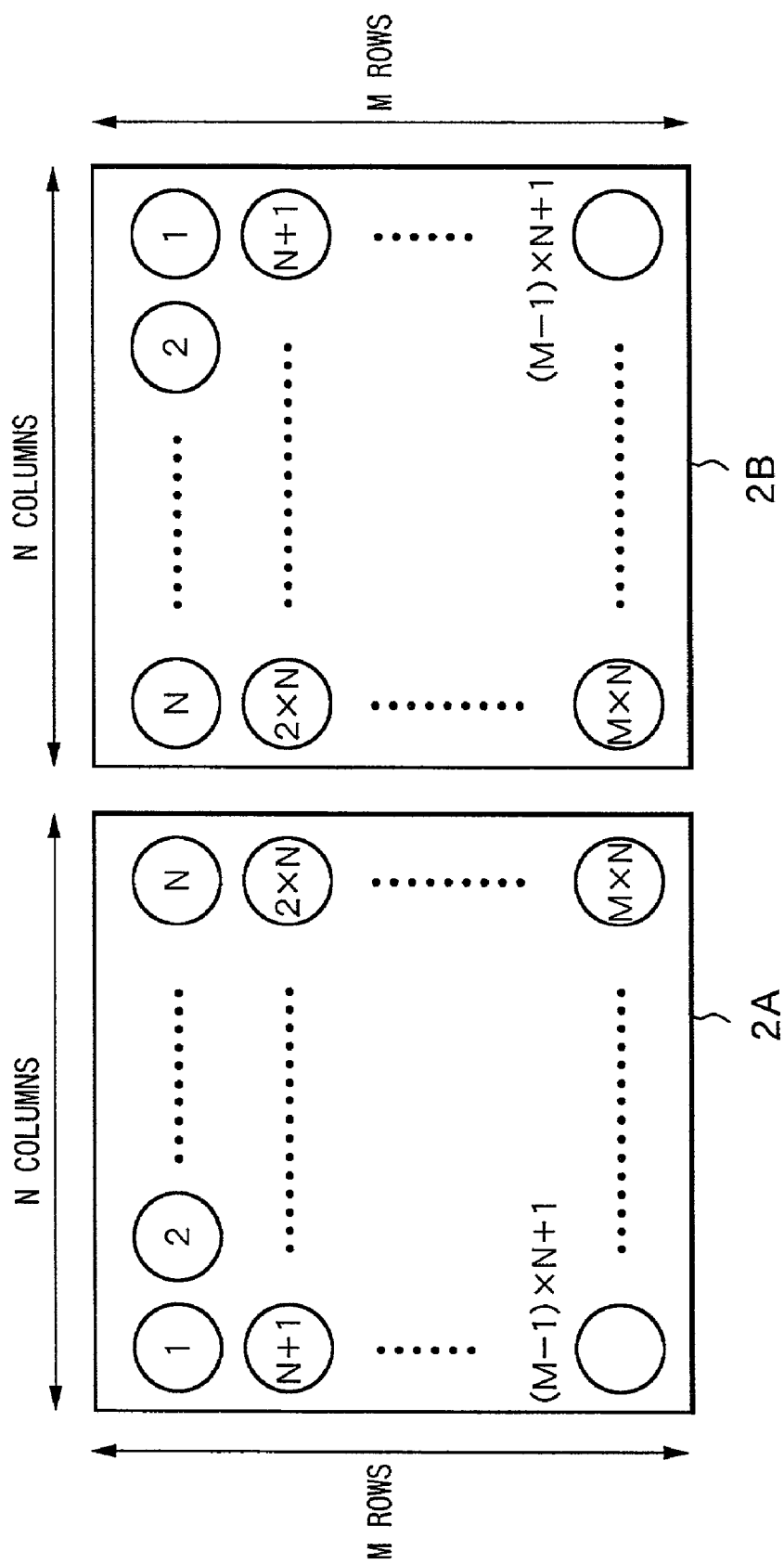
FIG. 28 is a view for explaining the regularity of numbers to be assigned to MEMS mirrors so as to optimize the constitution of the initial value memory of FIG. 27.

Firstly, the MEMS mirrors of the MEMS mirror arrays 2A, 2B are symmetrically assigned with numbers in the sequence shown in FIG. 28. Namely, when each of the three-dimensionally and symmetrically arranged MEMS mirror arrays 2A, 2B includes M×N numbers of MEMS mirrors arranged in an M rows×N columns manner, continuous numbers are assigned to from the uppermost first row toward the lowermost M-th row such that the number of each input side MEMS mirror becomes symmetric to the number of each output side MEMS mirror on the basis of the axis of the asymmetry.

Specifically, concerning the input side MEMS mirror array 2A, row numbers 1 to M and column numbers 1 to N are assigned by starting from the uppermost left point in the figure, such that the MEMS mirror at the first row and first column is the number 1, the MEMS mirror at the first row and N-th column is the number N, the MEMS mirror at the second row and first column is the number N+1, the MEMS mirror at the second row and N-th column is the number 2×N, and succeeding numbers are similarly assigned thereafter, so that the MEMS mirror at the M-th row and N-th column is the number M×N. Concerning the output side MEMS mirror array 2B, the continuous numbers from the number 1 up to the number M×N are assigned to MEMS mirrors in the same manner as the input side, starting from the upper most right point.

It is noted that the numbers assigned to input side MEMS mirrors and the numbers assigned to output side MEMS mirrors correspond to input channel numbers and output channel numbers, respectively, to be represented based on the input/output channel information to be described later.

Figure 29:
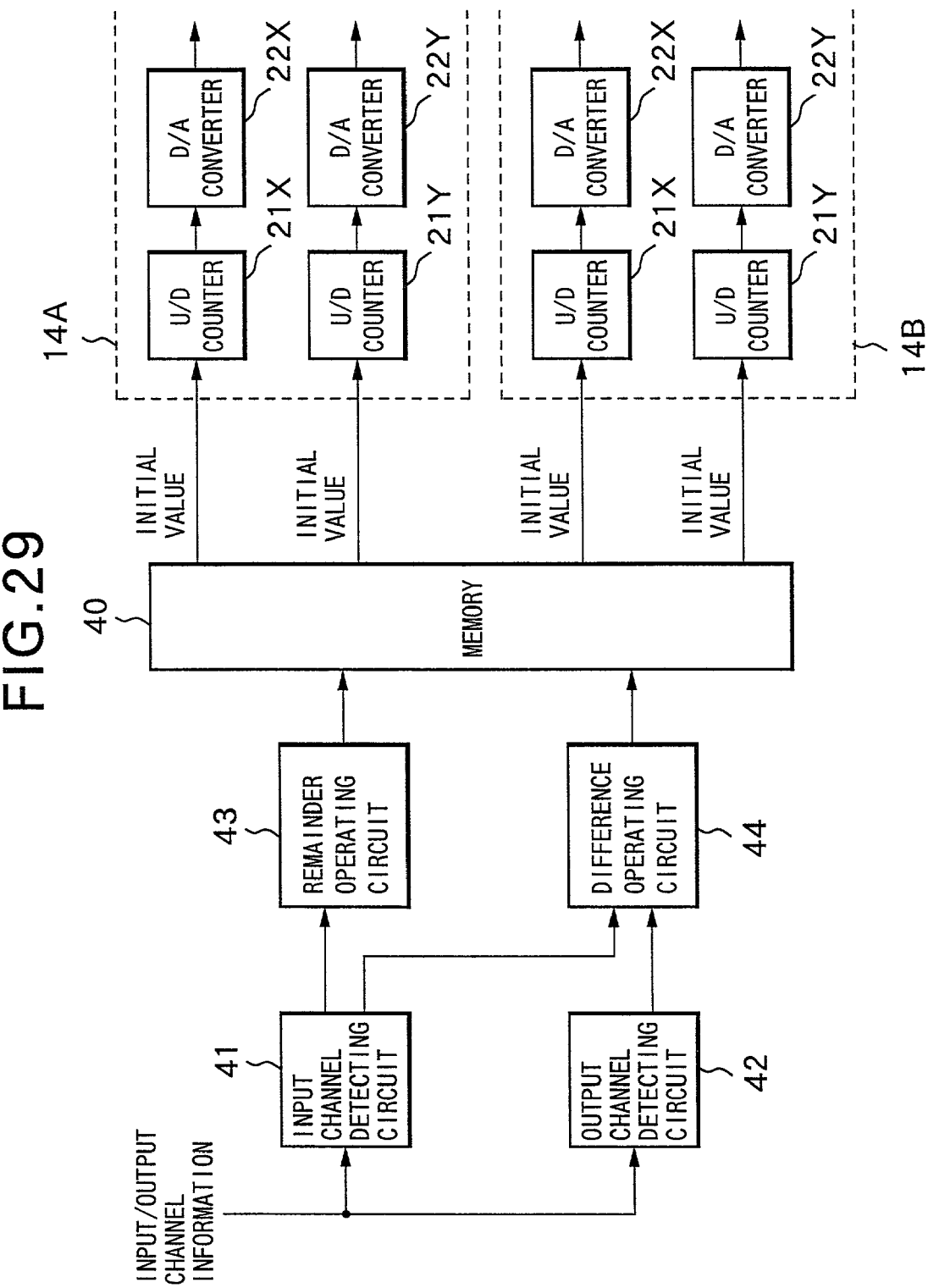
FIG. 29 is a block diagram showing a first circuit example for optimizing the constitution of the initial value memory.

FIG. 29 is a block diagram showing a first circuit example for optimizing the constitution of the initial value memory.

In the first circuit example shown in FIG. 29, the memory 40 for storing the counter initial values shown in FIG. 27 is supplied with access signals generated, based on the input/output channel information, by an input channel detecting circuit 41, an output channel detecting circuit 42, a remainder operating circuit 43 and a difference operating circuit 44, so as to reduce the initial value data to be stored into the memory 40.

Based on the input/output channel information such as to be supplied from the exterior, the input channel detecting circuit 41 detects the input channel number corresponding to the input side MEMS mirror being a control target, to output the detection result to the remainder operating circuit 43 and difference operating circuit 44. Further, based on the input/output channel information, the output channel detecting circuit 42 detects the output channel information corresponding to the output side MEMS mirror being a control target, to output the detection result to the difference operating circuit 44.

The remainder operating circuit 43 computes a surplus (i.e., remainder) where the input channel number detected by the input channel detecting circuit 41 is divided by the number N of columns in the arrangement of the aforementioned MEMS mirrors, to output the calculation result as the access signal to the memory 40.

The difference operating circuit 44 computes a difference between the input channel number detected by the input channel detecting circuit 41 and the output channel number detected by the output channel detecting circuit 42, to output the calculation result as another access signal to the memory 40.

Figure 30:
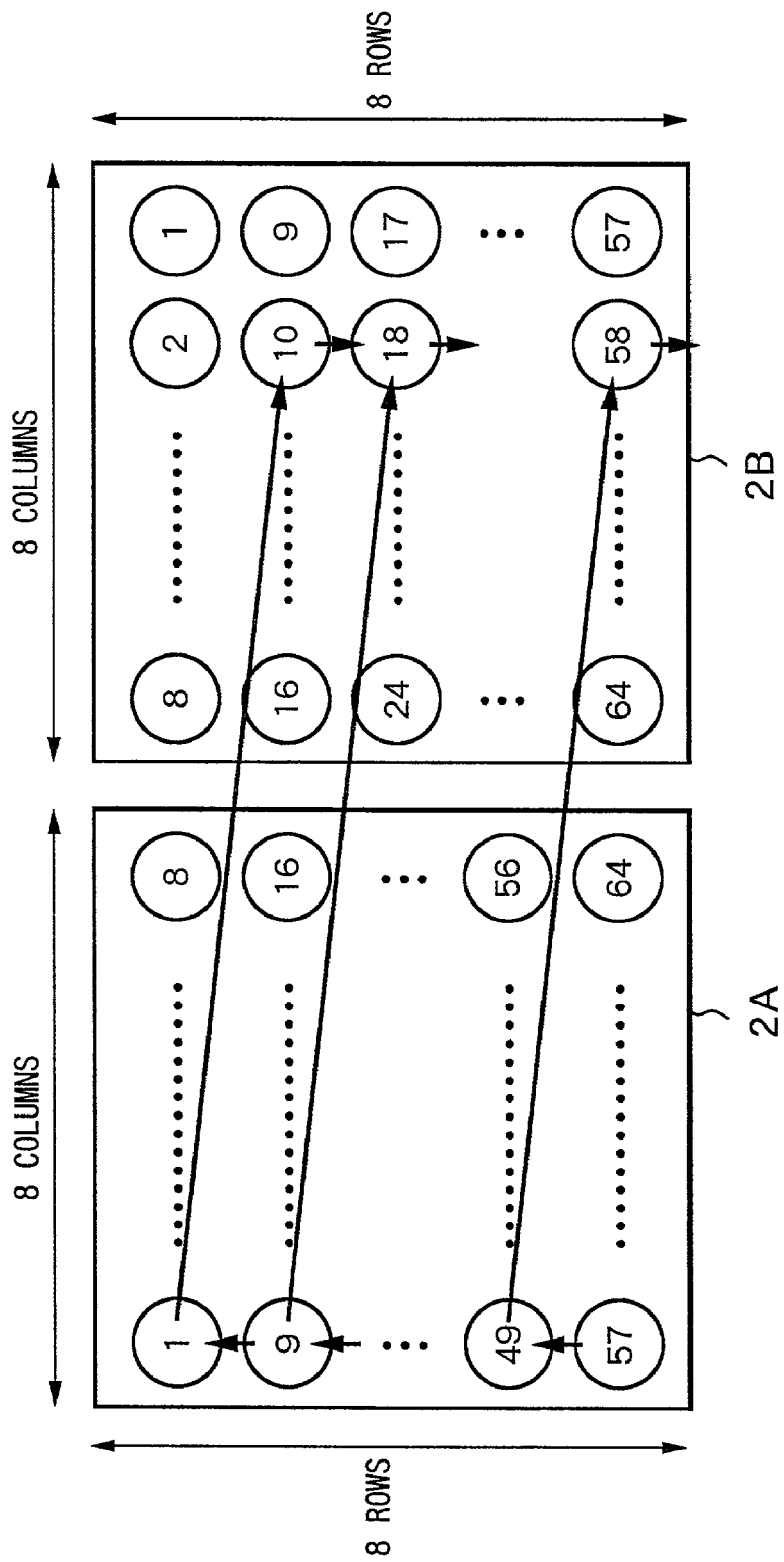
FIG. 30 is a view for explaining optical characteristics of the MEMS mirrors to be utilized in the circuit example of FIG. 29.

According to the above circuit configuration, the constitution of the initial value memory can be optimized, by utilizing the optical characteristics of input side and output side MEMS mirrors such as shown in FIG. 30. In the example of FIG. 30, the consideration is given to a situation where the numbers of input and output channels are 64ch×64ch, so that each of input side and output side MEMS mirror arrays 2A, 2B includes 64 numbers of MEMS mirrors arranged in 8 rows and 8 columns.

The optical characteristics of the MEMS mirrors shown in FIG. 30 are based on the arrangement of the three-dimensional and symmetrical MEMS mirror arrays 2A, 2B, such that the inclination angle of input side MEMS mirrors and that of output side MEMS mirrors become the same in such combinations of input and output channels in which each surplus obtained by dividing the input channel number by the number of MEMS mirrors (i.e., the number of columns) arranged in the direction perpendicular to the symmetry axis (i.e., in the direction of row) becomes the same and each difference between the input channel number and the output channel number becomes the same. Such a relationship between input and output channels can be represented by the following equation (11) and equation (12), assuming two combinations (i1, j1) and (i2, j2) of input channel number "i" and output channel number "j":

$$i1 = i2 + N \times n \quad (11), \text{ and}$$

$$i1 - j1 = i2 - j2 \quad (12);$$

wherein N is the number of columns (N=8 in the example of FIG. 30), and n is an arbitrary integer. As specifically shown in FIG. 30, the combinations simultaneously satisfying the relationships of the equation (11) and equation (12) include the group consisting of (1, 10), (9, 18), . . . (49, 58), in which each of the combination has the remainder of 1 concerning the input channel number and the difference of 9 between the input channel number and output channel number. When the input and output channel numbers corresponding to the aforementioned group in accordance with the input/output channel information from the exterior, all of the inclination angles of the respective input side and output side MEMS mirrors corresponding to the input/output channels become the same. Consequently, it becomes possible to optimize the memory constitution, by mutually relating the counter initial values based on the remainders concerning the input channel numbers and based on the differences between input and output channel numbers to prepare a data table of counter initial values to be stored into the memory 40.

The following Table 1 is an example of a data table prepared based on the remainders and differences concerning the input and output channel numbers in case of the 64ch×64ch shown in FIG. 30.

TABLE 1

| Remainder | Difference | $\theta_{AX}$ | $\theta_{AY}$ | $\theta_{BX}$ | $\theta_{BY}$ |
|---|---|---|---|---|---|
| 1 | −63 | $A_{-63}$ | $B_{-63}$ | $C_{-63}$ | $D_{-63}$ |
| : | : | : | : | : | : |
| 1 | +56 | $A_{+56}$ | $B_{+56}$ | $C_{+56}$ | $D_{+56}$ |
| 2 | −62 | $E_{-62}$ | $F_{-62}$ | $G_{-62}$ | $H_{-62}$ |
| : | : | : | : | : | : |
| 2 | +57 | $E_{+57}$ | $F_{+57}$ | $G_{+57}$ | $H_{+57}$ |
| : | : | : | : | : | : |
| 8(0) | −56 | $W_{-56}$ | $X_{-56}$ | $Y_{-56}$ | $Z_{-56}$ |
| : | : | : | : | : | : |
| 8(0) | +63 | $W_{+63}$ | $X_{+63}$ | $Y_{+63}$ | $Z_{+63}$ |

In the circuit configuration shown in FIG. 29, the memory 40 is stored with the data table of the counter initial values shown in the Table 1, and the remainder and difference are computed by the remainder operating circuit 43 and difference operating circuit 44, respectively, based on the input channel number and output channel number detected by the input channel detecting circuit 41 and output channel detecting circuit 42, respectively, in accordance with the input/output channel information, such that the initial value data in the memory 40 can be read out in accordance with the computed result.

By applying such a circuit configuration, the memory capacity required for the memory 40 is reduced to an amount equivalent to about 2/N, as compared with the constitution shown in FIG. 27 without the application of this circuit configuration. Specifically, 960 kinds of initial value data are stored in the memory 40 in the example of the Table 1. Contrary, it is required to store 4,096 kinds of initial value data into the memory 40, in controlling the 64ch×64ch without applying the this circuit configuration.

Figure 31:
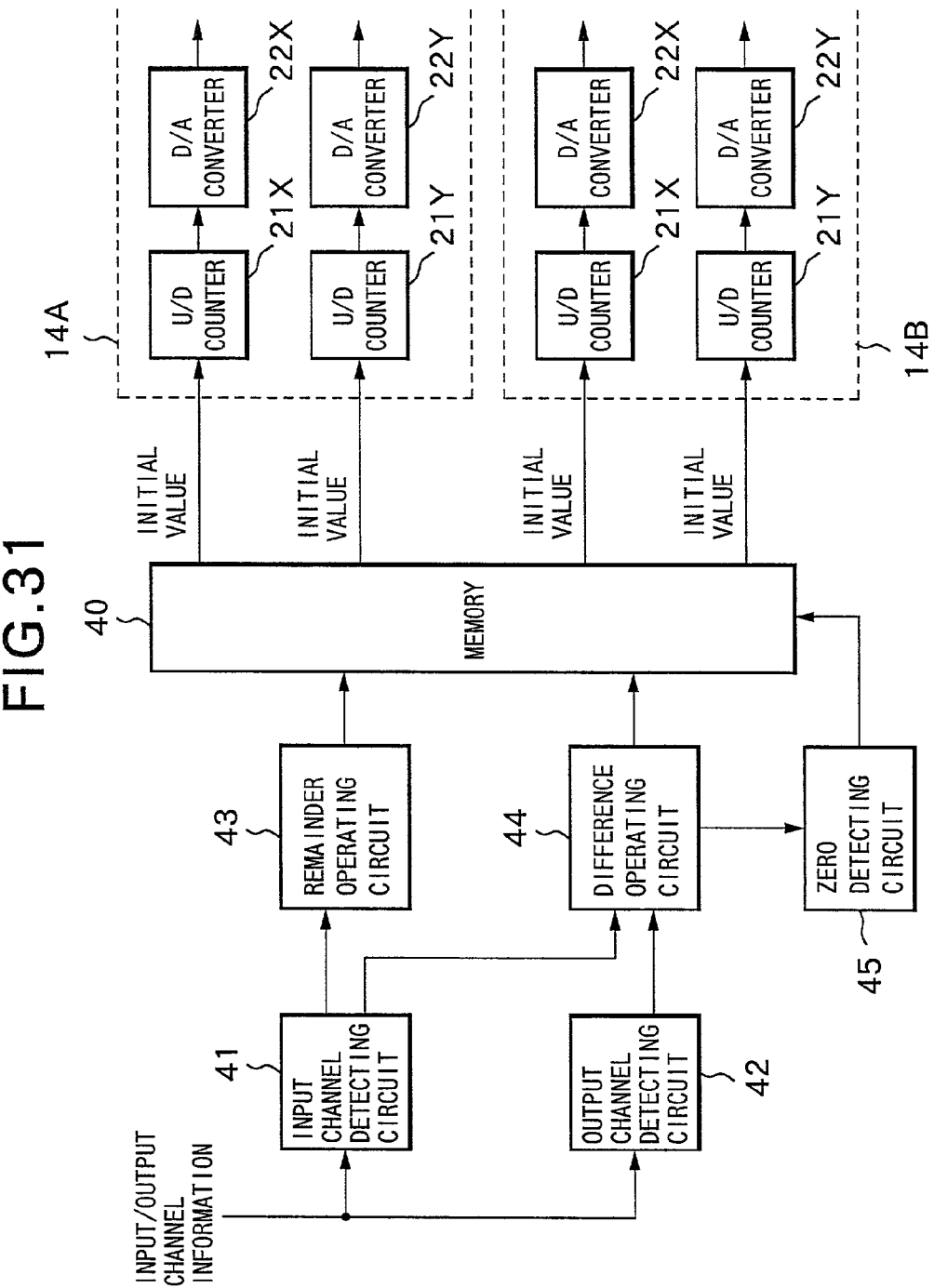
FIG. 31 is a block diagram showing an example obtained by improving the first circuit example of FIG. 29.

Concerning the first circuit example shown in FIG. 29, it is further possible to optimize the constitution of the initial value memory, by applying such an improvement shown in FIG. 31.

In the improved example of FIG. 31, a zero detecting circuit 45 is further provided in the first circuit example. This zero detecting circuit 45 detects a state where the computation result of the difference operating circuit 44 becomes zero, to transmit the detection result to the memory 40.

When the computation result of the difference operating circuit 44 becomes zero, i.e., when the input channel number is equal to the output channel number, both of the inclination angles of input side and output side MEMS mirrors become zero and both of driving voltages of these mirrors become zero, due to the constitution of this optical switching device. Thus, by detecting such a situation by the zero detecting circuit 45 to transmit the result to the memory 40, it is possible to further simplify the table of the memory 40 for the condition that the input and output channel numbers are the same. In this way, it becomes possible to omit 7 kinds of initial value data in case of 64ch×64ch, so that the memory 40 is required to store therein only 953 kinds of initial value data.

Figure 32:
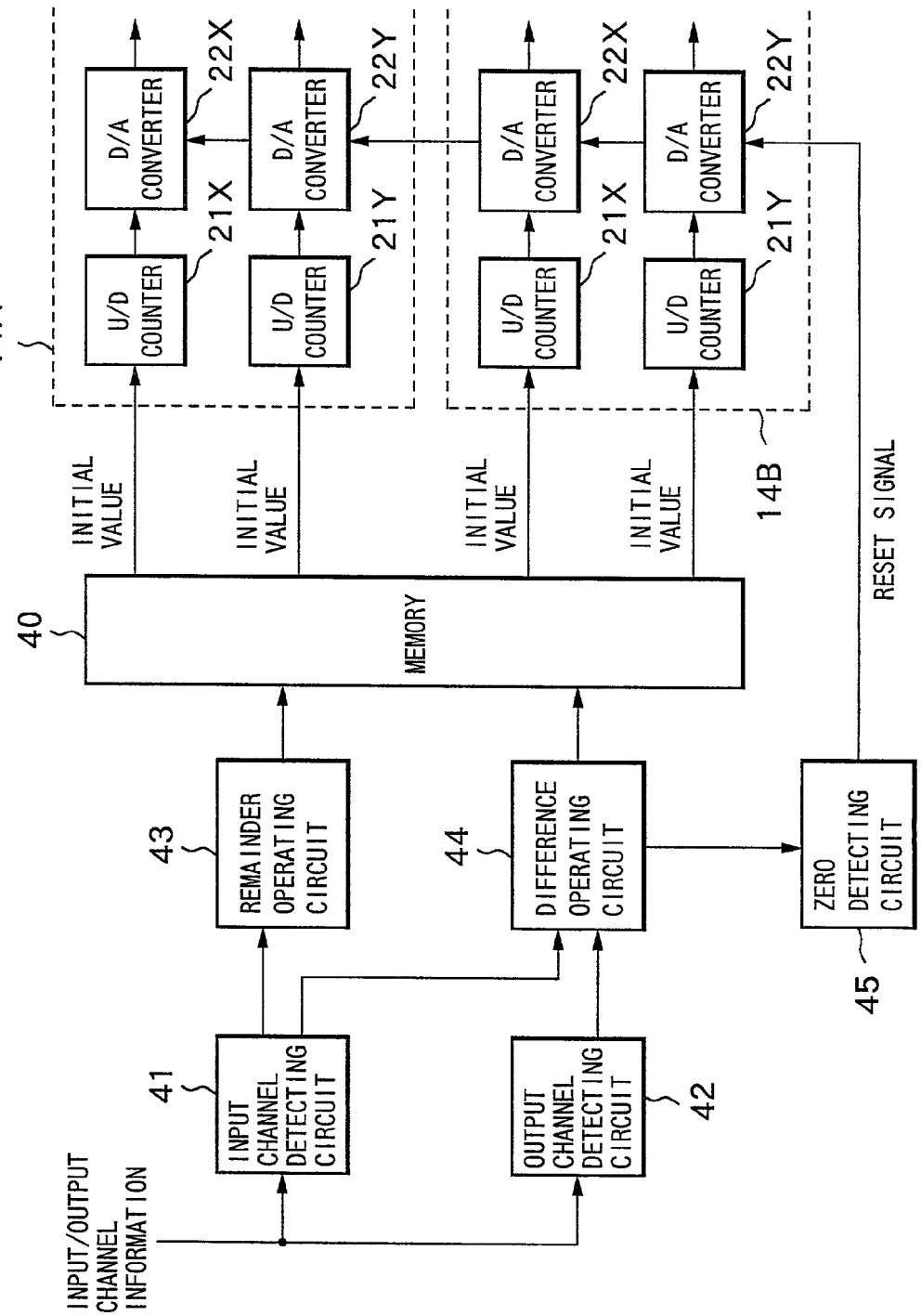
FIG. 32 is a block diagram showing another example obtained by improving the first circuit example of FIG. 29.

In the circuit configuration of FIG. 31, the memory 40 is constituted to possess the initial value data for where the input and output channel numbers become the same. However, such as shown in FIG. 32, it is also possible to provide reset signals to the D/A converters 22X, 22Y of the MEMS mirror driving sections 14A, 14B, from the zero detecting circuit 45.

There will be described hereinafter a second circuit example for optimizing the constitution of the initial value memory.

In the first circuit example, there has been performed the relation between input and output channels based on the remainders and differences concerning the input and output channel numbers, to thereby reduce the amount of the initial value data. In the second circuit, there is performed a relation between input and output channels, by utilizing such a fact that the relationship shown in the following Table 2 is established when there exists a relationship of i1=j2 and i2=j1 for two combinations of input and output channel numbers (i1, j1) and (i2, j2) in the three-dimensionally and symmetrically arranged MEMS mirror arrays 2A, 2B.

TABLE 2

| Input Channel | Output Channel | $\theta_{AX}$ | $\theta_{AY}$ | $\theta_{BX}$ | $\theta_{BY}$ |
|---|---|---|---|---|---|
| i1 | j1 | A | B | C | D |
| i2 | j2 | −C | −D | −A | −B |

Concerning two combinations of input and output channel numbers (i1, j1) and (i2, j2) as shown in Table 2, when the inclination angles to be given to one combination of the axial directions of input side and output side MEMS mirrors are considered to be a combination of 4 kinds of angles A, B, C and D, the inclination angles for the other combination of the axial directions are provided by rearranging the corresponding relationship of the inclination angles $\theta_{AX}$, $\theta_{BX}$, $\theta_{AY}$, and $\theta_{BY}$ and by inverting the signs (absolute values are kept). By utilizing such a relationship, it becomes possible to reduce the amount of initial value data to be stored in the memory 40.

Figure 33:
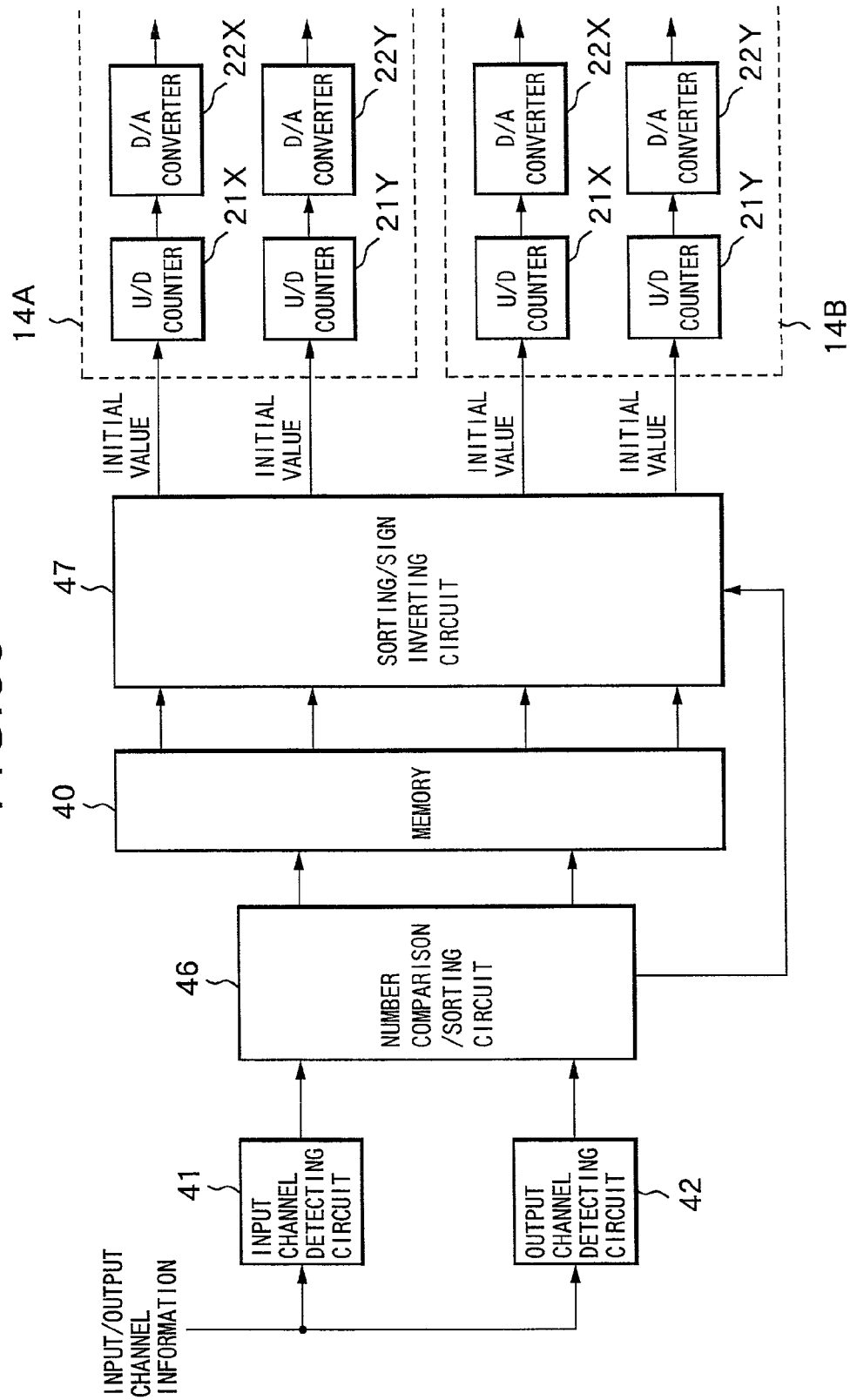
FIG. 33 is a block diagram showing a second circuit example for optimizing the constitution of the initial value memory.

FIG. 33 is a block diagram showing a second circuit example.

In the second circuit example shown in FIG. 33, the memory 40 for storing the counter initial values shown in FIG. 27 is supplied with access signals generated, based on the input/output channel information, by the input channel detecting circuit 41, the output channel detecting circuit 42, and a number comparison/sorting circuit 46, and the initial values read out from the memory 40 are processed by a sorting/sign inverting circuit 47 and then sent to the MEMS mirror driving sections 14A, 14B.

The number comparison/sorting circuit 46 is provided to perform number comparison between the input channel number "i" detected by the input channel detecting circuit 41 and the output channel number "j" detected by the output channel detecting circuit 42, to thereby rearrange the channel numbers such that the larger channel number comes to the upper side of the access signal to be provided to the memory 40 as the information indicative of the input and output channel numbers.

Figure 34:
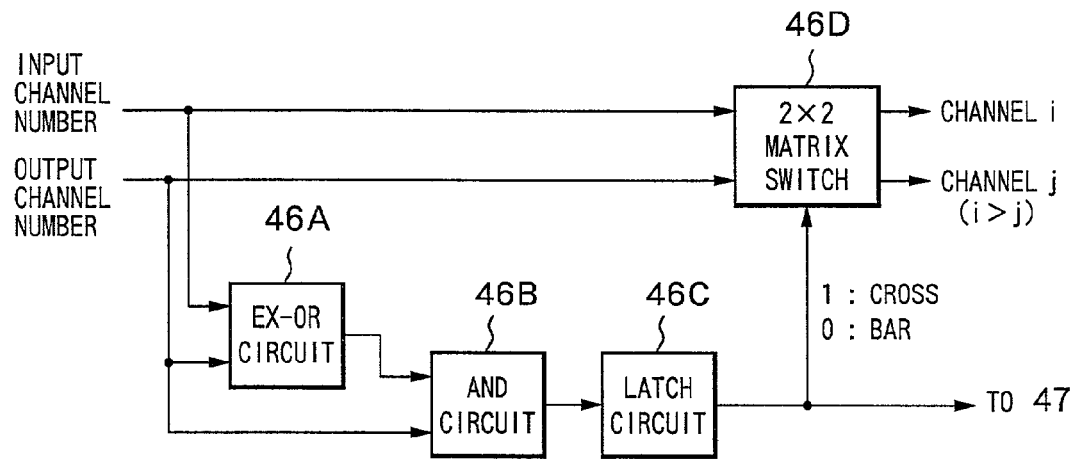
FIG. 34 is a circuit diagram showing a specific exemplary constitution of a number comparison/sorting circuit in the second circuit example of FIG. 33.

As shown in FIG. 34, to be specific, this number comparison/sorting circuit 46 is capable of performing the number comparison between the input channel number "i" and output channel number "j" by a circuit obtained by combining an EX-OR circuit 46A, an AND circuit 46B and a latch circuit 46C, to thereby rearrange the channel numbers based on the comparison result by a 2×2 matrix switch 46D. Note, the latch circuit 46C supplies to the 2×2 matrix switch 46D a signal for bringing the connection between the input and output ports of the 2×2 matrix switch 46D into a barred state when the input channel number "i" is greater than the output channel number "j"; and another signal for bringing the connection between the input and output ports into a crossed state when the input channel number "i" is smaller than the output channel number "j". Further, the signal indicative of the result of the number comparison to be output from the latch circuit 46C is also sent to the succeeding stage sorting/sign inverting circuit 47.

The sorting/sign inverting circuit 47 is input with the initial value data (inclination angles) read out from the memory 40 in accordance with the access signal from the number comparison/sorting circuit 46. When the number relationship of i>j is detected by the number comparison/sorting circuit 46, the initial value data from the memory 40 is directly output to the U/D counters 21X, 21Y of MEMS mirror driving sections 14A, 14B. When the number relationship of i<j is detected by the number comparison/sorting circuit 46, the initial value data from the memory 40 is rearranged and sign-inverted corresponding to the relationship as shown in the aforementioned Table 2, to be output to the U/D counters 21X, 21Y of the MEMS mirror driving sections 14A, 14B.

Figure 35:
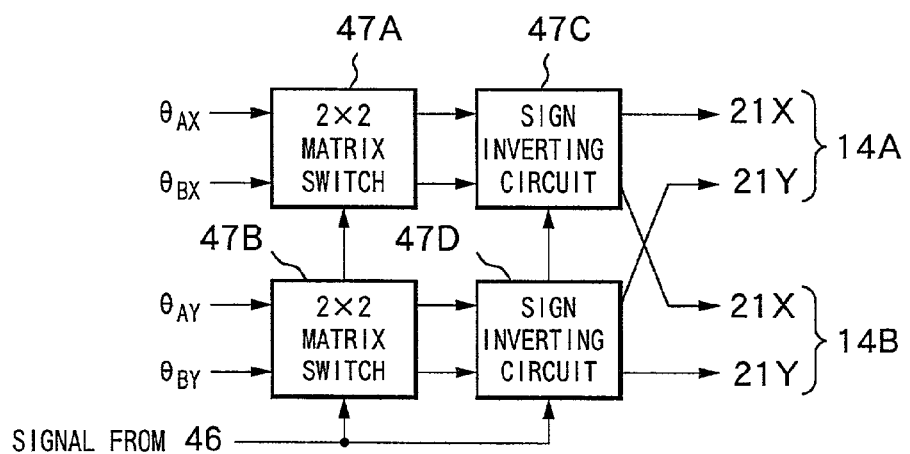
FIG. 35 is a circuit diagram showing a specific exemplary constitution of a sorting/sign inverting circuit in the second circuit example of FIG. 33.

Such as shown in FIG. 35, to be specific, in the sorting/sign inverting circuit 47, the inclination angle data $\theta_{AX}$, $\theta_{BX}$ and $\theta_{AY}$, $\theta_{BY}$ read out from the memory 40 are received by 2×2 matrix switches 47A, 47B, respectively; and, when the number relationship of i<j is detected, the connection of input and output ports of 2×2 matrix switches 47A, 47B is brought into a crossed state to thereby rearrange $\theta_{AX}$, $\theta_{BX}$ and $\theta_{AY}$, $\theta_{BY}$. Then, the inclination angle data output from the 2×2 matrix switches 47A, 47B are sent to sign inverting circuits 47C, 47D, respectively, and the signs of the inclination angle data are inverted when i<j. Then, the inclination angle data output from the sign inverting circuit 47C are sent to the U/D counters 21X of the MEMS mirror driving sections 14A, 14B, respectively, and the inclination angle data output from the sign inverting circuit 47D are sent to the U/D counters 21Y of the MEMS mirror driving sections 14A, 14B, respectively.

By applying the second circuit example as aforementioned, it becomes possible to reduce the memory capacity required for the memory 40 to a half of the memory capacity in the case of constitution shown in FIG. 27 without the application of this circuit configuration.

There will be described hereinafter a third circuit example for optimizing the constitution of the initial value memory.

The third circuit example is provided to optimize the memory constitution by utilizing a fact that there can be established a relationship shown in the following Table 3 concerning the inclination angles of input side and output side MEMS mirrors, when there are simultaneously established the following equation (13) through equation (15) between two combinations of input and output channel numbers (i1, j1), (i2, j2) in the three-dimensional and symmetric MEMS mirror arrays 2A, 2B:

$$i2 = i1 + N \times n \quad (13),$$

$$j2 = j1 N \times n \quad (14), \text{ and}$$

$$-N < i1 - j2 < N \quad (15),$$

wherein N is the number of columns, and n is an arbitrary integer.

TABLE 3

| Input Channel | Output Channel | $\theta_{AX}$ | $\theta_{AY}$ | $\theta_{BX}$ | $\theta_{BY}$ |
|---|---|---|---|---|---|
| i1 | j1 | A | B | C | D |
| i2 | j2 | A | −B | C | −D |

Figure 36:
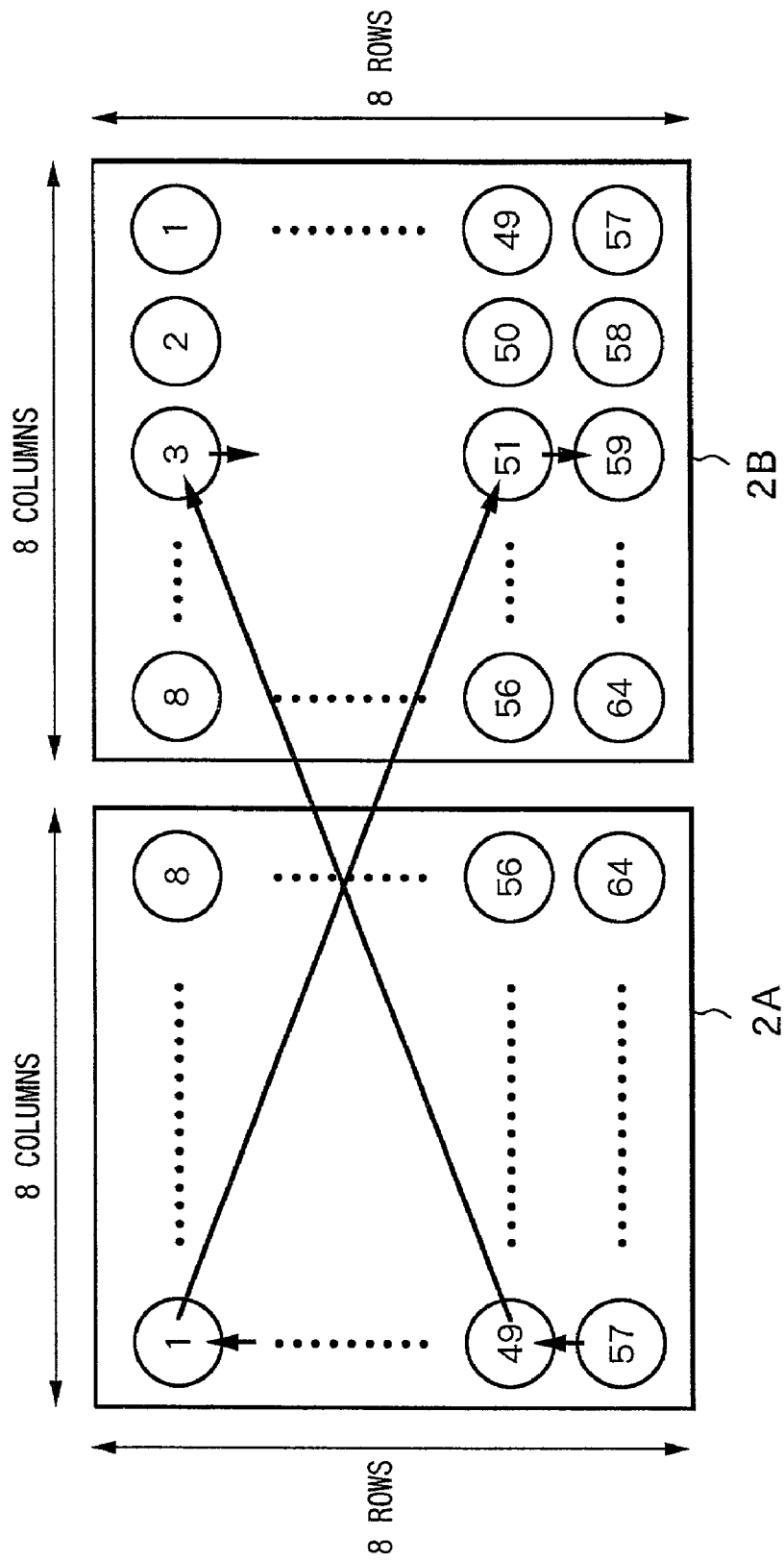
FIG. 36 is a view for explaining optical characteristics of MEMS mirrors to be utilized in a third circuit example for optimizing the constitution of the initial value memory.

FIG. 36 is an exemplary view specifically showing the relationship of Table 3. In FIG. 36, the consideration is given to a situation where the numbers of input and output channels are 64ch×64ch and assuming that each of the input side and output side MEMS mirror arrays 2A, 2B includes 64 numbers of MEMS mirrors arranged in 8 rows and 8 columns, such a combination of (i1, j1)=(1, 51) and (i2, j2)=(49, 3) is considered as one of the combinations establishing the relationship of Table 3. In such input and output channels, there is established a relationship that absolute values become the same in each axis direction and the signs are inverted in the Y-axis direction, concerning the inclination angles of input side and output side MEMS mirrors. By utilizing such a relationship, it becomes possible to reduce the initial value data to be stored in the memory 40.

Figure 37:
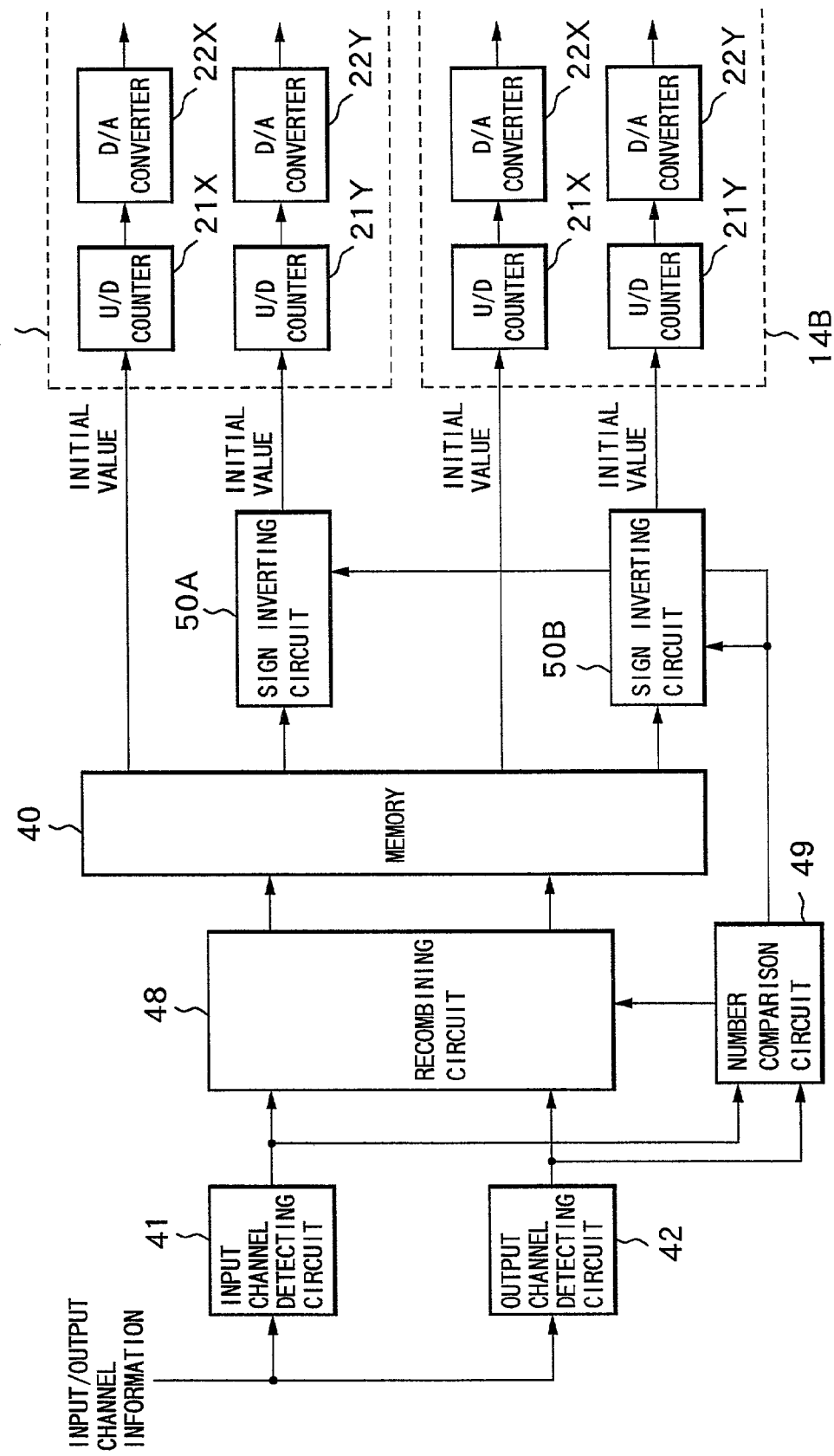
FIG. 37 is a block diagram showing the third circuit example.

FIG. 37 is a block diagram showing the third circuit example.

In the third circuit example shown in FIG. 37, the memory 40 for storing the counter initial values shown in FIG. 27 is supplied with access signals generated, based on the input/output channel information, by the input channel detecting circuit 41, the output channel detecting circuit 42, a recombining circuit 48 and a number comparison circuit 49, and a part of the initial values read out from the memory 40 is processed by sign inverting circuits 50A, 50B and then sent to the MEMS mirror driving sections 14A, 14B.

Corresponding to the number relationship between the input and output channel numbers to be compared by the number comparison circuit 49, the recombining circuit 48 recombines the input channel number "i" and output channel number "j", in accordance with the aforementioned equations (13) through (15). For example, as shown in FIG. 38, specifically, this recombining circuit 48 can be constituted of combined selectors 48A, 48B, quotient/remainder computing circuits 48C, 48D and operating circuits 48E, 48F.

Figure 38:
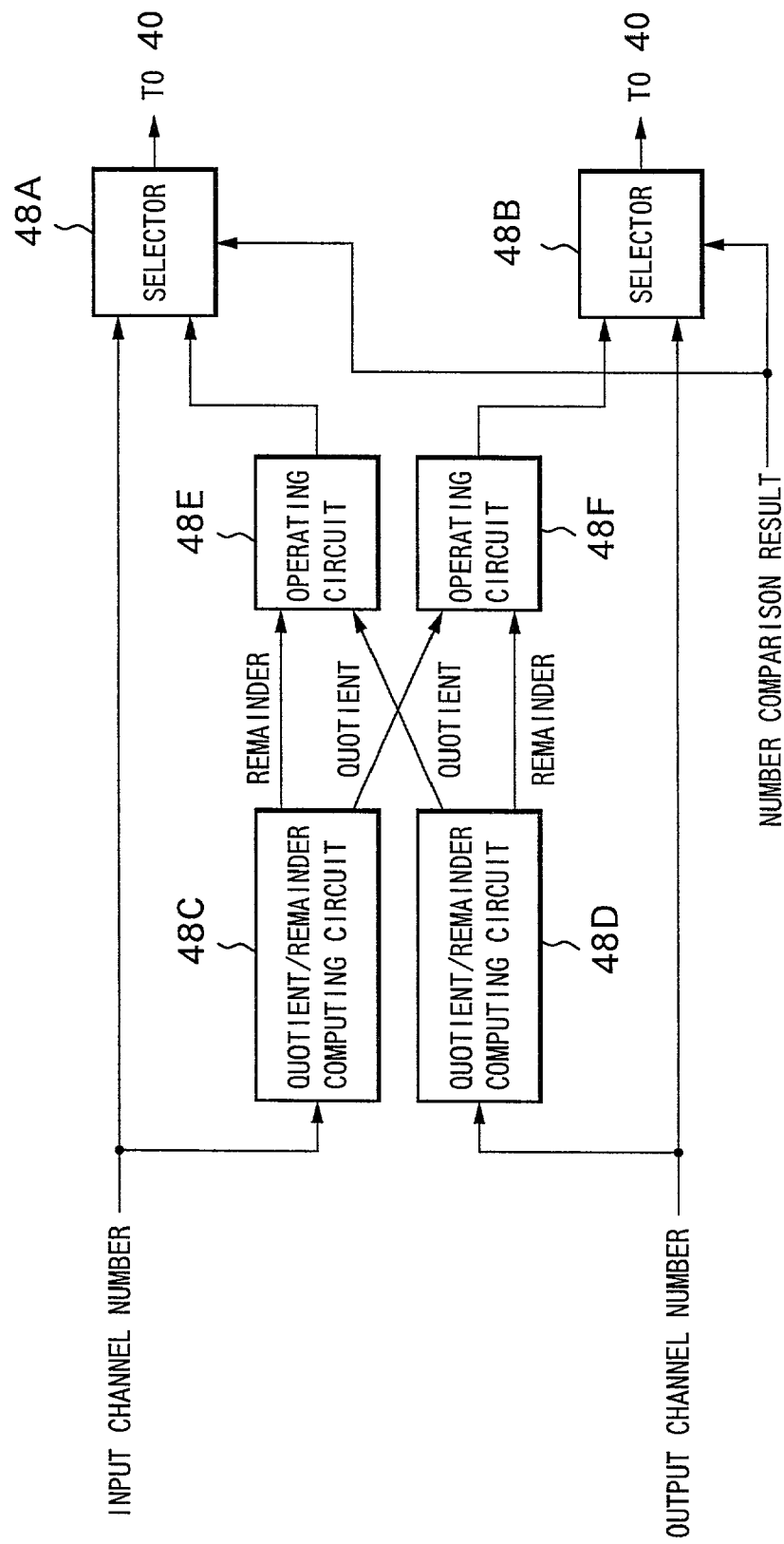
FIG. 38 is a circuit diagram showing a specific exemplary constitution of a recombining circuit in the third circuit example of FIG. 37.

The circuit configuration of FIG. 38 is such that the recombination of channel numbers is unnecessary when the comparison result of the number comparison circuit 49 indicates i>j, to thereby directly transmit the input channel number "i" and output channel number "j" sent from the input channel detecting circuit 41 and output channel detecting circuit 42, respectively to the memory 40 via the selectors 48A, 48B. Contrary, when the comparison result of the number comparison circuit 49 represents i<j, quotients and remainders where the channel numbers are divided by the number N of columns are calculated, respectively, at the quotient/remainder computing circuits 48C, 48D for the input channel number "i" and output channel number "j". Concerning the input channel number "i", the quotient calculated by the quotient/remainder computing circuit 48C is output to the operating circuit 48F and the remainder to the operating circuit 48E, respectively. Concerning the output channel number "j", the quotient computed by the quotient/remainder computing circuit 48D is output to the operating circuit 48E and the remainder to the operating circuit 48F, respectively. At each of the computing circuits 48E, 48F, recalculation of the channel numbers is performed by using the supplied quotient and remainder, such that the recalculation result of the operating circuit 48E is sent, as the post-recombination input channel number, to the memory 40 via the selector 48A, and the recalculation result of the operating circuit 48F is sent, as the post-recombination output channel number, to the memory 40 via the selector 48B.

Figure 39:
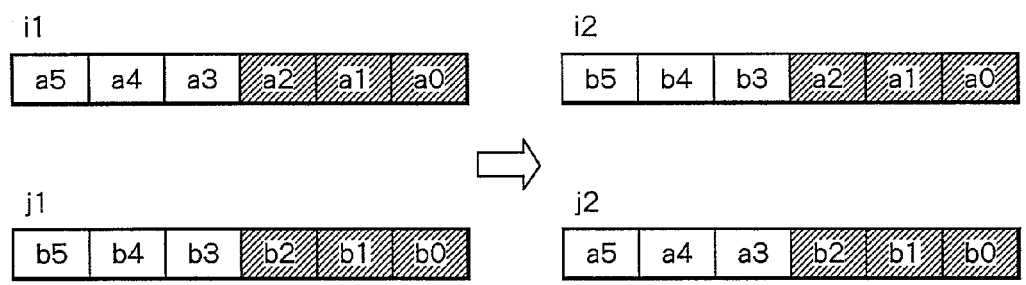
FIG. 39 is a view for explaining a processing operation in the recombining circuit in FIG. 38.

FIG. 39 shows the processing operation of the aforementioned recombining circuit 48, in the situation of 64ch×64ch such as illustrated in FIG. 36. Namely, when the pre-recombination input channel number i1 and pre-recombination output channel number j1 are to be represented by 6-bit data, respectively, for the post-recombination input channel number i2 and post-recombination output channel number j2, 6-bit data shall be prepared by exchanging the upper most 3 bits of each data before recombination. The recombining circuit 48 for executing such data processing can be readily realized by combined logic circuits.

Input to the sign inverting circuit 50A is the inclination angle $\theta_{AY}$ corresponding to the Y-axis direction of the input side MEMS mirror, among the inclination angles read out from the memory 40 in accordance with the input/output channel data to be output from the recombining circuit 48. Further, the sign inverting circuit 50A sends directly the inclination angle $\theta_{AY}$ to the U/D counter 21Y of the MEMS mirror driving section 14A when the comparison result of the number comparison circuit 49 indicates i>j, and inverts the sign of $\theta_{AY}$ to send the inverted $\theta_{AY}$ to the U/D counter 21Y when the comparison result of the number comparison circuit 49 indicates i<j. Similarly, input to the sign inverting circuit 50B is the inclination angle $\theta_{BY}$ corresponding to the Y-axis direction of the output side MEMS mirror, among the inclination angles read out from the memory 40 in accordance with the input/output channel data to be output from the recombining circuit 48. Further, the sign inverting circuit 50B sends directly the inclination angle $\theta_{BY}$ to the U/D counter 21Y of the MEMS mirror driving section 14B when the comparison result of the number comparison circuit 49 indicates i>j, and inverts the sign of $\theta_{BY}$ to send the inverted $\theta_{BY}$ when the comparison result of the number comparison circuit 49 indicates i<j.

By applying the third circuit example, it becomes possible to reduce the memory capacity required for the memory 40 to a half of the memory capacity in the case of constitution shown in FIG. 27 without the application of this circuit configuration.

There will be described hereinafter a fourth circuit example for optimizing the constitution of the initial value memory.

In each of the first through third circuit examples, the memory constitution has been optimized based on the correlation between inclination angles in the respective axial directions of corresponding MEMS mirrors concerning two combinations of input and output channel numbers (i1, j1), (i2, j2). The fourth circuit example is to optimize the memory constitution, by considering correction angles based on the column difference or row difference between the input channel number i1 and output channel number j1 concerning one combination of input and output channel numbers (i1, j1), when the requirement for the precision of the counter initial values is not so strict and the memory capacity is relatively limited. To be specific, there is utilized such a fact that the relationships as shown in the following Table 4 and Table 5 are established, in considering the column difference between i1 and j1, for example, when i1 and j1 are positioned in the same row.

TABLE 4

| Input Channel | Output Channel | $\theta_{AX}$ | $\theta_{AY}$ | $\theta_{BX}$ | $\theta_{BY}$ |
|---|---|---|---|---|---|
| i1 | j1 | A | B | −A | B |

TABLE 5

| Column difference | A |
|---|---|
| −(N − 1) | −(N − 1) × α |
| ⋮ | ⋮ |
| −1 | −α |
| 0 | 0 |
| 1 | α |
| ⋮ | ⋮ |
| N − 1 | (N − 1) × α |

As shown in Table 4, when i1 and j1 are positioned in the same row, the inclination angles $\theta_{AY}$, $\theta_{BY}$ in the Y-axis directions of input side and output side MEMS mirrors have the same value B, and the inclination angles $\theta_{AX}$, $\theta_{BX}$ in the X-axis directions have the values A and −A which have the same absolute value and the different signs. Further, the absolute value of each of the inclination angles $\theta_{AX}$, $\theta_{BX}$ in the X-axis directions has a linear relationship depending on the column difference while assuming a value α as a reference correction angle as shown in Table 5.

Figure 40:
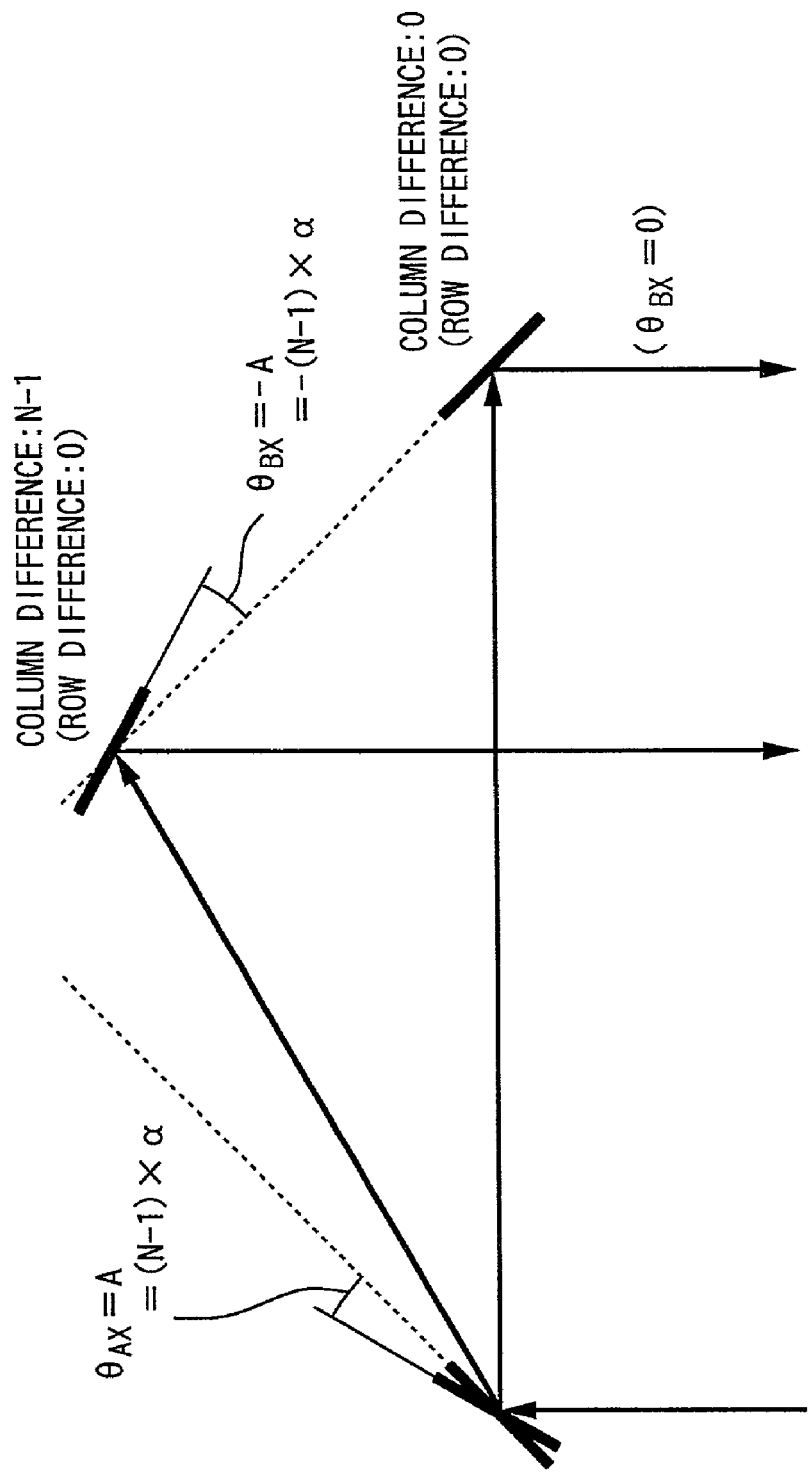
FIG. 40 is a view for explaining optical characteristics of MEMS mirrors to be utilized in a fourth circuit example for optimizing the constitution of the initial value memory.

FIG. 40 is a view for explaining the relationship between the inclination angles $\theta_{AX}$, $\theta_{BX}$ in the X-axis directions, based on the column difference.

As shown in FIG. 40, the inclination angles $\theta_{AX}$, $\theta_{BX}$ in the X-axis directions of the respective MEMS mirrors become 0 (zero), respectively, when the output side MEMS mirror is positioned in the same column to the input side MEMS mirror so that the column difference is 0 (zero). The inclination angles $\theta_{AX}=\alpha$ and $\theta_{BX}=-\alpha$ when the column difference becomes 1, and further, the inclination angles $\theta_{AX}=(N-1)\times\alpha$ and $\theta_{BX}=-(N-1)\times\alpha$ when the column difference becomes N-1.

The aforementioned relationship can be similarly considered for a situation where the row difference between i1 and j1 is taken notice when i1 and j1 are positioned in the same column. Thus, by utilizing such a relationship, it becomes possible to drastically reduce the amount of initial value data to be stored in the memory 40.

Figure 41:
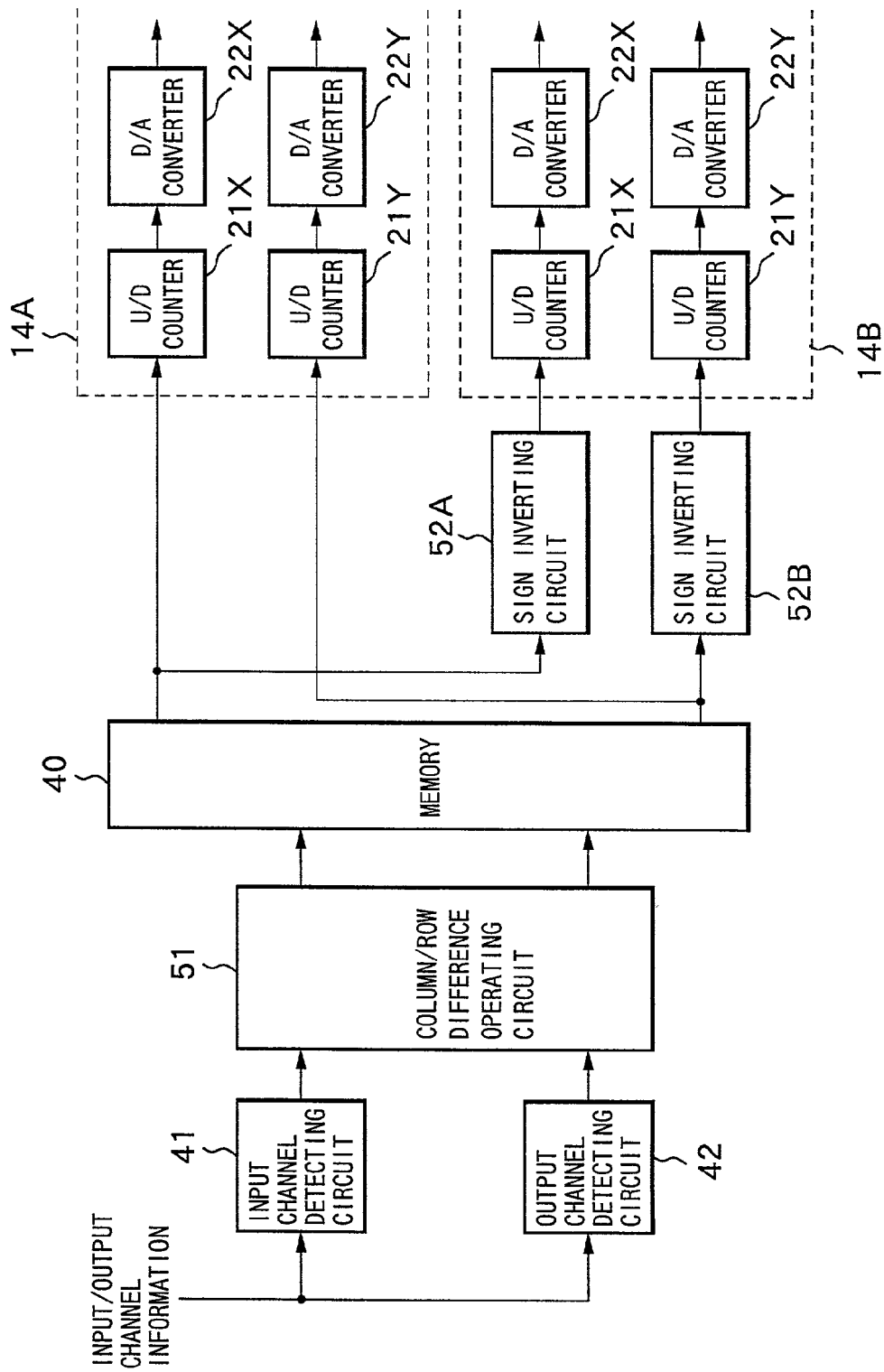
FIG. 41 is a block diagram showing the fourth circuit example.

FIG. 41 is a block diagram showing the fourth circuit example.

In the fourth circuit example shown in FIG. 41, the memory 40 for storing the counter initial values shown in FIG. 27 is supplied with access signals generated, based on the input/output channel information, by the input channel detecting circuit 41, the output channel detecting circuit 42, and a column/row difference operating circuit 51, and a part of the initial values read out from the memory 40 are processed by the sign inverting circuits 52A, 52B and then sent to the MEMS mirror driving sections 14A, 14B.

The column/row difference operating circuit 51 computes a column difference or row difference between the input and output channels, in accordance with the input channel number detected by the input channel detecting circuit 41 and the output channel number detected by the output channel detecting circuit 42, to supply the computation result as access signals to the memory 40. Specifically, for example, as shown in FIG. 42, the column/row difference operating circuit 51 can be constituted by combining the quotient/remainder computing circuits 51A, 51B and operating circuits 51C, 51D.

Figure 42:
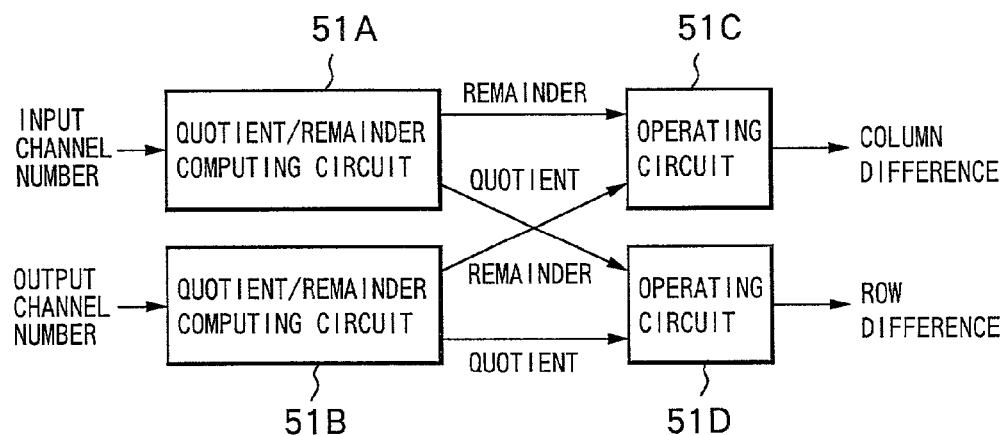
FIG. 42 is a circuit diagram showing a specific exemplary constitution of a column/row difference operating circuit in the fourth circuit example of FIG. 41.

In the circuit configuration of FIG. 42, in the quotient/remainder computing circuit 51A, the quotient and remainder for when dividing the input channel number by the number N of columns are computed, and the quotient is output to the operating circuit 51D and the remainder to the operating circuit 51C, respectively. Further, in the quotient/remainder computing circuit 51B, the quotient and remainder for when dividing the output channel number by the number N of columns are computed, and the quotient is output to the operating circuit 51D and the remainder to the operating circuit 51C, respectively. Further, in the operating circuit 51C, a column difference is computed by using the values of remainders from the quotient/remainder computing circuits 51A, 51B, to be sent to the memory 40. In the operating circuit 51D, a row difference is computed by using the values of quotients from the quotient/remainder computing circuits 51A, 51B, to be sent to the memory 40.

Figure 43:
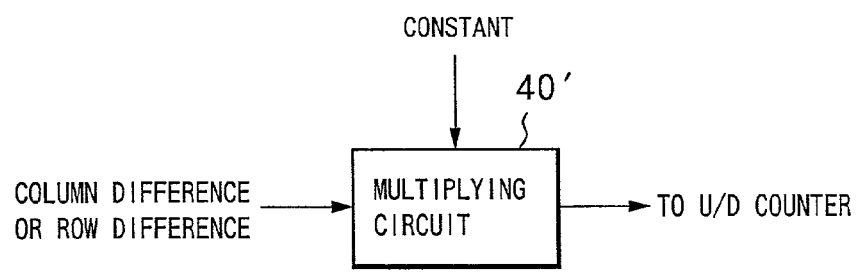
FIG. 43 is a view exemplifying a multiplying circuit instead of the memory in the fourth circuit example of FIG. 41.

The memory 40 is stored with values of correction angles corresponding to the respective column differences as shown in Table 5 and values of correction angles corresponding to the respective row differences, and applicable stored data are read out in accordance with the column difference or row difference sent from the column/row difference operating circuit 51. Here, there has been described a constitution where the memory 40 is stored with correction angle data corresponding to column differences and row differences. However, such as shown in FIG. 43, it is possible to provide a multiplying circuit 40' instead of the memory 40, to sequentially calculate a correction angle corresponding to the column difference or row difference sent from the column/row difference operating circuit 51.

The sign inverting circuit 52A is input with the correction angle data read out from the memory 40 corresponding to the column difference, and inverts the sign of the correction angle to send the sign inverted correction angle to the U/D counter 21X of the MEMS mirror driving section 14B. The sign inverting circuit 52B is input with the correction angle data read out from the memory 40 corresponding to the row difference, and inverts the sign of the correction angle to send the sign inverted correction angle to the U/D counter 21Y of the MEMS mirror driving section 14B.

By applying the fourth circuit example, it becomes possible to drastically reduce the memory capacity required for the memory 40 compared with the constitution shown in FIG. 27 without the application of this circuit configuration.

Figure 44:
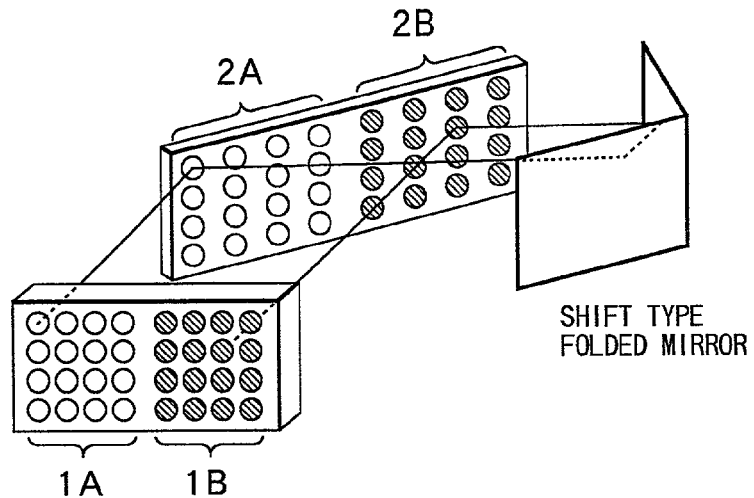
FIG. 44 is a perspective view showing another constitutional example concerning a three-dimension type optical switching device to which the present invention is applicable.

In the first through fourth embodiments, there has been considered the constitution of the three-dimension type optical switching device shown in FIG. 45. However, the constitution of the optical switching device to which the present invention is applicable is not limited thereto. For example, the controlling technique of the present invention can be applied to a three-dimension type optical switching device such as shown in FIG. 44, including an input/output integrated collimator array having juxtaposed input side and output side collimator arrays 1A, 1B, an input/output integrated MEMS mirror array having juxtaposed input side and output side MEMS mirror arrays 2A, 2B, and a shift type folded mirror for reflecting the light from the input side MEMS mirror while shifting, back toward the output side MEMS mirror. Only, concerning the constitution applied with the input/output integrated MEMS mirror array, there shall be excluded the adoption of the aforementioned first through fourth circuit examples for optimizing the constitution of the initial value memory.

What is claimed is:

1. A controlling method of an optical switching device in which for said optical switching device including a first mirror array and a second mirror array, each arranged in a plane with a plurality of tilt-mirrors each having a controllable reflecting surface, and sequentially reflecting optical signals input thereto by said first mirror array and said second mirror array to output from specific positions, said controlling method controlling angles of the reflecting surfaces of the respective tilt-mirrors of said first and second mirror arrays, said controlling method comprising:

detecting an arriving position and an arriving direction of an optical signal reflected by said second mirror array; and judging, based on said detecting, the angles of the reflecting surfaces of the tilt-mirrors which reflected said optical signals of said first mirror array and said second mirror array, and correction controlling the angles of the reflecting surfaces of said tilt-mirrors so that said angles approach previously set target values, respectively, wherein said detecting comprises branching a part of the optical signal reflected by said second mirror array and receiving a branched light at a light receiving surface thereof having a two-dimensional area to generate position information, and said judging comprises comparing the generated position information with initial position information previously set corresponding to the target values of angles of reflecting surfaces of said respective tilt-mirrors, to thereby detect an error in the arriving position of said optical signal, calculating angle deviations of the reflecting surfaces of said respective tilt-mirrors based on the detected error in the arriving position, to thereby compute correction angles of the reflecting surfaces of said respective tilt-mirrors, wherein said calculating comprises calculating angle deviations of the reflecting surfaces of the respective tilt-mirrors to thereby compute correction angles of the reflecting surfaces of the respective tilt-mirrors by using a first angle change amount when forcibly changing only the angle of the reflecting surface of the first mirror array, and a second angle change amount when forcibly changing only the angle of the reflecting surface of said second mirror array, such that an error detected by said comparing becomes substantially zero, and controlling the angles of the reflecting surfaces of said respective tilt-mirrors, in accordance with the computed correction angles.

2. A controlling method of an optical switching device in which for said optical switching device including a first mirror array, and a second mirror array, each arranged in a plane with a plurality of tilt-mirrors each having a controllable reflecting surface, and sequentially reflecting optical signals input thereto by said first mirror array and said second mirror array to output from specific positions, said controlling method controlling angles of the reflecting surfaces of the respective tilt-mirrors of said first and second mirror arrays, said controlling method comprising:

detecting power of the optical signals reflected by said second mirror array and output from respective specific positions; and judging, based on said detecting, the angles of the reflecting surfaces of the tilt-mirrors which reflected said optical signals of said first mirror array and said second mirror array, and correction controlling the angles of the reflecting surfaces of said tilt-mirrors so that said angles approach previously set target values, respectively, the first mirror array and the second mirror array being arranged so as to be three-dimensionally symmetric to each other along an axis of symmetry wherein said detecting comprises detecting the power of each of the optical signals to be output from the respective specific positions, and said judging comprises mutually comparing values of output light powers to be detected by said detecting before and after the time when the angle of the reflecting surface is changed by at least one of:

a first mirror driving section for changing in a stepwise manner the angle of the reflecting surface of each tilt-mirror of said first mirror array into a certain controlling direction; and a second mirror driving section for changing in a stepwise manner the angle of the reflecting surface of each tilt mirror of said second mirror array into a certain controlling direction, to thereby determine controlling directions at said first and second mirror driving sections based only on a relative comparison result, so as to independently control the angles of the reflecting surfaces of said respective tilt-mirrors on the first and second mirror arrays such that the output light power to be detected by said detecting is increased.

3. A controlling method of claim 2, wherein said judging provides initial values concerning the angles of the reflecting surfaces of the respective tilt-mirrors being control targets to said first mirror driving section and said second mirror driving section.

4. A controlling method of claim 3, wherein initial values concerning the angles of the reflecting surfaces of the respective tilt-mirrors corresponding to combinations of input and output channels are previously stored in a storage device, and said judging comprises reading out applicable initial values stored in said storage device, in accordance with channel information for specifying the respective tilt-mirrors being control targets, to thereby provide these initial values to said first mirror driving section and said second mirror driving section.

5. A controlling method of claim 4, wherein said first tilt-mirror array and said second tilt mirror array are arranged to be three-dimensionally symmetric to each other along the axis of symmetry, and the plurality of tilt-mirrors arranged in both of said arrays are assigned with continuous numbers, respectively, so as to be symmetric with respect to the axis of symmetry, wherein said storage device stores therein said initial values which correspond to the symmetrically assigned tilt-mirror numbers and are mutually related by utilizing optical characteristics of the tilt-mirrors, and said judging comprises reading out the related initial values in said storage device, corresponding to the respective tilt-mirror numbers specified based on said channel information.

6. A controlling apparatus of an optical switching device including a first mirror array and a second mirror array, each arranged in a plane with a plurality of tilt-mirrors each having a controllable reflecting surface, and sequentially reflecting optical signals input thereto by said first mirror array and said second mirror array to output from specific positions, said controlling apparatus controlling angles of the reflecting surfaces of the respective tilt-mirrors of said first and second mirror arrays, said controlling apparatus comprising:

output light detecting means capable of detecting an arriving position and an arriving direction of an optical signal reflected by said second mirror array; and angle controlling means for judging, based on a detection result of said output light detecting means, the angles of the reflecting surfaces of the tilt-mirrors which reflected said optical signals of said first mirror array and said second mirror array, to correction control the angles of the reflecting surfaces of said tilt mirrors so that said angles approach previously set target values, respectively, wherein said output light detecting means includes:

an optical branching section branching a part of the optical signal reflected by said second mirror array; and a position information generating section receiving a branched light from said optical branching section at a light receiving surface thereof having a two-dimensional area to generate position information concerning said branched light, and wherein said angle controlling means includes:

a position difference detecting section comparing the position information from said position information generating section with initial position information previously set corresponding to the target values of angles of reflecting surfaces of said respective tilt-mirrors, to thereby detect an error in the arriving position of said optical signal;

a computing section calculating angle deviations of the reflecting surfaces of said respective tilt-mirrors based on the error in the arriving position detected by said position difference detecting section, to thereby compute correction angles of the reflecting surfaces of said respective tilt-mirrors, wherein said computing section calculates angle deviations of the reflecting surfaces of said respective tilt-mirrors to thereby compute correction angles of the reflecting surfaces of said respective tilt-mirrors by using a first angle change amount when forcibly changing only the angle of the reflecting surface of said first mirror array, and a second angle change amount when forcibly changing only the angle of the reflecting surface of said second mirror array, such that an error to be detected by said position difference detecting section becomes substantially zero; and a correction control section controlling the angles of the reflecting surfaces of said respective tilt-mirrors, in accordance with the correction angles computed by said computing section.

7. A controlling apparatus of claim 6,
wherein when a meaningful error is not detected by said position difference detecting section, said computing section judges the output state of the optical signal, in accordance with a change state of an error to be detected by said position difference detecting section when changing at least the angle of the reflecting surface of said second mirror array side.

8. A controlling apparatus of claim 6,
wherein when a meaningful error is not detected by said position difference detecting section, said computing section judges the output state of the optical signal, based on geometric shape information of an image to be obtained by said position information generating section.

9. A controlling apparatus of claim 6, wherein said optical branching section in said output light detecting means includes at least two portions each branching a part of the optical signal reflected by said second mirror array, at different positions; and
wherein said position information generating section includes at least two portions receiving branched lights from the two portions of said optical branching section at light receiving surfaces thereof having a two-dimensional area to generate position information concerning said branched lights, respectively; and
said computing section in said angle controlling means computes angle deviations of the reflecting surfaces to thereby compute the correction angles, without forcibly changing the angles of the reflecting surfaces of said first mirror array and said second mirror array, and said correction control section performing the angle correction in accordance with the correct angles computed by said computing section.

10. A controlling apparatus of claim 6, wherein in said output light detecting means, said position information generating section receives a branched light from said optical branching section at a light receiving surface thereof having a two-dimensional area, and movable in a propagation direction of said branched light to generate at least two kinds of position information concerning said branched light, and
said computing section in said angle controlling means, computes angle deviations of the reflecting surfaces to thereby compute the correction angles, without forcibly changing the angles of the reflecting surfaces of said first mirror array and said second mirror array, and said correction control section performs the angle correction in accordance with the correction angles computed by said computing section.

11. A controlling apparatus of an optical switching device including a first mirror array and a second mirror array, each arranged in a plane with a plurality of tilt-mirrors each having a controllable reflecting surface, and sequentially reflecting optical signals input thereto by said first mirror array and said second mirror array to output from specific positions, said controlling apparatus controlling angles of the reflecting surfaces of the respective tilt-mirrors of said first and second mirror arrays, said controlling apparatus comprising:

output light detecting means for detecting power of an optical signal reflected by said second mirror array and output from a specific position; and angle controlling means for judging, based on an input signal indicating a detection result of said output light detecting means, the angles of the reflecting surfaces of the tilt-mirrors which reflected said optical signals of said first mirror array and said second mirror array, to correction control the angles of the reflecting surfaces of said tilt-mirrors so that said angles approach previously set target values, respectively, said first tilt-mirror array and said second tilt-mirror array being arranged to be three-dimensionally symmetric to each other along an axis of symmetry, said angle controlling means including:

a first mirror driving section changing in stepwise manner the angle of the reflecting surface of each tilt-mirror of said first mirror array into a certain controlling direction;

a second mirror driving section changing in a stepwise manner the angle of the reflecting surface of each tilt mirror of said second mirror array into a certain controlling direction; and a comparative control section mutually comparing values of output light powers to be detected by said output light detecting means before and after the time when the angle of the reflecting surface is changed by at least one of said first and second mirror driving sections to thereby determine controlling directions at said first and second mirror driving sections based on only a relative comparison result, so as to independently control the angles of the reflecting surfaces of said respective tilt-mirrors on said first and second mirror arrays such that the output light power to be detected by said output light detecting means is increased.

12. A controlling apparatus of claim 11 wherein said comparative control section includes:

a holding circuit holding an output signal indicating the output light power detected by said optical power detecting section for a constant period of time, a comparison circuit comparing an output signal from said optical power detecting section with an output signal from said holding circuit to output a signal having a level to be changed corresponding to the value relationship of the compared output signals;

a control signal generating circuit generating a signal for determining the respective control directions in said first mirror driving section and said second mirror driving section in accordance with the output signal level from said comparison circuit; and a control and monitoring circuit monitoring the output signal from said comparison circuit to control the operation setting of said control signal generating circuit.

13. A controlling apparatus of claim 11,
wherein said comparative control section controls said first mirror driving section and said second mirror driving section, such that after the angle control in one axis direction is completed, the angle control in the other axis direction is performed in each of the respective tilt-mirrors of said first mirror array and said second mirror array.

14. A controlling apparatus of claim 11,
wherein said comparative control section controls said first mirror driving section and said second mirror driving section, such that the angle controls in the same axial directions are simultaneously performed in both of the respective tilt-mirrors of said first mirror array and said second mirror array.

15. A controlling apparatus of claim 11,
wherein said comparative control section controls said first mirror driving section and said second mirror driving section, such that the angle controls in the different axial directions are simultaneously performed in each of the respective tilt-mirrors of said first mirror array and said second mirror array.

16. A controlling apparatus of claim 11,
wherein said comparative control section controls said first mirror driving section and said second mirror driving section, such that the angle controls in the different axial directions for the tilt mirror at said first mirror array side are simultaneously performed with the angle controls in the different axial directions for the tilt mirror at said second mirror array side.

17. A controlling apparatus of claim 11,
wherein said comparative control section provides initial values concerning the angles of the reflecting surfaces of the respective tilt-mirrors which are control targets, to said first mirror driving section and said second mirror driving section.

18. A controlling apparatus of claim 17, wherein said comparative control section includes:
a storage device previously storing the initial values concerning the angles of the reflecting surfaces of the respective tilt-mirrors corresponding to combinations of input and output channels, respectively; and
an initial value access control circuit generating an access signal for reading out, in accordance with channel information for specifying the respective tilt-mirrors being control targets, the applicable initial values stored in said storage device to thereby provide these initial values to said first mirror driving section and said second mirror driving section.

19. A controlling apparatus of claim 18,
wherein said first tilt-mirror array and said second tilt mirror array are arranged to be three-dimensionally symmetric to each other along the axis of symmetry, and the plurality of tilt mirrors arranged in both of said arrays are assigned with continuous numbers, respectively, so as to be symmetric with respect to the axis of symmetry,
wherein said storage device stores therein said initial values which correspond to the symmetrically assigned tilt-mirror numbers and are mutually related by utilizing optical characteristics of the tilt-mirrors, and
wherein said initial value access control circuit generates said access signal for reading out the related initial values in said storage device, corresponding to the respective tilt-mirror numbers specified based on said channel information.

20. A controlling apparatus of claim 19,
wherein said initial value access control circuit detects a first number of a tilt-mirror being control target of said first tilt-mirror array and a second number of a tilt-mirror being control target of said second tilt-mirror array, respectively, based on said channel information, computes a remainder when dividing said first number by the number of tilt-mirrors arranged perpendicularly to the symmetry axis of said first tilt-mirror array, computes a difference between said first number and said second number, and transmits, as said access signal, the respective values of said computed remainder and said computed difference, to said storage device, and
wherein said storage device is stored with said initial values mutually related on the basis of said computed remainder and said computed difference.

21. A controlling apparatus of claim 20,
wherein said initial value access control circuit judges whether or not said first number and said second number are the same, to generate said access signal including the judgment result, and
wherein said storage device is stored with said initial values when said first number and said second number are the same as a single fixed value.

22. A controlling apparatus of claim 19,
wherein said initial value access control circuit is provided with a function: for detecting a first number of a tilt-mirror being control target of said first tilt-mirror array and a second number of a tilt-mirror being control target of said second tilt-mirror array, respectively, based on said channel information, for performing number comparison between said first number and said second number to thereby rearrange these numbers in the number order, so as to transmit the rearranged numbers as said access signal to said storage device, and for exchanging the initial value for the tilt-mirror of said first tilt-mirror array with the initial value for the tilt-mirror of said second tilt-mirror array to invert the signs of these initial values, concerning the initial values read out from said storage device, when said first number and said second number are rearranged, and
wherein said storage device is stored with said initial values mutually related based on the number relationship between said first number and said second number.

23. A controlling apparatus of claim 19,
wherein said initial value access control circuit:
detects a first number of a tilt-mirror being a control target of said first tilt-mirror array and a second number of a tilt-mirror being a control target of said second tilt-mirror array, respectively, based on said channel information,
performs number comparison between said first number and said second number, to thereby transmit said detected first number and second number as said access signal to said storage device when said detected first number is greater than said detected second number, while to thereby recombine the second number positioned at the same column and the same row as said detected first number with the first number positioned at the same column and the same row as said detected second number so as to transmit the thus combined second number and first number as said access signal to said storage device when said detected second number is greater than said detected first number, and
inverts the signs of the initial values in the direction parallel to the symmetry axis, concerning the initial values read out from said storage device, when said first number and said second number are recombined, and
wherein said storage device is stored with the initial values mutually related on the basis of the number relationship between said first number and said second number.

24. A controlling apparatus of claim 19, wherein said initial value access control circuit detects a first number of a tilt-mirror being control target of said first tilt-mirror array and a second number of a tilt-mirror being control target of said second tilt-mirror array, respectively, based on the channel information, extracts a relative difference between components in the direction perpendicular to the symmetry axis and a relative difference between components in the direction parallel to the symmetry axis concerning said first number and said second number, to thereby transmit the thus extracted relative differences, as said access signal, to said storage device, and wherein said storage device is stored with the correction angles computed on the basis of the relative differences, as said initial values.

25. A controlling apparatus of claim 24, wherein said controlling apparatus is provided with, instead of said storage device, a circuit for computing correction angles in accordance with said respective relative differences transmitted from said initial value access control circuit.

* * * * *